US008073138B2

(12) United States Patent
Takashima et al.

(10) Patent No.: US 8,073,138 B2
(45) Date of Patent: Dec. 6, 2011

(54) INFORMATION INPUT DEVICE, AND ELECTRONIC APPARATUS USING SAME

(75) Inventors: Kouichiro Takashima, Tokyo (JP); Shun Kayama, Saitama (JP); Yasuhiro Kataoka, Kanagawa (JP); Hiroshi Azuma, Kyoto (JP); Yoshihiro Tanabe, Kyoto (JP); Tsuyoshi Uchida, Tokyo (JP)

(73) Assignees: Sony Corporation, Tokyo (JP); Omron Corporation, Kyoto (JP)

( * ) Notice: Subject to any disclaimer, the term of this patent is extended or adjusted under 35 U.S.C. 154(b) by 0 days.

(21) Appl. No.: 12/662,031

(22) Filed: Mar. 29, 2010

(65) Prior Publication Data

US 2010/0188373 A1 Jul. 29, 2010

Related U.S. Application Data

(62) Division of application No. 10/476,762, filed as application No. PCT/JP02/05395 on Jun. 2, 2003, now Pat. No. 7,860,237.

(30) Foreign Application Priority Data

| Jun. 1, 2001 | (JP) | 2001-166134 |
| Jun. 29, 2001 | (JP) | 2001-198388 |
| Jan. 30, 2002 | (JP) | 2002-021674 |
| Feb. 4, 2002 | (JP) | 2002-026244 |
| May 1, 2002 | (JP) | 2002-130014 |

(51) Int. Cl.
*H04M 9/00* (2006.01)
*H04M 1/00* (2006.01)
*G06F 3/033* (2006.01)

(52) U.S. Cl. .................. 379/433.06; 345/184

(58) Field of Classification Search .............. 200/4, 5 R, 200/11 G, 11 R, 14, 18; 335/205–207; 345/184, 345/157; 379/433.01, 433.06
See application file for complete search history.

(56) References Cited

U.S. PATENT DOCUMENTS 5,592,709 A * 1/1997 Watkins et al. ................... 5/660
(Continued)

FOREIGN PATENT DOCUMENTS

DE 4021 105 A1 2/1991
(Continued)

OTHER PUBLICATIONS

Supplemental European Search Report dated Feb. 26, 2008 for corresponding European Application No. 02 72 8213.
(Continued)

*Primary Examiner* — Davetta W Goins
*Assistant Examiner* — Phylesha Dabney
(74) *Attorney, Agent, or Firm* — Rader, Fishman & Grauer PLLC

(57) ABSTRACT

An information input device is provided which is to make input of information by operating a disk-shaped rotating member. The device includes the rotating member (36) which is rotatable with one main side thereof being operated, rotation detecting means (23, 32) for detecting a rotation of the rotating member (36), a central switch activator (26) provided at the center of rotation of the rotating member (36), a central switch (270) which is activated by operating the central switch activator (26), and a plurality of peripheral switches (27) which are turned on when a portion, apart from the center of rotation, of the rotating member (36) is pressed. Rotating the rotating member and pressing the apart portion makes input of information, and operating the central switch activator sets the information thus entered.

2 Claims, 34 Drawing Sheets

U.S. PATENT DOCUMENTS

| | | | |
|---|---|---|---|
| 5,593,023 | A | 1/1997 | Kaizaki et al. |
| 5,621,196 | A | 4/1997 | Nishijima et al. |
| 6,198,175 | B1 | 3/2001 | Kalb et al. |
| 6,396,006 | B1 | 5/2002 | Yokoji et al. |
| 7,154,479 | B2 | 12/2006 | Balle et al. |
| 7,602,268 | B2 * | 10/2009 | Miyasaka et al. ............. 335/205 |
| 2002/0087747 | A1 | 7/2002 | Yamaguchi et al. |
| 2003/0228881 | A1 | 12/2003 | Yamamoto et al. |
| 2004/0233159 | A1 * | 11/2004 | Badarneh ...................... 345/156 |
| 2004/0242288 | A1 | 12/2004 | Balle et al. |
| 2005/0168566 | A1 | 8/2005 | Tada et al. |

FOREIGN PATENT DOCUMENTS

| | | |
|---|---|---|
| DE | 197 01 927 C1 | 6/1998 |
| EP | 0 951 159 A | 10/1999 |
| EP | 1486860 A1 | 12/2004 |
| JP | 03-7862 | 2/1991 |
| JP | 05-22902 | 1/1993 |
| JP | 05-022902 A | 1/1993 |
| JP | 9-7462 | 1/1997 |
| JP | 09-007462 A | 1/1997 |
| JP | 11-126126 A | 5/1999 |
| JP | 2001-521459 | 11/2001 |
| JP | 2001-521459 T | 11/2001 |
| JP | 2006073311 A * | 3/2006 |
| WO | WO-97/22984 A2 | 6/1997 |
| WO | WO-00/34965 A | 6/2000 |
| WO | WO-00/70438 A1 | 11/2000 |
| WO | WO-03075146 A1 | 9/2003 |

OTHER PUBLICATIONS

Tatsuya Tokunaga et al., Sho Space de Tajigen no Sosa o Jitsugen suru Kogata Nyuroku Device: TT dail no Teian, Symposium 'Car-navi,' Japan Ergonomics Society Kansai Shibu, Feb. 27, 2000 pp. 171-176.

Tatsuya Tokunaga et al., "Sho Space de Tajigen no Sosa o Jitsugen suru Kogata Nyuroku Device: TT dail no Yukosei no Kensho", Heisei 12 nendo Japan Ergonomics Society Kansai Shibu Taikai Koen Ronbunshu, Heisei 12 nendo Japan Ergonomics Society Kansai Shibu Taikai Jimukyoku, U.S. Appl. No. Nov. 18, 2000, pp. 24 to 27.

Extended European Search Report issued May 27, 2010 for corresponding European Application No. 10 00 3390.

International Search Report Sep. 17, 2002.

Tatsuya Tokunaga et al., " Sho Space de Tajigen no Sosa o Jitsugen suru Kogata Nyuroku Device: TT dail no Yukosei no Kensho", Heisei 12 nendo Japan Ergonomics Society Kansai Shibu Taikai Koen Ronbunshu, Heisei 12 nendo Japan Ergonomics Society Kansai Shibu Taikai Jimukyoku, Nov. 18, 2000, pp. 24 to 27.

* cited by examiner

CURSOR

CURSOR

FIG.18A  FIG.18B

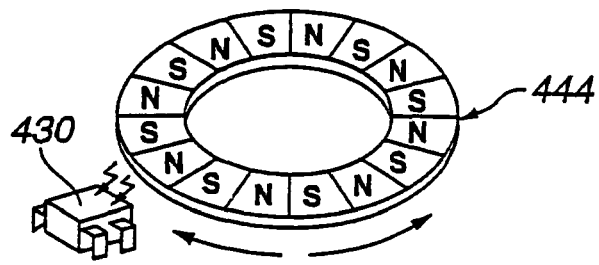
FIG.35A
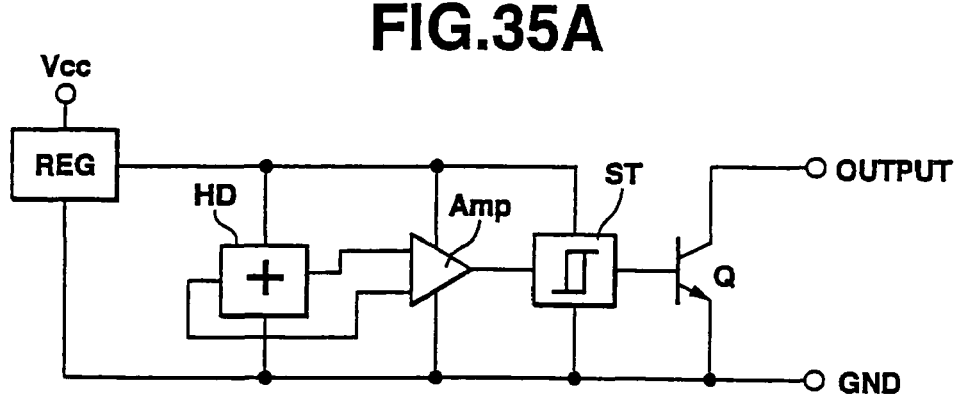
FIG.35B
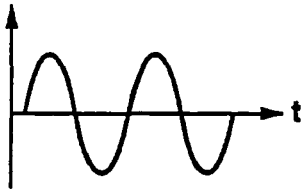
FIG.35C
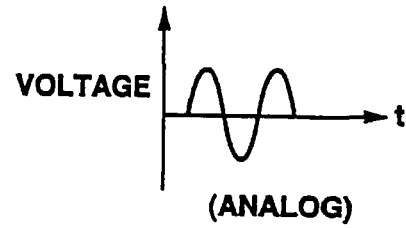
FIG.35D
FIG.35E
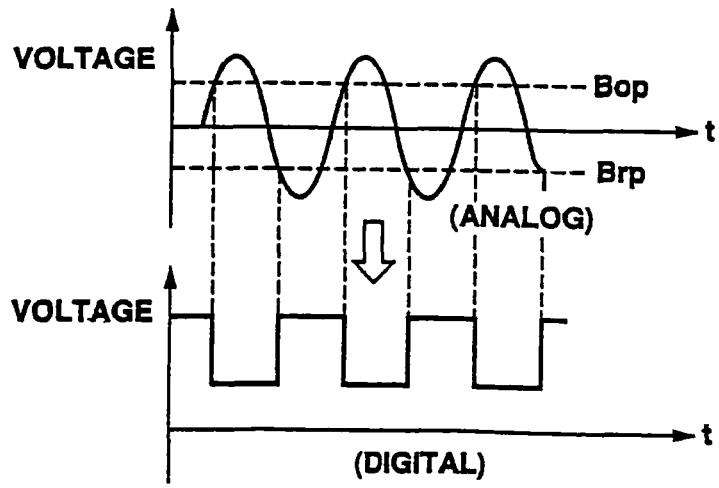

US 8,073,138 B2

INFORMATION INPUT DEVICE, AND ELECTRONIC APPARATUS USING SAME

CROSS REFERENCES TO RELATED APPLICATIONS

This is a Divisional Application of the patent application Ser. No. 10/476,762, filed Nov. 5, 2003, which is based on a National Stage Application of PCT/JP02/05395, filed Jun. 2, 2003, which in turn claims priority from Japanese Application No. 2001-166134, filed on Jun. 1, 2001, Japanese Application No. 2001-198388, filed on Jun. 29, 2001, Japanese Application No. 2002-021674, filed on Jan. 30, 2002, Japanese Application No. 2002-026244, filed on Feb. 4, 2002, and Japanese Application No. 2002-130014, filed on May 1, 2002, the entire contents of which are incorporated herein by reference.

TECHNICAL FIELD

The present invention generally relates to an information input device, and more particularly to an information input device which makes input of data by operating a rotating member, and an electronic apparatus using the information input device.

BACKGROUND ART

Heretofore, there has been proposed a drum-shaped roller rotatable in forward and backward directions as a means for making input of character information etc.

An input means of this type is known from the disclosure in the Japanese Published Unexamined Patent Application No. 203985 of 1999.

FIGS. 1 to 3 illustrate together a portable phone as an electronic apparatus using a rotating drum of the above type as a means for making entry of character information. FIG. 1 shows the external view of the portable phone, FIG. 2 is a circuit diagram of the portable phone in FIG. 1, and FIG. 3 shows a multi-functional switch used as a mobile communications terminal.

As shown in FIGS. 1 and 2, the portable phone includes an antenna 1, transmission/reception circuit 2, microphone 3, speaker 4, CPU (central processing unit) 5, ROM (read-only memory) 6 having stored therein programs etc. executed by the CPU 5, RAM (random-access memory) 7 having provisionally stored therein data required for execution of a program by the CPU 5, display drive circuit 8, and a display unit 9 driven by the display drive circuit 8 to display a variety of information. The display unit 9 uses a liquid crystal display (LCD) panel. The portable phone shown in FIG. 1 further includes operating keys 10 and a multi-functional switch 11 forming the information input device. The operating keys 10 and multi-functional switch 11 form together an operation unit 12.

In the portable phone having a body 13, the antenna 1 is provided at the right upper end of the body 13 as shown in FIG. 1. The antenna 1 is extensible upward. Also, in this portable phone, the speaker 4 is disposed nearly in the middle of the upper end of the apparatus body 13, the display unit 9 is disposed below the speaker 4, the operation unit 12 is disposed below the display unit 9, and the microphone 3 is disposed in the middle of the lower end of the apparatus body 13. The multi-functional switch 11 is disposed in the upper portion of the operation unit 12 and the operating keys 10 including ten keys are disposed below the multi-functional switch 11.

FIG. 3 shows the multi-functional switch 11 in detail. As shown, it has a drum-shaped roller 11A. By rotating or pressing the roller 11A, information is entered. The multi-functional switch 11 is constructed and functions as will be described below:

As shown in FIG. 3, the multi-functional switch 11 includes a base 11D having a downward-extending fulcrum projection 11F formed along one longitudinal side thereof. The base 11D is installed to a printed circuit board 11E with the fulcrum projection 11F laid between them. The base 11D is normally kept generally parallel to the printed circuit board 11E by a forcing means (not shown). However, when the base is pressed from above against the force of the forcing means, it is pivoted downward about the fulcrum projection 11F.

The roller 11A is supported above the base 11D rotatably with the rotating shaft thereof being held horizontally. More specifically, the roller 11A is supported at one end of the rotating shaft thereof in a bearing provided in a support piece 11G and at the other end in a bearing provided in a rotation detector 11B. The rotation detector 11B supporting the other end of the rotating shaft detects a rotated extent and direction of the rotating shaft of the roller 11A. A switch 11C is provided on the printed circuit board 11E and under the base 11D. When the roller 11A is pressed from above, the base 11D is pivoted about the fulcrum projection 11F and presses the switch 11C which will thus be turned on. Thus, the multi-functional switch 11 makes entry of a rotated extent and direction of the roller 11A by rotating the latter and also enters information by pressing the roller 11A.

The operations of the portable phone shown in FIG. 1 will be explained below as to a phone directory search with reference to FIG. 4:

First, the operating keys 10 of the operation unit 12 are operated in a predetermined manner to display an initial screen 9a set in the portable phone. A menu for the phone directory search is selected from the initial screen 9a and then set. Next, the roller 11A of the multi-functional switch 11 is rotated upward or downward in the plane of FIG. 3. At this time, there will be displayed on the display unit 9 information about initials of a destination's name like "a, i, u, e, o, ka, ki, . . . wa" (in the order of the Japanese 50-character "kana" syllabary) for example as options. The information appears scrolling, and the options are extracted from the RAM 7 correspondingly to a rotated extent of the roller 11A and displayed on the display unit 9. A reference number 9b indicates an example of the display on the screen of the display unit 9.

When a desired initial is found on the screen, a cursor 15 is pointed to that initial by rotating the roller 11A. That is, the information is selected. A reference number 9c indicates an example of the display on the screen when the desired information has been selected. In this example, "sa" is selected. After completion of this selection, the roller 11A is pressed to set the selected initial "sa". That is, when the roller 11A is pressed, the switch 11C is turned on, which is detected by the CPU 5. An option the cursor 15 is pointing to, information about the initial "sa" in this example, is set. With this setting, names (full name) having been entered under the initial ("sa" in this example) will be displayed. A reference number 9d indicates an example of the display. Then, the roller 11A is further rotated to move the cursor 15 to a desired names. A reference number 9e indicates an example of the selection. A name "Ikuo Sasaki" is selected in this example. With this setting, the roller 11A is pressed. The name "Ikuo Sasaki" is set in this example.

With the roller 11A further pressed in this condition, information corresponding to the selected name "Ikuo Sasaki" is read from the RAM 7 and displayed on the display unit 9, which example is indicated with a reference 9*f*. For selection of a desired option from the display screen, for example, sending a phone call or an electronic mail to "Ikuo Sasaki", the cursor 15 is moved to the option and placed over the option. Thus, the desired option is selected. For example, the cursor 15 is moved to a phone number and placed over it, whereby sending of the phone call or electronic mail to a phone of that number will be selected.

Note that some destinations have a plurality of phone numbers including his or her home phone number, office phone number, a phone number of his or her portable phone number and also an electronic mail (e-mail) address or the like, not any single phone number.

The cursor 15 is of course moved to a phone number displayed on the screen by rotating the roller 11A of the multi-functional switch 11. A reference number 9*g* in FIG. 4 indicates an example when such a destination is selected. It should be noted that selection of an electronic mail address in the information corresponding to a selected name will lead to selection of sending of an electronic mail to that address.

When the roller 11A is pressed from above in the plane of FIG. 3 after the above selection, the selected option is set. Then, the set option is carried out, namely, a call is sent to the selected one of the phone numbers of Ikuo Sasaki in this example. A reference number 9*h* indicates an example of the display appearing on the display unit 9 at this time, in which a message "calling", the name ("Ikuo Sasaki") of the destination of the phone call and the destination phone number are displayed.

With the portable phone shown in FIG. 1, it is possible to select one of the plurality of options by rotating the roller 11A of the multi-functional switch 11 and set the selected option by pressing the roller 11A with the finger having rotated the roller 11A for the selection of the option. Thus, it is possible to rapidly send a call or electronic mail.

The mobile communications terminal such as the conventional portable phone is not advantageous in some respects as follows since it uses the multi-functional switch 11.

Firstly, the use of the multi-functional switch 11 inhibits the mobile communications terminal from being designed thinner. There are demands for mobile communications terminals including the portable phone having a wider variety of functions, higher performance, easier operability and a thinner design. The aforementioned conventional portable phone can hardly meet such demands. More specifically, in the multi-functional switch 11, the roller 11A has to be rotatably supported, and there should be provided between the base 11D to support the roller 11A and printed circuit board 11E the switch 11C provided to set a selected option and which is turned on when the roller 11A is pressed. This construction itself makes it difficult to provide a thinner design of the portable phone. Namely, the thickness of the multi-functional switch 11 depends primarily upon the diameter of the roller 11A. A smaller diameter of the roller 11A will lead to a thinner design of the multi-functional switch 11. For assuring a large scrolling by one rotated extent of the roller 11A, however, the diameter of the latter has to be correspondingly large. If the diameter of the roller 11A is too small, the roller 11A itself will loose its easy operability.

The above mechanism of the roller 11A will be described in detail below:

The circumferential turn of the roller 11A, required for a scrolling of one line through the screen of the display unit 9, has to be larger than a predetermined value and may not be limitlessly smaller than the predetermined value. When the diameter of the roller 11A is smaller, the rotation angle of the latter, necessary for the cursor movement for one line, has to be larger correspondingly (for the reduction of the diameter). The smaller the diameter of the roller 11A, the smaller the maximum number of pulses the roller 11A can generate per turn becomes. Therefore, for movement of the cursor over many lines, the roller 11A should be rotated very much by the finger, which will lead to a longer time for selection of a desired option and cause the operation of the roller 11A to be more annoying.

On this account, it is assumed that the scrolling attained by one turn of the roller 11A of a small diameter is increased. In this case, however, the circumferential turn of the roller 11A for movement of the cursor 15 for one line will be smaller, which makes it difficult to accurately point the cursor 15 to a desired line. The cursor 15 will move and return excessively, which will lead to a poorer operability of the roller 11A.

As will be known from the foregoing, the multi-functional switch 11 is limited from being designed thinner and it will possibly be impossible to meet the future demand for a thinner design of the mobile communications terminal or the like such as the portable phone which uses the multi-functional switch 11.

Secondly, since with the multi-functional switch 11, an option can be selected by rotating the roller 11A and the selected option can be set by pressing the roller 11A after the selection, so the selecting and setting operations cannot be distinguished from each other. The users will not possibly be able to make a distinction between the selecting and setting operations. Namely, the following will be possible. A user intending to rotate the roller 11A will eventually press the latter because he or she has rotated the roller 11A with an excessive force, and thus he will set an undesired option. On the other hand, a user intending to press the roller 11A in order to set a selected option will rotate the latter because he or she has applied a force to the roller 11A in a wrong direction, and thus he will select a wrong or undesired option.

DISCLOSURE OF THE INVENTION

Accordingly, the present invention has an object to overcome the above-mentioned drawbacks of the aforementioned information input device and an electronic apparatus such as a portable phone using the information input device by providing a novel and improved information input device and electronic apparatus using the information input device.

The present invention has another object to provide an information input device of a thinner design and a thinner and more compact mobile communications terminal such as a portable telephone or a thinner and more compact electronic apparatus such as a personal digital assistance (PDA), using the information input device.

The present invention has another object to provide an information input device constructed simply and having a wider variety of input functions and a simply constructed electronic apparatus such as a portable phone, using the information input device.

The present invention has another object to provide an information input device allowing the user to operate the unit for positive selection of information with no possibility of confusing the selecting and setting functions with each other at the time of making input of the information, and an electronic apparatus such as a portable phone unit using the information input device.

The present invention has another object to provide an information input device including a rotating member with which the user feels a clicking (detent) at time he or she rotates the rotating member through a predetermined angle and which is to be rotated at a predetermined angular pitch with such a detent or clicking, which assures a good feeling in operation of the rotating member, and an electronic apparatus such as a portable phone using the information input device.

The above object can be attained by proving an information input device including a disk-shaped rotating member rotatable in forward and backward directions, a rotation detecting means for detecting a rotation of the rotating member, and a peripheral-press detecting means for detecting a peripheral portion, apart from the center of rotation, of the rotating member. In the information input device, the rotation detecting means detects a rotation of the rotating member which is rotatable by operating one of the main sides thereof. So, it is possible to detect a rotated extent of the rotating member on the basis of a detection output from the rotation detecting means. In the information input device according to the present invention, the disk-shaped rotating member can be rotated by operating any portion of the one main side thereof, which facilitates the input of information by operating the rotating member. Also, the information input device will not be thicker even if the rotating member has an increased diameter. Therefore, an electronic apparatus in which the information input device according to the present invention may not be designed thick.

In the above information input device according to the present invention, since there is provided the peripheral-press detecting means, so an option or information can also be entered by pressing a portion, apart from the center of rotation, of the rotating member, which adds to the variety of input functions.

Further, in the above information input device according to the present invention, the peripheral-press detecting means consists of a plurality of peripheral switches each capable of being turned on or off or a shift between on and off states each time a portion, apart from the center of rotation, of the rotating member is pressed. In the information input device, there can be provided under the portion, apart from the center of rotation, of the rotating member, the peripheral-press detecting means composed of the plurality of peripheral switches each capable of being turned on or a shift between on and off states each time the rotating member is pressed.

Further in the above information input device according to the present invention, a central input means is provided at the center of rotation of the rotating member. With the information input device, a selection made by a rotation of the rotating member, detected by the rotation detecting means, and/or an input of a detection by the peripheral-press detecting means can be set using the central input means or a central switch activator.

The central input means is composed of a central switch activator provided at the center of rotation of the rotating member movably in the direction of the center of rotation, and a central switch which is turned on or off or makes a shift between on and off states each time the central switch activator is operated. The central switch is turned on or otherwise operated when the central switch activator is operated.

In the above information input device according to the present invention, a rotated extent and direction of the rotating member are detected by the rotation detecting means, and when the central input means or central switch activator is operated with an option having been selected according to the result of the detection of the rotated extent and direction by the rotating detecting means and/or the result of the press by the peripheral-press detecting means, the selected option is set. By activating the central switch by operating the central switch activator provided at the center of rotation of the rotating member, the information input device can set information selected by pressing a portion, apart from the center of rotation, of the rotating member. Since the rotating member is operated at a portion thereof for selecting information while it is operated at another portion for setting selected information, the user will not possibly confuse the selecting and setting functions with each other at the time of making input of information.

In the above information input device according to the present invention, there may be provided on any one of the rotating member and the member supporting the rotating member a plurality of detent recesses or projections disposed at a constant angular pitch along one circle taking, as the center thereof, the center of rotation of the rotating member, while there may be provided on the other a plurality of detent projections which are loose-fitted in the plurality of detent recesses or a plurality of detent recesses in which the plurality of detent projections are loose-fitted, to thereby allow the rotating member to rotate while making resistance against the rotation. Thus, when the user rotates the rotating member, he or she can feel clicking (detent) at each rotation at the angular pitch. That is, the user can rotate the rotating member taking the detent as a minimum angular pitch.

According to the present invention, the number of parts and thickness of the information input device itself can be reduced by forming the rotating member from a single member.

Also the above object can be attained by providing an information input device including a rotating member, a holder for holding the rotating member from below while allowing the rotating member to rotate, and a rotation detecting means composed of a rotation detect electrode provided on the lower side, at the side of the holder, of the rotating member and brushes which are in elastic contact at one end thereof with the electrodes. The rotation detect electrode consists of a common portion which is in contact with one of the plurality of brushes irrespectively of any rotation angle of the rotating member, and multiple rotation detecting portions disposed at a constant angular pitch so that they will be in or out of contact with the other brush. The rotating member is formed from a single member. In the information input device in which a rotated extent of the rotating member or a rotated extent and direction of the rotating member is detected by a rotation detecting means composed of the rotation detect electrode formed on the rear side of the rotating member and the plurality of brushes which are in contact with the rotation detect electrode, since the rotating member composed of a plurality of, two for example, members is formed from a single member, so the number of parts and thickness of the information input device itself can be reduced correspondingly.

The above information input device according to the present invention has a central switch activator provided at the center of rotation of the rotating member, and a switch which is turned on or off or makes a shift between on and off states when the central switch activator is operated. Thus, a selection made by a rotation of the rotating member and detected by the rotation detecting means can be set by activating the switch by operating the central switch activator. By providing a plurality of switches each of which is turned on or off or makes a shift between on and off states when a portion, apart from the center, of the rotating member is pressed, pressing the portion, apart from the center of rotation, of the rotating member enables to make an entry which can also be made by operating the plurality of switches.

In the above information input device according to the present invention, the rotating member has formed in the center thereof a central hole through which the central switch activator is inserted, it has formed integrally with the inner circumference of the central hole central cylinder extending downward and it has formed a holder engagement portion on the inner circumference of the central cylinder, the holder has formed in the center thereof a central hole through which the central cylinder is inserted and also has formed in the central hole a rotating member engaging portion which engages on the holder engagement portion. With the central cylinder of the rotating member being inserted through the central hole in the holder from above and the holder engagement portion being engaged on the rotating member engagement portion, the rotating member can be held rotatably on the holder. Because of this construction, the holder engagement portion and rotating member engagement portion may be engaged on each other directly or indirectly via a fixing ring.

In the above information input device, since the holder is covered at the top thereof with the rotating member and also the inner circumference of the holder is covered with the central cylinder formed in the rotating member, so no upward gap will take place at the central side of the holder between an operation dial and holder. Therefore, dust or water will not possibly come to the top of the holder from the center of the rotating member, whereby the information input device has an improved dust-tightness and water-tightness.

Further in the above information input device according to the present invention, the rotating member has formed along the circumference thereof a skirt portion extending downward and covering around the holder. Therefore, no upward gap will take place between the holder outside and operation dial. The skirt portion prevents external dust and water from coming inwardly between the operation dial and holder. Thus, the information input device is improved in dust-tightness and water-tightness.

Also the above object can be attained by providing an information input device including at least a rotating member, a holder which holds the rotating member rotatably, a rotation detecting means composed of a rotation detect electrode consisting of a common portion provided on the lower side, at the side of the holder, of the rotating member and multiple rotation detecting portions, and a plurality of brushes which are in contact with the rotation detect electrode, and a printed wiring board provided beneath the holder and having wires electrically connected to at least the brushes. The holder has formed therein a plurality of through-holes for receiving the brushes therein, respectively. The brushes received in the brush receiving through-holes are connected at their one ends to the wires of the printed wiring board, and are or can be in contact, at the other ends, with the common portion or rotation detecting portions of the rotation detect electrode. In the information input device, since each of the brushes is connected at the end thereof at the side of the printed wiring board directly to a wiring pattern on the upper side of the printed wiring board provided beneath the holder, the brush and printed wiring board can electrically be connected to each other correctly with a high reliability. Each brush is provided curled between the wiring pattern on the upper side of the printed wiring board provided beneath the holder and the portion, where the rotation detect electrode is formed, of the bottom of the operation dial on the upper side of the holder, and thus it is not exposed bare so much. Therefore, the brushes are not easily attacked and will thus have a longer life.

Also the above object can be attained by providing an information input device including a central switch activator provided at the center of rotation of a rotating member, and a plurality of switches each being turned on or off or making a shift between on and off states when the central switch activator is operated. Thus, an input of a selection made by a rotation of the rotating member, detected by the rotation detecting means, can be set by activating the switch by the central switch activator.

Also in the above information unit, the plurality of switches, which is turned on or off or make a shift between on and off states each time a portion, apart from the center of rotation, of the rotating member is pressed, permit to make input of an option or information by pressing a portion, apart from the center of rotation, of the rotating member.

Also, the switch or plurality of switches, activated when the rotating member is pressed, is or are provided on the rear side of the printed wiring board with the terminal or terminals thereof being connected to the wiring pattern on the printed wiring board. The switch or switches is or are installed to the bottom of the printed wiring board with the upper side down to make it difficult for dust or water to stick to, or attack, the switch surface or surfaces.

The base is disposed below the printed wiring board, and there is provided in a position on the base, corresponding to the switch, a projection which receives, from below, the switch when it is pressed from above. Thus, when the switch is activated, the projection will support the switch applied with the force of operation, thereby allowing the switch to operate positively.

Also the above object can be attained by providing an information input device including a rotating member and a disk-shaped or annular magnet provided circumferentially of the rotating member and having poles alternately different in polarity from each other. The magnet supports the rotating member rotatably on at least a part thereof. This part of the magnet detects a strength of a magnetic field on a magnet pole the rotating member in rotation passes over. A rotated extent and/or direction of the rotating member can be detected from the result of the detection. In this information input device, since a magnetic field developed by the magnet provided on the rotating member is detected in a non-contact manner, not with the brushes being put in elastic contact with the rotation detect electrode of the rotation detecting means, there is no large gap for interposition of the brush between the rotating member and base. Thus, the information input device according to the present invention can be designed thinner than the conventional one.

Also the above object can be attained by providing an information input device including a rotating member, a magnet having a plurality of sets of N and S poles and disposed at a constant angular pitch on the circumference of a circle taking, as the center thereof, the center of rotation of the rotating member, and a hall element provided on at least a part of the base to detect a strength of a magnetic field developed by each set of N and S poles of the magnet, passing over that part as the rotating member is rotated. In this information input device, as the rotating member is rotated, the magnetism of the magnet acting on the hall element on the base supporting the rotating member varies. Thus, a rotated extent of the rotating member can be detected by detecting an output from the hall element. More specifically, each time the rotating member is rotated the pitch at which the N and S poles of the magnet are disposed, the hall element produces an output pulse of one period. By counting the output pulses (periodicity), it is possible to detect a rotated extent of the rotating member. In the information input device, since a magnetic field developed by the magnet provided on the rotating member is detected in a non-contact manner by the hall element provided on the base, not with the brushes being put in elastic contact with the rotation detect electrode of the rotation detecting means, there is no large gap for interposition of the brush between the rotating member and base. Thus, the information input device according to the present invention can be designed thinner than the conventional one.

Also the above object can be attained by providing an information input device including a rotating member, a central switch activator provided at the center of rotation of the rotating member, and a switch provided on the base to operate in response to an operation of the central switch activator. An input made by rotating the rotating member can be set by activating the switch by operating the central switch activator. In this information input device, since a magnetic field developed by the magnet formed on the rotating member is detected by a hall element to detect a rotation of the rotating member in a non-contact manner, the base and rotating member may not be disposed in any high-precision geometry (vertical positional relation). Therefore, even with the central switch activator provided on the base where there is also provided the hall element, both rotation detection and switch operation are possible with improved reliability. Further, the base and rotating member may be disposed in a positional relation whose precision is not so high and the gap between the base and rotating member may be small, so that pressing the rotating member enables activation of the switch on the base even with no intermediate member (such as the aforementioned holder) being interposed between the base and rotating member. Therefore, the information input device can be constructed from a reduced number of parts and can also be designed thinner.

Also in this information input device, there is provided on the base a plurality of switches which are activated when a portion, apart from the center of rotation, of the rotating member. By pressing a portion, apart from the center of rotation, of the rotating member, each of the switches can be activated to make an input. Also, since a rotation of the rotating member is detected in a non-contact manner through detection, by the hall element, of a magnetic field developed by the magnet formed on the rotating member, the base and rotating member may be disposed in any positional relation with each other (vertical positional relation). Therefore, even with the central switch activator provided on the base where the hall element is also disposed, both rotation detection and switch operation are possible with improved reliability.

Furthermore, the relation in position between the base and rotating member is not limited so strictly and the gap between the base and rotating member is small. Thus, since the switch on the base can be activated by pressing the rotating member without any intermediate member (such as the holder) being interposed between the base and rotating member, the information input device can be constructed from a reduced number of parts and thus can be designed thinner.

In the above information input device, the base is covered over the upper side thereof including the side having the switches provided thereon with a sheet having a projection in a position corresponding to each of the switches. Namely, since the projection is thus interposed between the switch and rotating member or central switch activator, each of the switches on the base can positively be activated by pressing the rotating member or central switch activator without having any intermediate member such as the holder interposed between the base and rotating member.

In the information input device, there may be formed directly or indirectly on the base a wiring pattern which leads output from the hall element to outside the apparatus and/or a wiring pattern which leads output from the switches to outside. Thus, the base and the printed wiring board on which the wiring pattern for leading outputs from the hall element etc. to outside is formed may be formed integrally with each other, not separately. With this construction, the information input device can be designed thinner.

In the above information input device, a plurality of hall elements may be disposed in positions displaced an integral multiple of the pole pitch from the magnet poles. In this case, by detecting a rotated direction of the rotating member on the basis of the phase relation between output waveforms from the hall elements, it is possible to detect a rotated extent of the rotating member on the basis of an output from any one of the hall elements as well as to detect a rotated direction of the rotating member on the basis of the relation in phase between the outputs from the plurality of hall elements. It should be noted that the output provided from the hall element when the rotating member is rotated has a sawtooth waveform. By detecting a rotated direction of the rotating member on the basis of which is longer, a time taken for the sawtooth output waveform to change from a reference value to a peak value or a time taken from the waveform to change from the peak value to the reference value, it is possible to detect a rotated direction of the rotating member. This is because a part of the waveform output from the hall element changing from the reference value to the peak value is different from a part of the output waveform changing from the peak value to the reference value when the rotating member is rotated in the same direction and thus the time taken for the output waveform to change from the reference value to the peak value is different in length from that taken for the output waveform to change from the peak value to the reference value. Even if only one hall element is included in the information input device, a rotated extent as well as a rotated direction of the rotating member can be detected, and so the information input device can be constructed from a reduced number of parts, more simply and thus with a lower cost.

Also in the above information input device, a detent magnet magnetically acting upon the pole may be provided on at least a part of a portion other than the portion where a strength of the magnetic field developed by a magnet pole is detected, at the side where the rotating member is rotatably supported. In this case, since the magnet provided on the rotating member and the detent magnet provided at the side where the rotating member is support will magnetically interact with each other, a repulsion will take place between the magnet poles when the poles of the same polarity are put near to each other and an attraction will take place between the magnet poles when the poles of different polarities are put near to each other, so that the user will feel a detent (clicking) each time the hall elements move two times of the pole pitch.

Also the above object can be attained by providing an electronic apparatus having any one of the aforementioned information input devices installed thereon with the entire upper side of the rotating member being exposed for operability of the rotating member from at least outside the apparatus.

According to the present invention, the above electronic apparatus can have the advantages of any one of the aforementioned information input devices.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 18A explains the display screen for enjoyment of a driving game software taking the operation dial as a steering wheel, the display screen showing driving in a state, FIG. 18B shows a display screen showing driving after turning the steering wheel starting with the state in FIG. 18A.

FIGS. 34A to 34C explain together positions where there are disposed two hall ICs provided on the multi-functional switch in FIG. 33 and each of which incorporates a hall element and a difference in phase relation between outputs from the two hall ICs each incorporating the hall element due to a difference in rotation direction of the multi-functional switch, in which FIG. 34A is a plan view explaining the positions where the two hall ICs are disposed, FIG. 34B shows waveforms of outputs from the two hall ICs when the multi-functional switch is rotated in a direction (forward), and FIG. 34C shows waveforms of outputs from the two hall ICs when the multi-functional switch is rotated in a direction (backward) opposite to that in FIG. 34B.

FIGS. 35A to 35E explain together the hall ICs provided on the multi-functional switch in FIG. 33 and each of which incorporates the hall element, and the operation of the hall IC, in which FIG. 35A is a perspective view showing a positional relation of the hall IC to a magnet, FIG. 35B is a circuit diagram of the hall IC, FIG. 35C shows a waveform of a change of magnetic flux density of a magnetic field developed by the magnet passing over the hall IC, FIG. 35D shows a waveform of an output from the hall element, FIG. 35E shows a waveform of an output from an amplification circuit to amplify the output from the hall element and a waveform of an output from a Schmidt-Trigger circuit which shapes the waveform of an analog output from the amplification circuit into a digital waveform.

BEST MODE FOR CARRYING OUT THE INVENTION

Figure 1:
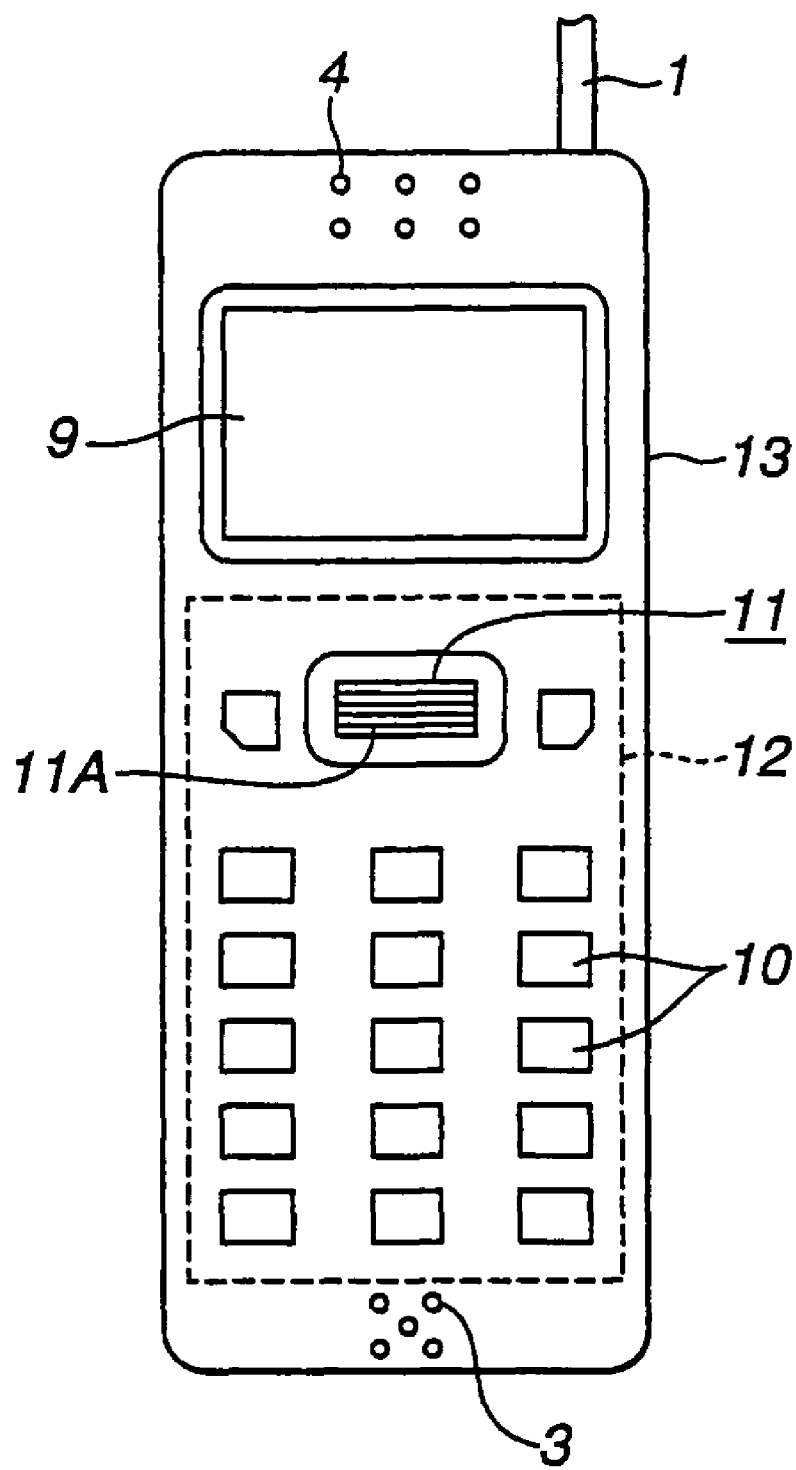
FIG. 1 is a plan view of the portable phone as one of conventional mobile communications terminals, showing the appearance of the portable phone.

The information input device and electronic apparatus using the information input device according to the present invention will be detailed below concerning the embodiments thereof with reference to the accompanying drawings.

Prior to starting the detailed explanation of the present invention, basic modes of carrying out the present invention will be described.

The present invention can be carried out in two modes. In the first mode, an electrode is provided on a rotating member and a brush is provided on a member which supports the rotating member rotatably thereon, and a rotation of the rotating member is detected on the basis of a change in electrical connection between the electrode and brush. In the second mode, a magnet is provided on a rotating member and a magnetic detecting means, for example, a hall element or a hall IC incorporating a hall element, is provided on a member which supports the rotating member rotatably thereon. A rotation of the rotating member is detected through detection, by the magnetic detecting means, of a magnetic change caused by a rotation of the magnet when the rotating member is rotated.

In the first mode, an information input device is basically constructed from a disk-shaped rotating member rotatable with one of the main sides thereof operated, and a rotation detecting means for detecting a rotation of the rotating member, and the information input device is installed to an electronic apparatus, for example, a mobile communications terminal, typically a portable phone, with the one main side of the rotating member being exposed to be operable at least from outside. The rotation detecting means may be one capable of detecting only a rotated extent of the rotating member but it should preferably be a one capable of detecting a rotated extent and direction of the rotating member because input of information can be made in various manners.

The rotation detecting means should preferably be a rotary encoder in which a conductive scale having multiple slits formed at predetermined angular intervals is installed to a rotating member, there are provided at a stationary side a brush which is always in contact with the conductive scale and also a brush which will get out of contact with the conductive scale when it is inserted in one of the slits in the conductive scale, and these brushes are laid in elastic contact with the conductive scale. In this rotary encoder, a change the electrical continuity between the brushes is detected as an electric signal. However, the present invention is not limited to such a rotary encoder. It should be noted that the brush which gets out of contact with the conductive scale when it is inserted in one slit may be provided in each of two places and the interval between points of the two brushes, where they are in contact with the conductive scale, be somehow different from an integral multiple of the slit pitch, whereby it is possible to detect also a rotated direction of the rotating member. This will be described in further detail in the explanation of the embodiment, given later.

Next, the second mode of carrying out the present invention will be discussed. In the second mode, the information input device is basically constructed from a rotating member which can be rotated forward and backward, and a disk-shaped or annular magnet provided circumferentially of the rotating member poles and having poles alternately different in polarity from each other. At least a part of the magnet at the side thereof supporting the rotating member to be rotatable detects a strength of a magnetic field developed by the magnet pole the rotating member in rotation passes over.

More specifically, the information input device includes a rotating member, a magnet composed of a plurality of sets of N and S poles disposed at a constant angular pitch along a circumference of a circle taking, as the center thereof, the center of rotation of the rotating member, a base holding the rotating member rotatably, and a hall element disposed on at least a part of the base to detect a strength of a magnetic field developed by each set of N and S poles of the magnet, passing over the part when the rotating member is rotated. As the rotating member is rotated, a magnetic field developed by the magnet formed on the rotating member passes over the hall element on the base, with the result that the output from the hall element will be changed and a number of pulses, corresponding to a rotated extent of the rotating member, will be produced. At least a rotated extent of the rotating member is detected by counting the pulses.

The above information input device is installed on an electronic apparatus, for example, a mobile communications terminal, typically, a portable phone, with the entire upper side of the rotating member being exposed to be operable at least from outside. In the information input device, the rotation detecting means is a one capable of detecting only a rotated extent of the rotating member but it should preferably be one capable of detecting a rotated extent and direction of the rotating member because input of information can be made in various manners.

Note that for detecting a rotated direction of the rotating member, a first approach is to provide two hall elements and make an interval (angle) between the hall elements, somewhat different from an integral multiple of the disposed pitch of sets of N and S poles of the magnet. In this approach, a rotated direction of the rotating member is detected based on a relation in phase between outputs from the two hall elements, that is, a relation in which the output from one of the hall elements is earlier in phase than the output from the other or vice versa.

A second approach to detect a rotated direction of the rotating member is to detect a rotated direction as well by a single hall element. In this second approach, the hall element used is designed to provide a sawtooth-waveform output of which the leading and trailing edges incline at different angles, respectively, in the same rotating direction of the rotating member, and detect a rotated direction of the rotating member on the basis of which is longer, a time taken for the waveform to change from a reference value to a peak value or a time taken for the waveform to change from the peak value to the reference value. Thus, the detection of a rotated extent and direction of the rotating member can be attained by a single hall element, which will lead to a reduced manufacturing cost of the information input device.

Note that the following can commonly be applied to both the first and second modes:

First of all, a central switch activator is provided at the center of rotation of the rotating member in the information input device and a central switch is provided which is turned on and off by the central switch activator. A state selected by rotating the rotating member can be set by activating the central switch via operating the central switch activator.

A plurality of peripheral switches is provided each of which is operated by pressing a portion, apart from the center of rotation, of the rotating member. Because of this construction, an input can be made by activating any one of the plurality of peripheral switches through rotating the rotating member or pressing the portion, apart from the center of rotation, of the rotating member. Namely, an input can be made in various manners. Also, a selection made by activating the central switch through pressing the portion, apart from the center of rotation, of the rotating member can be set by activating the central switch through operating the central switch activator.

Note that the central switch and peripheral switch may be a push switch which can be turned on when pressed or a switch of any other type which can be turned on and off by detecting a change of capacitance, caused when it is operated. Namely, the central switch and peripheral switch may be of any type. Especially, the central switch may be a one which can only be turned on and off or a one which can be turned on and off by omnidirectional multi-cursoring or by depressing, such as a capacitance detection type XY pointer.

Figure 2:
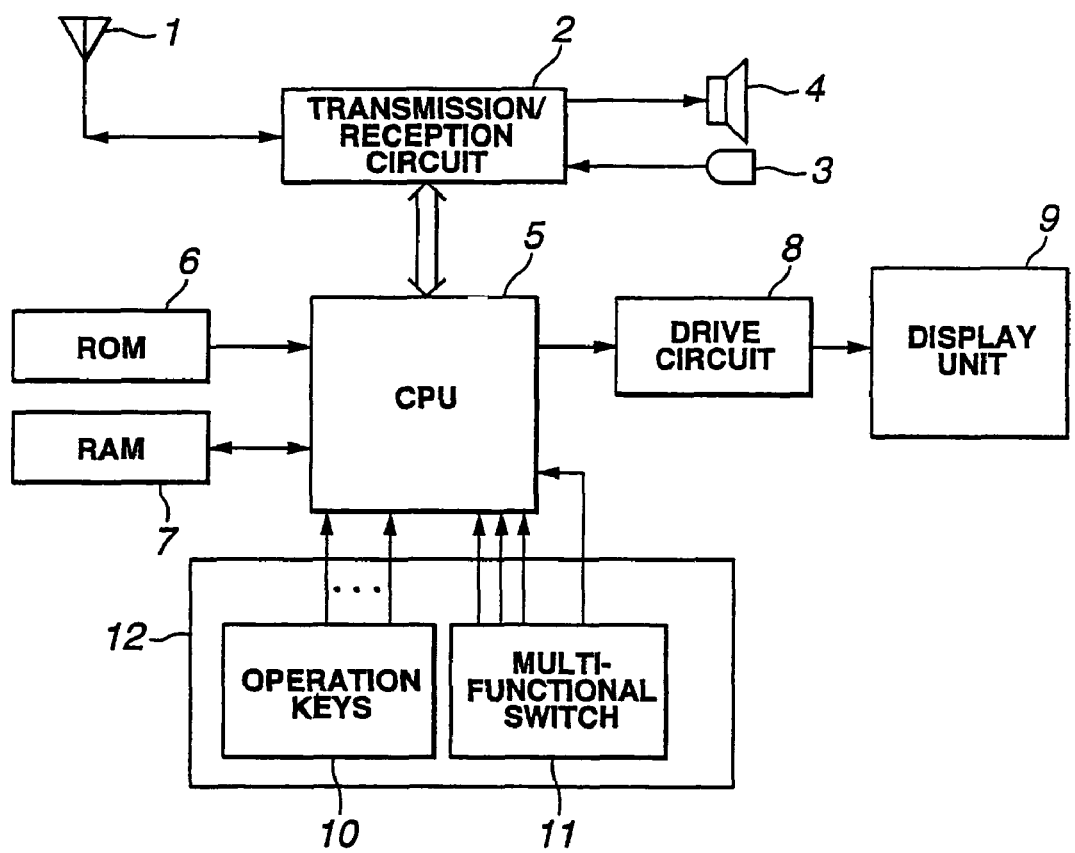
FIG. 2 is a schematic circuit diagram of the portable phone in FIG. 1.
Figure 3:
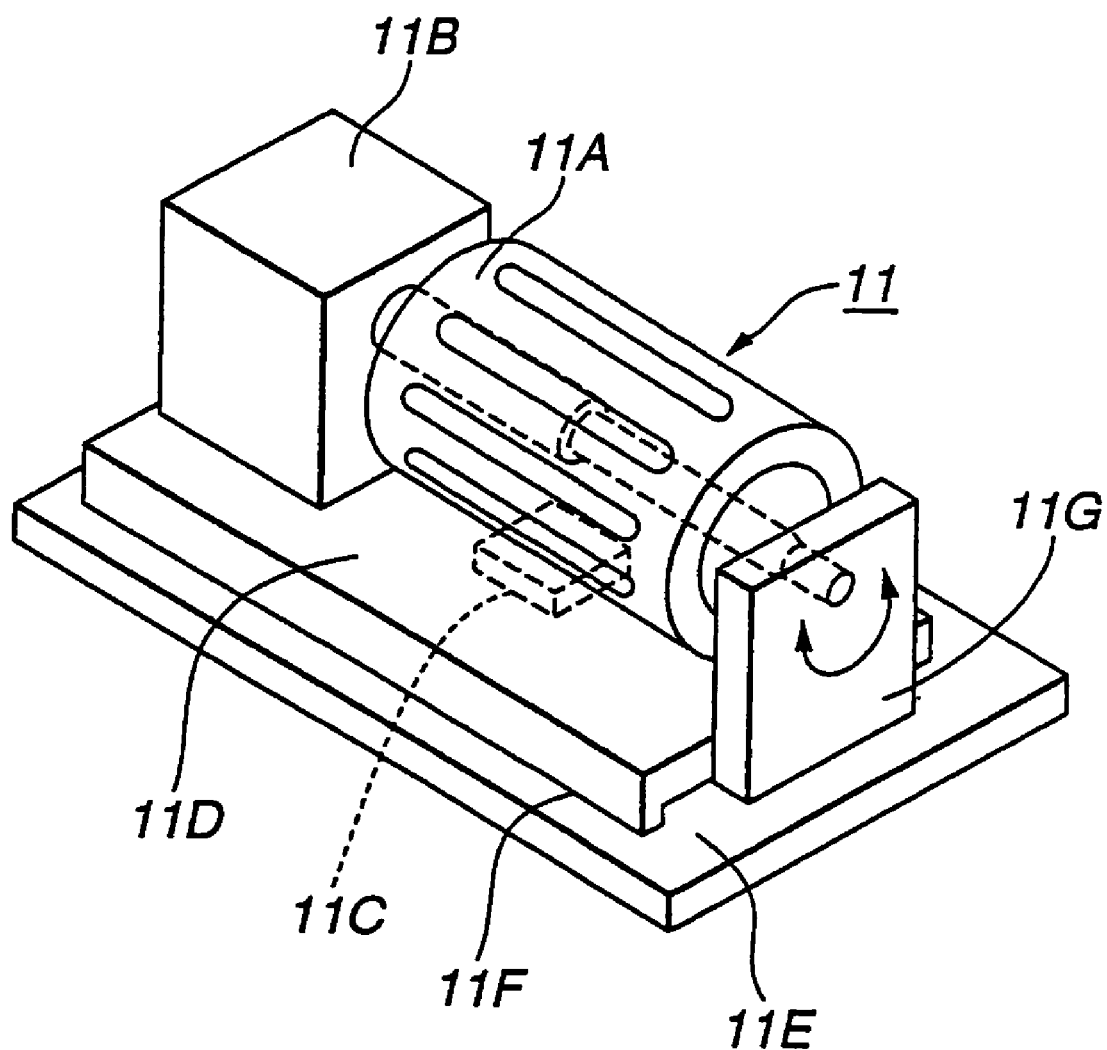
FIG. 3 is a perspective view of the multi-functional switch for use to allow the portable phone to function as a mobile communications terminal.

To make an input by pressing the portion, apart from the center of rotation, of the rotating member as above, the position of one, which can be activated by pressing, of the plurality of peripheral switches may be illuminated. Thus, the user can operate intuitively and instantly the illuminated one of the peripheral switches. In the mobile communications terminal such as portable phone, however, any intuitive suggestion cannot be given to the user in selection of a most appropriate one of the many input functions. That is, in the mobile communications terminal, such as a portable phone, provided with a variety of input functions, it is extremely important for the user to be able to know readily which one of the input functions should be selected. In the information input device in the conventional mobile communications terminal, however, the method of making the user aware of a most suitable one of the input functions at each time of making input of information is only indication, on a display unit, of a guide for that awareness. Namely, the conventional information input device does not include any feature of giving any intuitive suggestion of a most suitable input function by an illumination made on the information input device itself. In this connection, the conventional portable phone, having previously been described with reference to FIGS. 1 to 3 and including the multi-functional switch as one of the information input devices, does not include any means for giving an intuitive suggestion for selection of a best input function by means of an illumination or the like.

Thus, by indicating, by illumination, some of a plurality of positions in which corresponding ones of peripheral switches can be activated by pressing, it possible to suggest the user to intuitively know one of the illuminated peripheral switches that should be operated for a next input. This can be implemented, for example, by forming a to-be-illuminated portion of the rotating member from an optical waveguide and providing a light emitting means at the center of the portion so that light emitted by the light emitting means is guided by the optical guide to be reflected to the front surface of the information input device. For example, any of four lines extending, like a cross line, from the center of the rotating member is illuminated to prompt the user to press a corresponding portion, namely, top, bottom, right or left, of the rotating member. In this case, the portion, outside the light guide, of the information input device has to be formed from a transparent or translucent material.

Further, the rotating member may be constructed so that the rotating member has a regional portion thereof entirely illuminated, not in the cross-line form as above. That is, to prompt the user to rotate the rotating member, such a regional illumination of the rotating member surface, not any illumination of the entire surface, will prompt the user to press a corresponding bright portion, apart from the center of rotation, of the rotating member to make an input. It should be noted that such an illumination of a regional portion can be implemented by providing a member entirely formed from a light guide, providing a light emitting means in the center of the member, guiding light emitted from the light emitting means to all around the member and by reflecting the light to the front side of the information input device.

Below the rotating member, light emitting means such as a LED (light emitting diode) may be provided in a plurality of places where the peripheral switches are disposed, and they may selectively be turned on and off to prompt the user to operate a due peripheral switch.

Note that the rotating member should preferably be rotatable with a detent at each rotation through a fixed angle because the user can easily know, from the detent, when he or she has rotated the rotating member through the fixed angle. To this end, either detent recesses or detent projections, for example, the detent recesses are provided radially at a constant angular pitch on either of the rotating member and a member supporting the rotating member, for example, base, holder or the like, for example, on the rotating member, while either of the detent recesses and detent projections, for example, the detent projections, are provided on either of the rotating member and the member supporting the rotating member, for example, base, holder or the like, for example, on the member supporting the rotating member, in such a manner that the detent projection is loose-fitted in the detent recess to provide an appropriate resistance at each of the pitches at which the detent recesses are provided while allowing the rotating member to rotate. Such detent creating means can be applied to any information input devices according to the present invention.

Note that in the information input device including a rotation detect magnet provided on the rotating member, there may be provided a detent creating means composed of a detent magnet provided on the member supporting the rotating member and which acts on the rotation detect magnet to provide a detent by magnetism acting on both the magnets.

Any information input device according to the present invention can be used in the conventional mobile communications terminal such as the portable phone as well as in a portable distance assistance (PDA) and the like, and also in a variety of electronic apparatuses.

Next, some embodiments of the present invention will be described with reference to the accompanying drawings.

Figure 5:
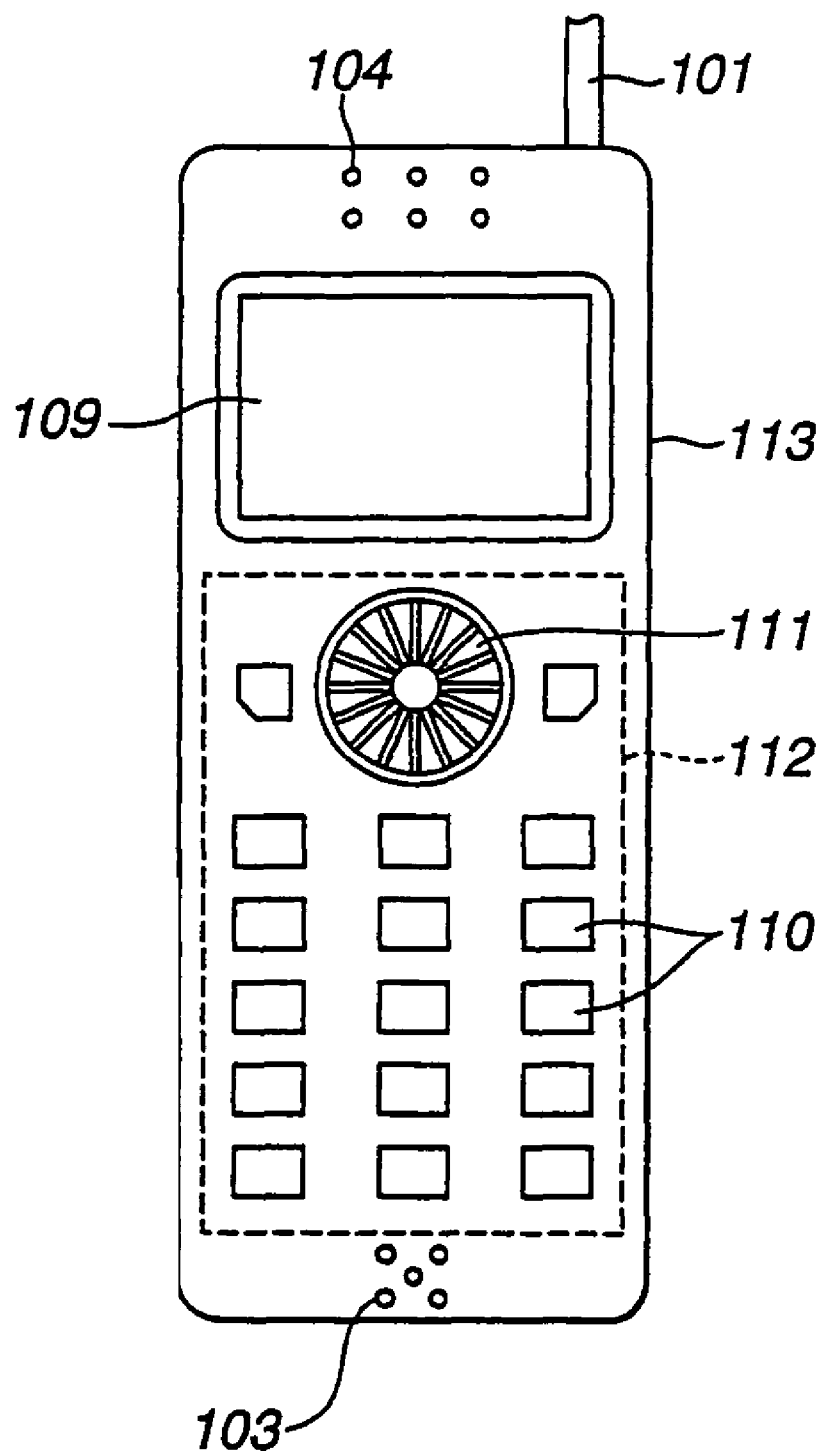
FIG. 5 is a front view of a portable phone as one of mobile communications terminals being electronic apparatuses according to the present invention.
Figure 6:
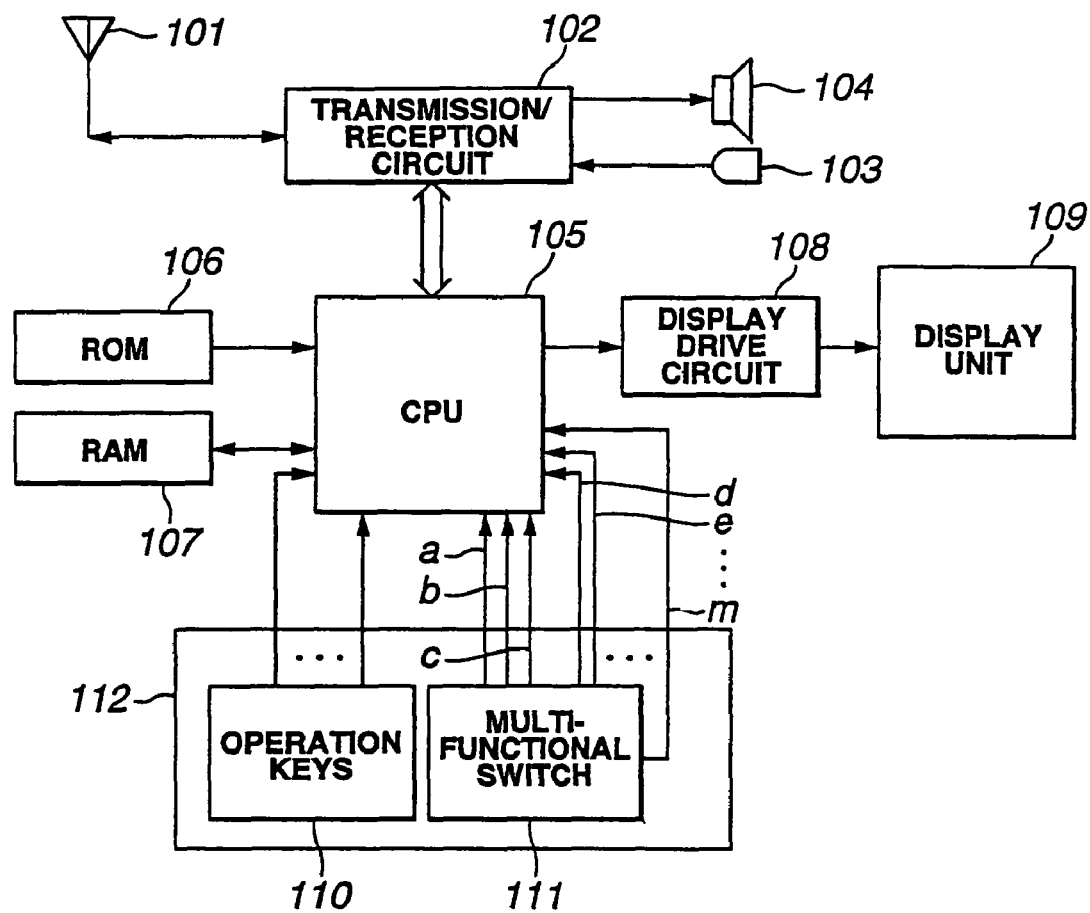
FIG. 6 is a circuit diagram of the portable phone in FIG. 5.

First, the first embodiment of the present invention will be illustrated and described below:

As the first embodiment of the present invention, a portable phone will be described as a typical one of the mobile communications terminals being electronic apparatuses according to the present invention with reference to FIGS. 5 and 6. FIGS. 5 and 6 shows the appearance and circuit construction, respectively, of the portable phone.

As shown in FIGS. 5 and 6, the portable phone according to the present invention includes an antenna 101, transmission/reception circuit 102, microphone 103, speaker 104, CPU (central processing unit) 105, ROM (read-only memory) 106 having stored therein a program and the like executed by the CPU 105, RAM (random-access memory) 107 to provisionally store data necessary for the CPU 105 to execute a program, display drive circuit 108, and a display unit 109 driven by the display drive circuit 108 to display a variety of information. The display unit 109 is formed from a liquid crystal display (LCD) panel. The phone shown in FIG. 5 further includes operation keys 110 and a multi-functional switch 111 which forms the information input device. The operating keys 110 and multi-functional switch 111 form together an operation unit 112.

In the portable phone having a body 113, the antenna 101 is provided at the right upper end of the body 113 as shown in FIG. 5. The antenna 101 is extensible upward. Also, in this portable phone, the speaker 104 is disposed nearly in the middle of the upper end of the apparatus body 113, the display unit 109 is disposed below the speaker 104, the operation unit 112 is disposed below the display unit 109, and the microphone 103 is disposed in the middle of the lower end of the apparatus body 113. The multi-functional switch 111 is disposed in the upper portion of the operation unit 112 and the operating keys 110 including ten keys are disposed below the multi-functional switch 111.

The multi-functional switch 111 provided on the portable phone shown in FIG. 5 will be described in detail below with reference to FIGS. 7 to 13.

Figure 7:
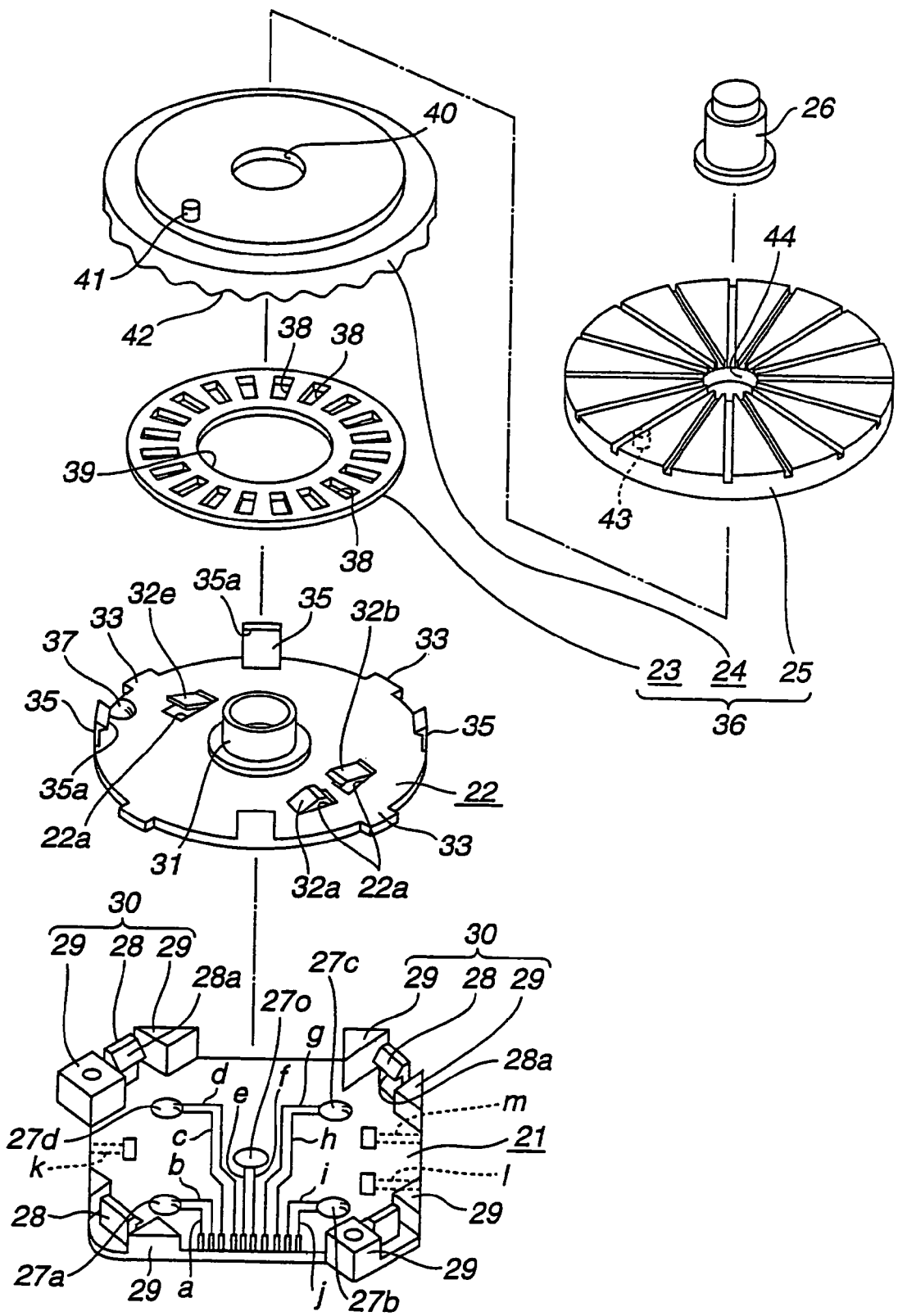
FIG. 7 is an exploded perspective view of a multi-functional switch as a first embodiment of the information input device according to the present invention.

The multi-functional switch 111 used in the portable phone according to the present invention basically consists of a base 21, holder 22, scale 23, dial body 24, dial disk 25 and a central switch presser 26 as shown in FIG. 7.

Figure 9:
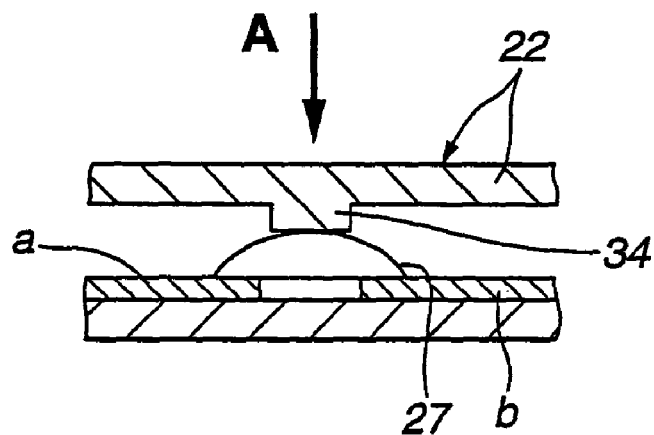
FIG. 9 is a sectional view showing a peripheral switch on a base, being pressed by a switch activating protection provided on the holder.

The base 21 is formed from an insulator, for example, an insulative resin, to have a generally rectangular shape. It has disposed on the front surface thereof five push switches 27o, 27a, 27b, 27c and 27d. Of the push switches, the one 27o is disposed in the center of the base 21 and will be referred to as "central switch" hereinafter. The other push switches 27a, 27b, 27c and 27d are disposed equidistantly from the central switch 27o as the center thereof and with equal angles, for example, 90 deg., between two successive ones. These switches will be referred to as "peripheral switch" hereunder. The push switches 27o, 27a, 27b, 27c and 27d are electrically connected to the CPU 105 via wiring patterns a to formed on the front surface of the base 21 as shown in FIGS. 6 and 9.

As shown in FIG. 7, the reference number 28 indicates a rise limiter. It has formed at the upper end thereof a pawl 28a extending inwardly (toward the center of the base 21). The pawl 28a will limit the rise of the holder 22 to a constant range. As also shown in FIG. 7, a turn limiter 29 is provided at either side of each rise limiter 28 to limit the turn of the holder 22. One rise limiter 28 and two neighboring turn limiters 29 form together a holder rise/turn limiter 30 which is provided at each of the four corners of the base 21.

The holder 22 is basically an insulative disk having a hole formed in the center thereof. It has provided in the front center thereof a dial holding cylinder 31 which holds the dial body 24 rotatably, and has formed therein brush insertion holes 22a through which brushes 32a, 32b and 32e are inserted, respectively. The dial holding cylinder 31 is projected upward from the periphery of the central hole. Each of the brushes 32a, 32b and 32e is formed from a conductive elastic material, and connected to the CPU 105 via a wiring pattern 21b on the rear side of the base 21 as shown in FIG. 6. Wiring patterns are expediently indicated with reference symbols k, l and m, respectively, in FIGS. 5 to 7. How to install the brushes 32 will be described in detail later with reference to FIG. 13.

The brushes 32a and 32b are in contact with portions, where slits 38 are formed, of the scale 23, and the interval between the contact positions is set as preset depending upon the pitch between the slits 38. Therefore, the brushes 32a and 32b are in or out of contact with the scale 23 depending upon an rotation angle of the scale 23. When each of the brushes 32a and 32b has the contact end thereof positioned in the slit 38, it will be out of contact with the scale 23, which will be described in further detail later.

The brush 32e is in contact with portions, where the slits 38 are not formed, of the scale 23 and always in contact with the portions irrespectively of any rotation angle of the scale 23. The brush 32e is a grounding brush. On the periphery of the holder 22, there are formed projections 33 corresponding to the holder rise/turn limiters 30. The rise and turn of the projections 33 are limited by the limiters 30. The holder 22 is disposed on the base 21 with each of the projections 33 being limited by the holder rise/turn limiter 30 from rising and turning.

More specifically, for disposition of the base 21 on the holder 22, the holder 22 is applied to the base 21 for each projection 33 to come onto a corresponding one of the limiters 30, the pawl 28a is pressed by the projection 33 to bend the rise limiter 28 outwardly against its elasticity, and each projection 33 is thus positioned below the pawl 28a and between the turn limiters 29. Thus, limited from turning and from rising (the rise is limited to within a predetermined range), the holder 22 is held on the base 21.

Figure 8:
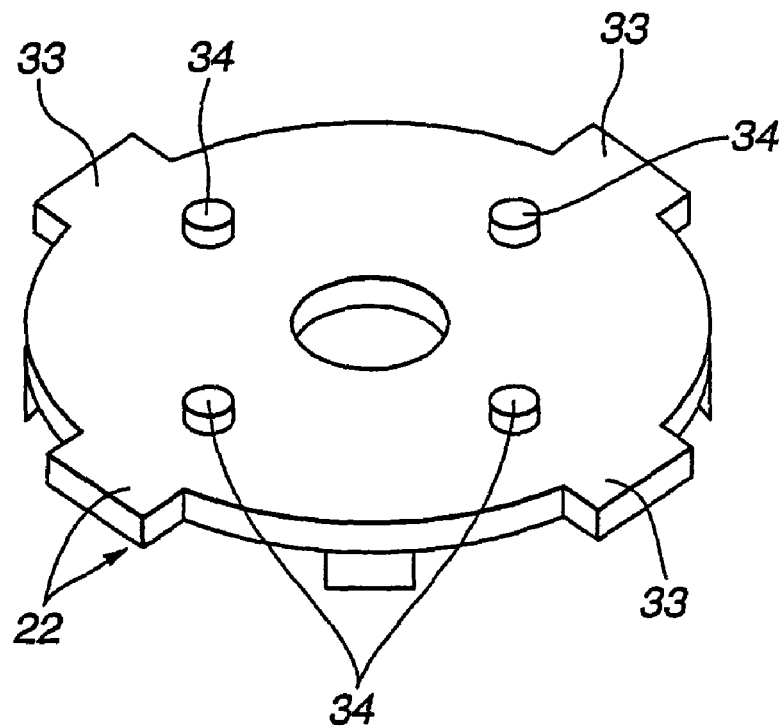
FIG. 8 is a perspective view, from the rear side, of a holder included in the information input device in FIG. 7.

On the rear side of the holder 22, there are provided switch pressing projections 34 in positions corresponding to the peripheral switches 27a, 27b, 27c and 27d as shown in FIG. 8. Each of the projections 34 on the holder 22 is positioned to be on a corresponding one of the peripheral switches 27 as shown in FIG. 9. When a pressure is applied in the direction of arrow A in FIG. 9, the peripheral switch 27 is turned on. It should be noted that each switch 27, whichever it is, a central switch or a peripheral switch, will be applied with a weight of the members forming together the multi-function switch 111. However, it will not be turned on with the weight of such members but it will only be turned on when it is applied with a pressure by the human finger. It should also be noted that the holder 22 may be held by a spring not to be in contact with the switches 27 on the base 21 so that the switch 27 can only be turned on when the holder 22 is pressed against the action of the spring.

On the periphery of the holder 22, there is formed a plurality (four, for example) of dial body retainers 35 spaced from each other and projecting to the front side of the holder 22. Each of the dial body retainer 35 has formed at the upper end thereof a retaining pawl 35a extending toward the center of the holder 22. The dial body 24 having the scale 23 fixed to the rear side thereof is held rotatably by the dial body retainers 35, and the dial body 24 is prevented by the retaining pawls 35a from being disengaged. The holder 22 has a detent projection 37 formed thereon. The detent projection 37 will fit in a concavity of detect concavities and convexities 42 (will further be described later) formed on the dial body 24 for the user to feel a detent or clicking when he or she rotates an operation dial 36 consisting of the dial body 24 and dial disk 25. The user can rotate the operation dial 36 taking the detent or clicking as a predetermined minimum angular pitch.

The scale 23 has the multiple slits 38 are formed radially at a constant angular pitch full circumferentially thereof near the outer circumference, and has formed in the center thereof a hole 39 through which the dial holding cylinder 31 is inserted. The scale 23 is fixed to the rear side of the dial body 24. The dial body 24 has formed in the center thereof a hole 40 through which the dial holding cylinder 31 is inserted, and has a power transmission projection 41 formed on the front surface thereof. The power transmission projection 41 is fitted in a power transmission concavity 43, which will further be described later, formed in the rear side of the dial disk 25 to transmit a rotation of the dial disk 25 to the dial body 24.

Figure 10:
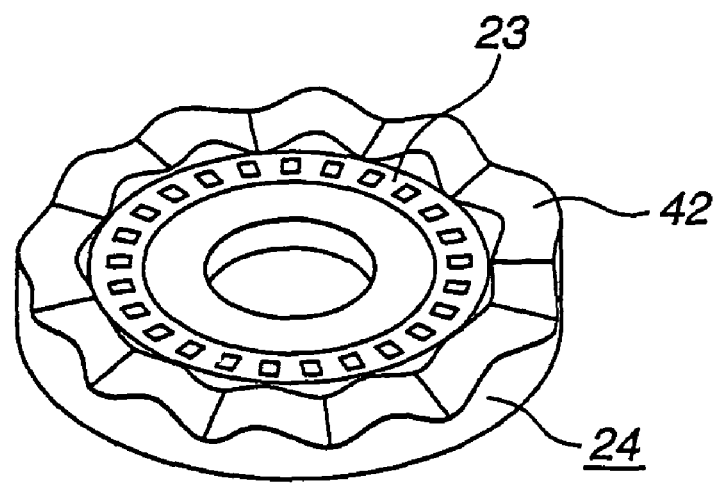
FIG. 10 is a perspective view, from the rear side, of a dial body.
Figure 11:
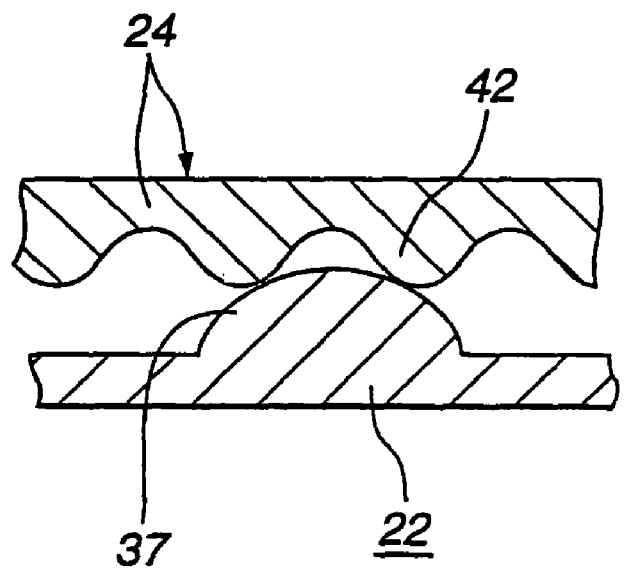
FIG. 11 is a sectional view showing a detent projection on the holder, being in contact with detent projections and recesses on the holder body.

The dial body 24 has wavy detent convexities and concavities 42 formed all along the rear circumferential edge thereof as shown in FIG. 10, and the aforementioned detent projection 37 is loose-fitted in the concavity 42 as above. FIG. 10 is a perspective view, from the rear side, of the dial body 24, showing the dial body 24 having the scale 23 fixed to the rear side thereof, and FIG. 11 is a sectional view showing the detent projection 37 formed on the holder 22 and the convexities and concavities 42 being in contact with the detent projection 37.

Figure 12:
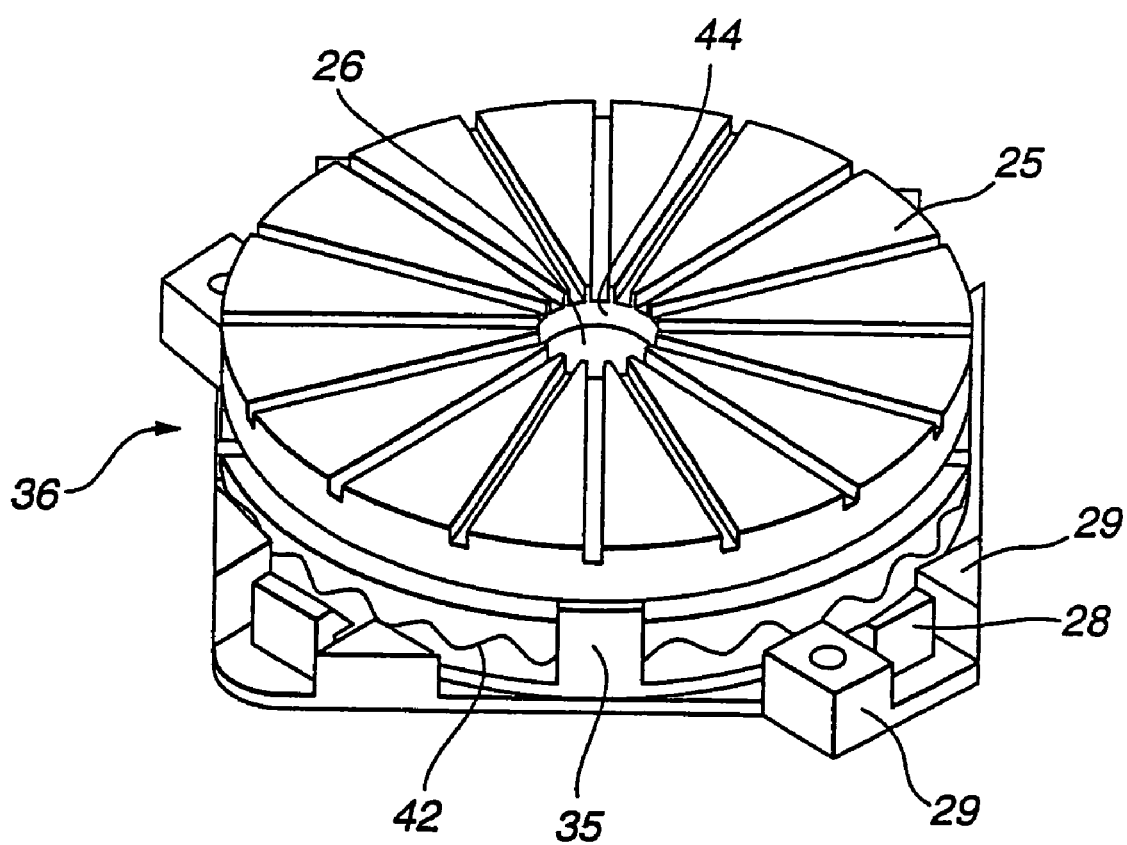
FIG. 12 is a perspective view of the first embodiment of the information input device according to the present invention, which is shown in FIG. 7.

As above, the dial disk 25 has formed therein the power transmission concavity 43 in which the power transmission projection 41 on the dial body 24 having the scale 23 fixed to the rear side thereof, and has formed in the center thereof a central hole 44 through which the central switch presser 26 is inserted. Further, the dial disk 25 has formed on the front side thereof multiple radially extending recesses which cause appropriate friction on the user's finger when he or she turns the dial disk 25, to assure that the dial disk 25 can positively be operated. The dial disk 25 is removably superposed on the surface of the dial body 24 having the scale 23 fixed to the rear side thereof to form the operation dial 36. Specifically, the dial body 24 is installed rotatably to the base 21 by introducing the holding cylinder 31 on the holder 22 into the central holes 40 and 39 formed in the dial body 24 and scale 23, respectively, applying the dial body 24 to the front surface of the holder 22 for the periphery thereof to come onto the retaining pawls 35a of the dial body retainers 35, and forcing the dial body 24 at the periphery thereof to the retaining pawls 35a to bend the dial body 24 outwardly against the elasticity of the retainers 35 and thus lower the periphery of the dial body 24 to below the retaining pawls 35a. The holder 22 is installed to the base 21 with the central switch presser 26 being introduced from below through the holding cylinder 31 of the holder 22. More specifically, by applying, to the base 21, the holder 22 holding the dial body 24 rotatably for the projections 33 to come onto the pawls 28a of the rise limiters 28 of the holder rise/turn limiters 30 and pressing the projections 33 on the holder 22 against the elasticity of the rise limiters 28, the rise limiters 28 will be opened out, the projections 33 can be forced in, the rise limiters 28 will restore their initial states after completion of forcing in the projections 33, and the holder 22 will be limited against any rise by the pawls 28a and thus held on the base 21 not to be rotatable. Thereafter, the dial disk 25 is superposed on the dial body 24 for the top of the central switch presser 26 to come into the central hole 44 in the dial disk 25, thereby building up the multi-functional switch 111. FIG. 12 is a perspective view of the multi-functional switch 111.

The dial disk 25 is installed to a portable phone as an electronic apparatus for the main surface thereof to be fully exposed even when only the periphery thereof is covered with a case.

How to install the brushes 32 will be described below with reference to FIG. 13. It should be noted that the following description is directed to only one of the brushes 32 but the rest are similarly installed.

The brush 32 (32e, 32a and 32b) is put at the base portion thereof in a brush fixing hole 21a formed in the base 21 and also at the base put in contact with the wiring pattern 21b on the bottom of the base 21. The brush 32 is inserted at the stem portion thereof through a brush insertion hole 22a in the holder 22, and the free end of the brush 32 is in contact, at the free end thereof, with the rear side of the scale 23 or is in the slit 38 in the scale 23.

The multi-functional switch 111 constructed as above functions as will be described below:

First, when the dial disk 25 is rotated, the operating force applied to the dial disk 25 is transmitted to the dial body 24 via the power transmission projection 41 fitted in the power transmission concavity 43 formed in the dial disk 25, and thus the dial body 24 is rotated. Then, the scale 23 fixed to the rear side of the dial body 24 is rotated along with the dial body 24, the electrical connection between the brushes 32a and 32b and the scale 23 is changed. For example, when the brush 32a is in the slit 38, it is not connected to the scale 23 and thus it is not electrically connected to the brush 32e normally connected to the scale 23. On the contrary, when the brush 32a is in a portion, where no slit 38 is formed, of the scale, it is in contact with the scale 23, and so it is electrically connected to the brush 32e. Therefore, a change in electrical continuity between the brushes 32a and 32e can be detected as a pulse to produce a pulse of one period each time the operation dial 36 is rotated for the disposed pitch of the slits 38. Thus, a rotated extent of the operation dial 36 can be detected by counting such pulses.

Note that in a construction of the multi-functional switch 111 in which only a single brush 32 is moved to a position where a slit 38 is provided or a position where no slit 38 is provided as the operation dial 36 is rotated, it is possible to detect a rotated extent of the operation dial 36, but not any rotated direction. On this account, two brushes 32 are provided to detect a rotated direction, in addition to a rotated extent, of the operation dial 36. Namely, the two brushes 32a and 32b are moved to a position where there is a slit 38 or to a position where there is no slit 38 when the operation dial 36 is rotated to detect whether an electrical continuity is established between the brush 32a and the brush (grounding brush) 32e and also whether the brushes 32b and 32e are electrically connected to each other.

The interval between points of the two brushes 32a and 32b, where they are in contact with the scale 23, is somehow different from an integral multiple of the disposed pitch of the slits 38. With the integral multiple of the disposed pitch of the slits 38, an output pulse issued depending upon whether the brush 32a and grounding brush 32e is electrically connected to each other or not (will be referred to as "pulse associated with the brush 32a" hereinafter) will be quite the same as an output pulse issued depending upon whether the brush 32b and grounding brush 32e are electrically connected to each other or not (will be referred to as "pulse associated with the brush 32b" hereinafter). That is, the output pulses rise at the same timing and fall at the same timing.

With the position of the brush 32a being displaced from that of the brush 32b, namely, with the interval between points of the two brushes 32a and 32b, where they are in contact with the scale 23, being made somehow different from an integral multiple of the disposed pitch of the slits 38, the output pulse associated with the brush 32a will rise and fall with a gap the rise and fall, respectively, of the output pulse associated with the brush 32b. The gap between the rise or fall times vary depending upon a rotated direction of the operation dial 36. Therefore, a rotated extent of the operation dial 36 can be detected through detection of a gap between the rise or fall times.

Figure 14A:
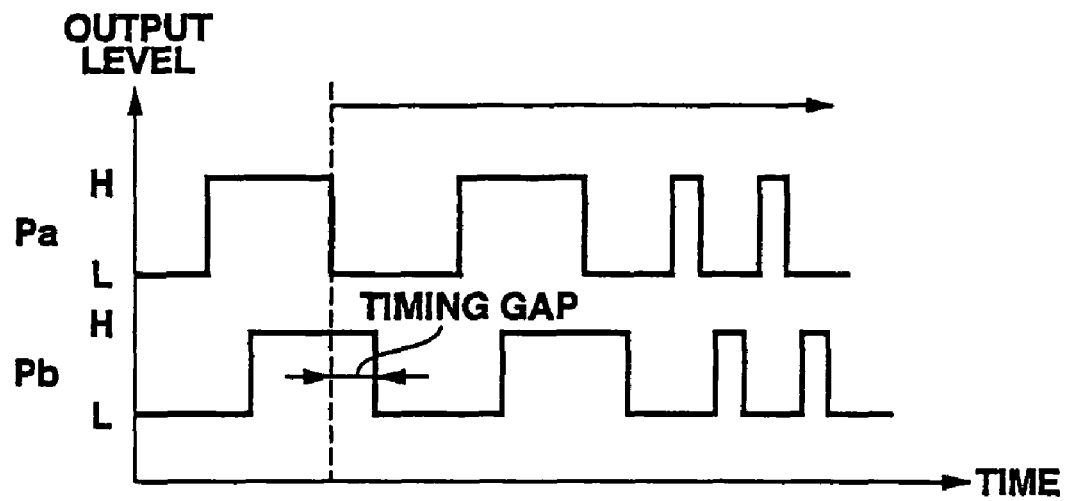
FIG. 14A shows waveforms of two output pulses provided from a rotation detecting means in the information input device in FIG. 12 when an operation dial is rotated in a direction.

The above will further be described with reference to FIGS. 14A and 14B. As will be seen from FIG. 14A showing waveforms of two output pulses associated with the brushes 32a and 32b when the operation dial 36 is rotated in a direction, an output pulse Pb associated with the brush 32b falls after an output pulse Pa associated with the brush 32a falls, with a timing gap because the interval between points, where the brushes 32a and 32b are in contact with the scale 23, is somewhat different from an integral multiple of the disposed pitch of the slits 38. In this case, a rotated extent of the operation dial 36 is measured by counting the output pulses Pa having first fallen.

Figure 14B:
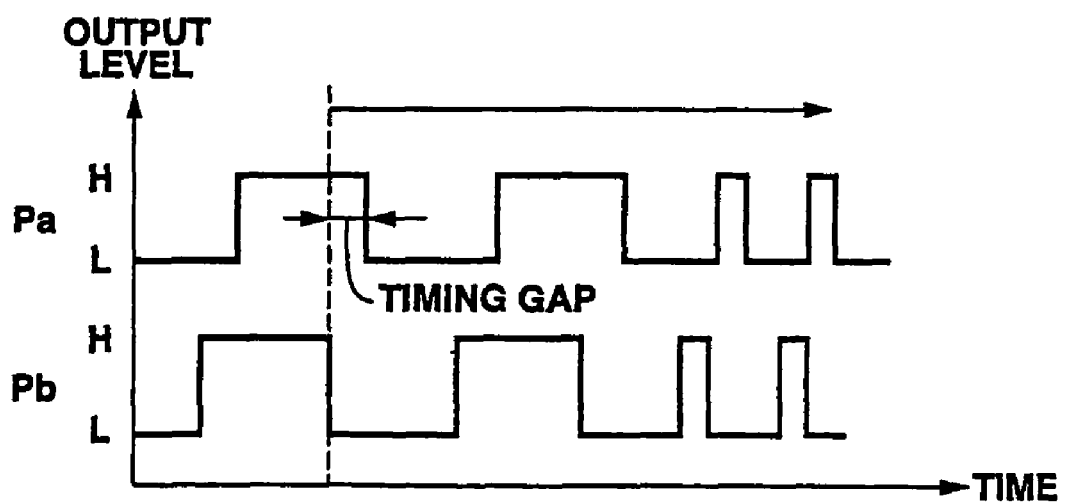
FIG. 14B shows waveforms of two output pulses provided from the rotation detecting means when the operation dial is rotated in a direction opposite to that in FIG. 14A.

As seen from FIG. 14B showing waveforms of two output pulses associated with the brushes 32a and 32b when the operation dial 36 is rotated in a direction opposite to that in FIG. 14A, the output pulse Pa falls after the output pulse Pb falls, which is reverse to that in FIG. 14A. In this case, a rotated extent of the operation dial 36 is detected by counting the output pulses Pa having first fallen. Through detection of which falls first, the output pulses Pa and Pb, a rotated direction of the operation dial 36 can be detected.

As above, by rotating the dial disk 25 of the operation dial 36, it is possible to make input of a rotated direction and rotated extent of the dial disk 25. Therefore, it is possible to make input of a scrolled direction of a cursor or the like by a rotated direction of the dial disk 25 and a scrolled extent by a rotated extent of the dial disk 25.

Next, an input operation by pressing the operation dial will be described. Input of information can be made by pressing a portion, lower, right, upper or left in relation to the center, of the operation dial 36 to turn on a corresponding one or two neighboring ones of the switches 27a, 27b, 27c and 27d. For example, pressing the portion, lower than the center, of the operation dial 36 will permit to turn on the switch 27a by means of the holder 22 and switch pressing projection 34. Similarly, by pressing the portion, right to the center, of the operation dial 36, the switch 27b can be turned on. Pressing the portion, upper than the center, of the operation dial 36 turns on the switch 27c. Pressing the portion, left in relation to the center, of the operation dial 36 turns on the switch 27d.

Therefore, an input concerning a portion, right, left, top or bottom can be made correspondingly to a portion, pressed, of the operation dial 36. For example, an input concerning a scroll, shift or the like to the right, left, forward or upward can be made by such operation of the operation dial 36. Also, a scroll, shift or the like to the east, west, south or north can be made. Moreover, the operation dial 36 may be adapted to make such an input by pressing any two such neighboring portions, for example, left and lower portions, at a time as well as by pressing, at a time, any one of the portions, upper, lower, right and left in relation to the center of the operation dial 36. The operation dial 36 should be designed so that by pressing such two neighboring portions at a time, input will be made of information concerning an intermediate portion (for example, left lower portion, or southwest in a map).

Information can be made by pressing the central switch presser 26 finally. A selected option should be set by rotating or pressing the operation dial 36. Since a portion, pressed by the finger, of the operation dial 36 for making a selection is different from a portion pressed by the finger for setting the selection, the user will not possibly confuse the selecting and setting functions with each other at the time of making input of information.

Figure 4:
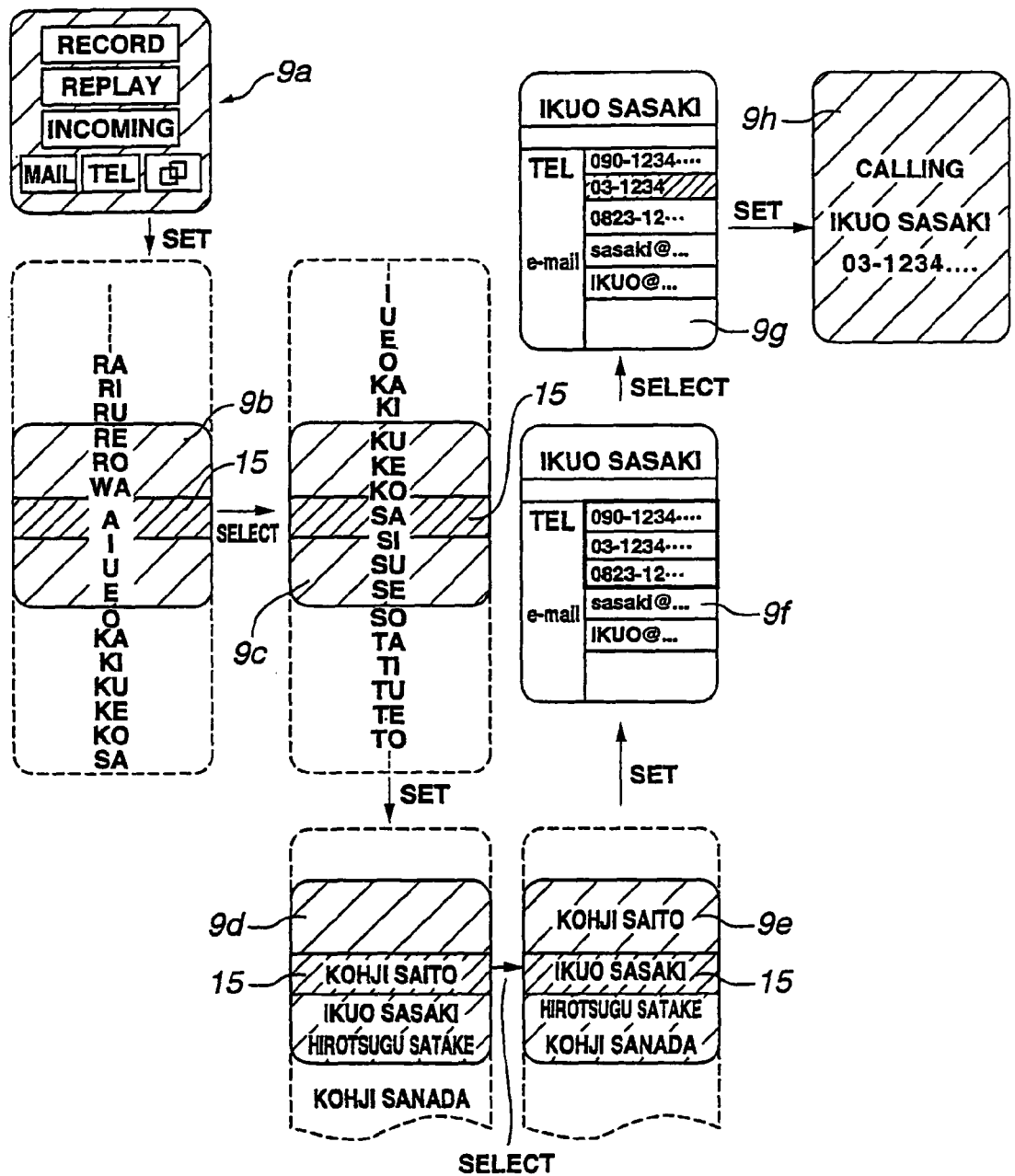
FIG. 4 explains operations for search of a phone directory as one example of the operations of the portable phone.

The search shown in the example of the phone directory search having been described in the explanation of the conventional portable phone with reference to FIG. 4 can also be made with the portable phone according to the present invention.

With the portable phone according to the present invention, however, the cursor scrolling can be selected by rotating the operation dial 36 and set by pressing the central switch presser 26. It should be noted here that in the phone directory search, the menu selection is done by designating a scrolled extent of the cursor by a rotated extent of the operation dial 36 with a rotated direction of the latter, namely, with the scrolled direction being designed as "downward" when the direction is clockwise, for example, or as "upward" when the direction is counterclockwise.

In operations for the selection and setting of a menu in the phone directory search, the multi-functional switch 111 of the portable phone according to the present invention is somehow different due to differences in the structure, theory of operation, etc. from the multi-functional switch 11 in the previously mentioned conventional portable phone. Since these multi-functional switches 111 and 11 are basically similar in such operations to each other, so no further explanation will be made of the menu selection and setting.

In the multi-functional switch 111 applied in the portable phone according to the present invention, since any of the switches 27a, 27b, 27c and 27d can be turned on by pressing the operation dial 36. The multi-functional switch 111 may be designed such that the cursor can be scrolled upward, downward, rightward or leftward by so turning on any corresponding one of the switches 27a, 27b, 27c and 27d. That is, the multi-functional switch 111 is designed so that the cursor can be scrolled line by line downward each time any of the switches, for example, the switch 27a is pressed. In this case, the multi-functional switch 111 may be designed so that the cursor can be scrolled obliquely by pressing the operation dial 36 in such a manner that two neighboring switches, for example, the switches 27a and 27b are turned on at a time.

Figure 15A:
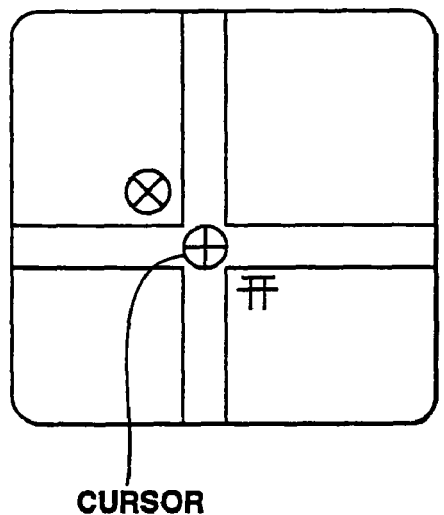
FIG. 15A explains a scrolling made through a map on a display screen in a state attained by pressing a portion, apart from the center of rotation, of the operation dial included in the information input device in FIG. 12.
Figure 15B:
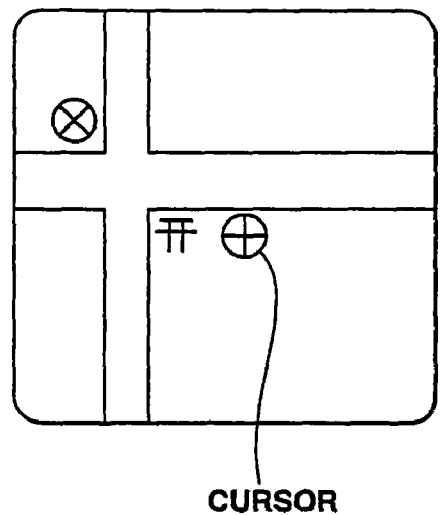
FIG. 15B shows the map screen provided after making a scrolling starting with the state shown in FIG. 15A.
Figure 15C:
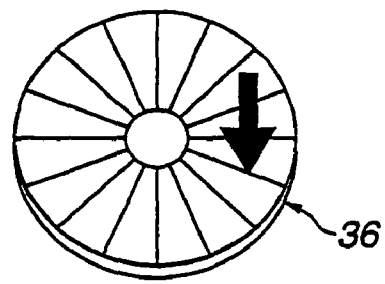
FIG. 15C is a perspective view of the operation dial operated by the user.

Note that the function of turning on the 27a, 27b, 27c and 27d by pressing the operation dial 36 of the multi-functional switch 111 applied in the portable phone according to the present invention is suitable for use to scroll a cursor through a map appearing on the screen of the display unit. FIGS. 15A to 15C explain together that function. For moving the cursor toward the east (E) on a map shown in FIG. 15A to a position in FIG. 15B, a portion, right to the center of the operation dial 36 is pressed in the direction of arrow in FIG. 15C. The multi-functional switch 111 may also be designed to be able to identify four directions such as east, west, south and north, or to identify eight directions including northeast, northwest, southeast and southwest, in addition to the above four directions, by pressing two neighboring switches 27 at a time as above.

There will be described with reference to FIGS. 16, 17A and 17B an example of the display control operation in which the operation dial 36 is rotated forward or backward or a portion, upper, left, lower or right in relation to the center, of the operation dial 36 is pressed, to turn on the switch 27a, 27b, 27c or 27d.

Figure 16:
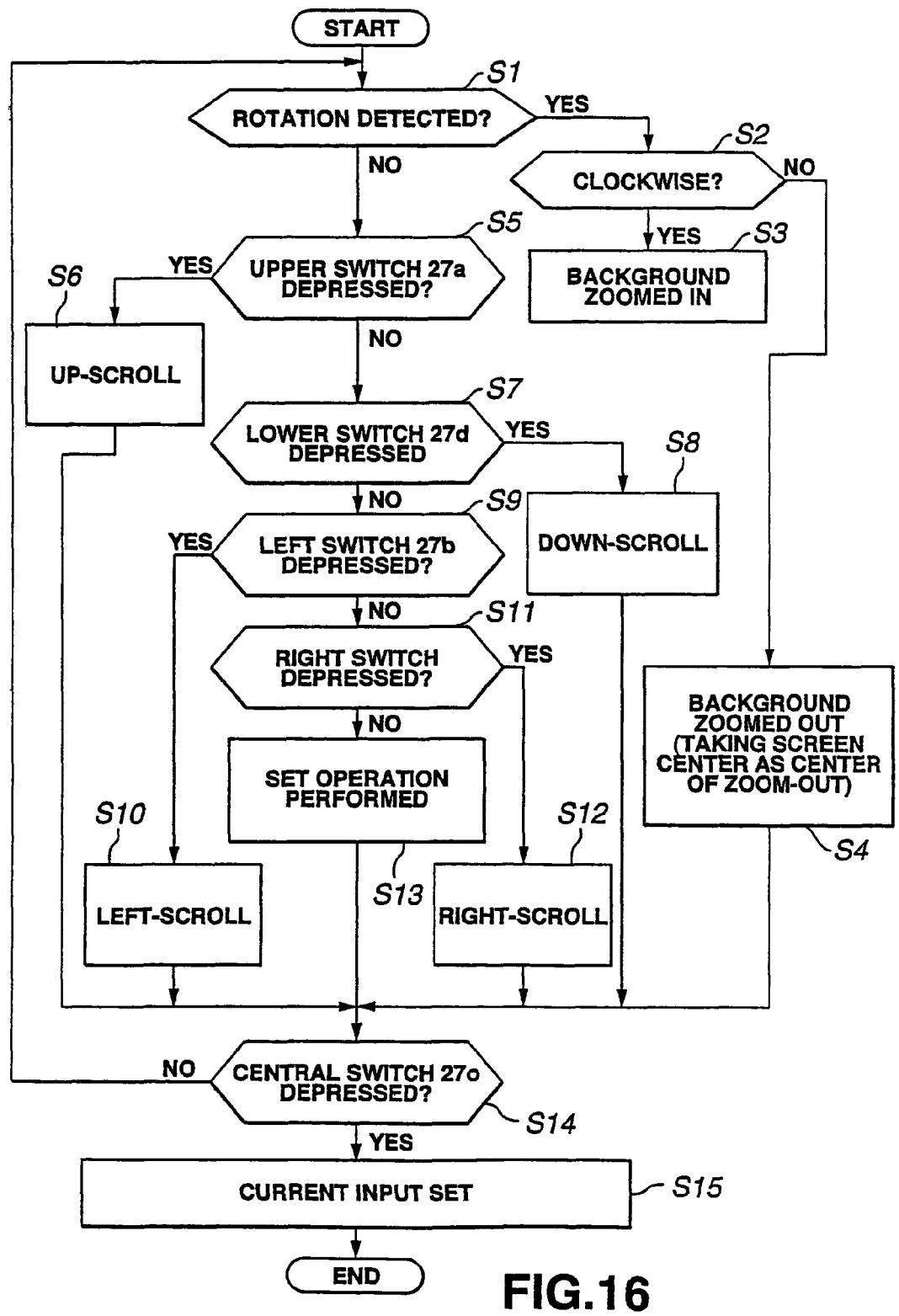
FIG. 16 shows a flow of operations made in controlling the display in the information input device in FIG. 12.
Figure 17A:
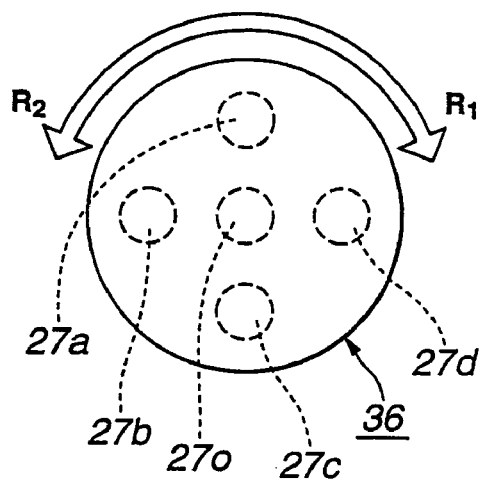
FIG. 17A is a plan view of the operation dial and switch in a positional relation between the operation dial and switches in the display controlling shown in the flow chart in FIG. 16.
Figure 17B:
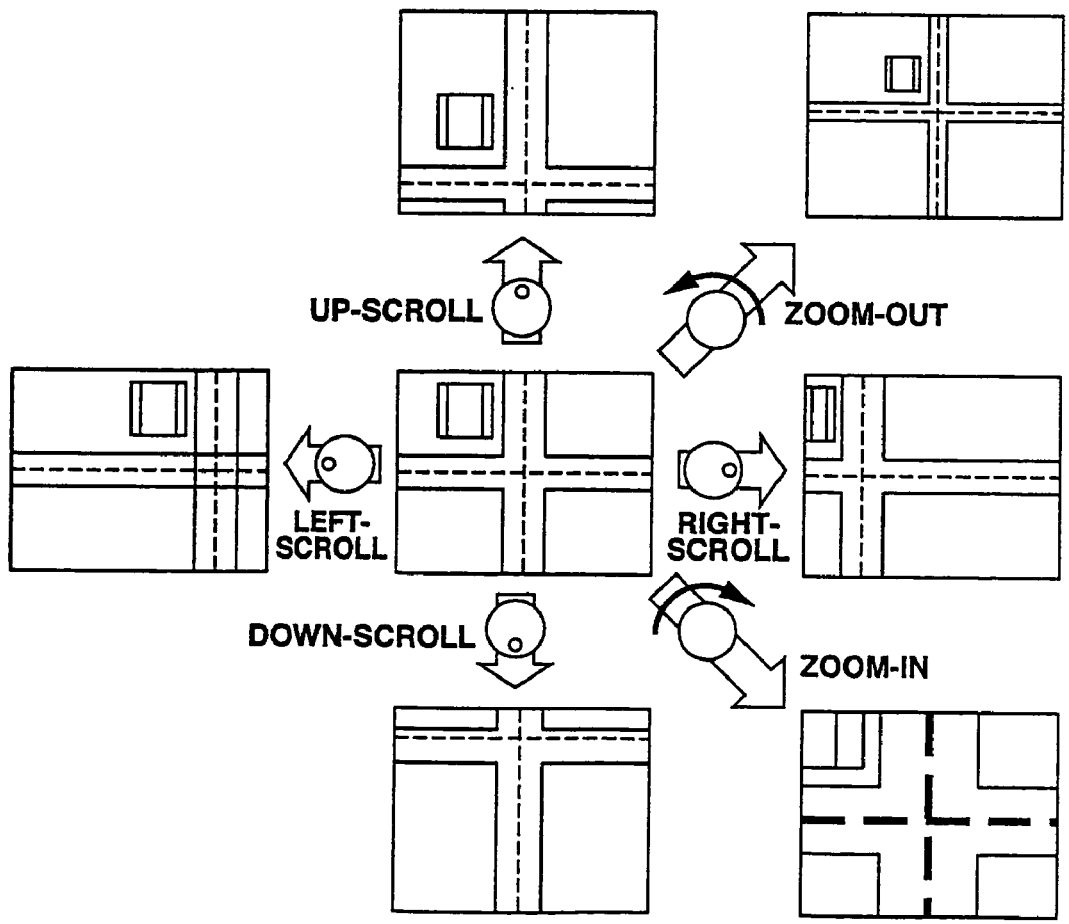
FIG. 17B shows a change of the display screen when the operation dial and switches are operated.

FIG. 16 shows a flow of a program for such operations, FIG. 17A is a plan view showing a positional relation between the operation dial 36 and switches 27a, 27b, 27c, 27d and 27o in a plane, and FIG. 17B shows a change of the display screen when the operation dial and switches are operated.

First, the operations for the display controlling will be described with reference to FIG. 16.

In step S1 (for detection of a rotation of the operation dial 36), a display control is started and it is judged whether a rotation of the operation dial 36 has been detected.

If the result of judgment in step S1 is affirmative (YES), namely, when a rotation of the operation dial 36 has been detected, the control is passed to step S2 (for detection of a clockwise rotation) where it will be detected whether the rotation of the operation dial 36 is clockwise.

When the result of judgment in step S2 is affirmative (YES), namely, if the operation dial 36 has been rotated clockwise, the control is passed to step S3 (for zoom-in of the background) where the background will be zoomed in taking the screen center as the center of zoom-in. In this example, the operation dial 36 is set so that clockwise rotation of the operation dial 36 in a direction $R_1$ will zoom in the background taking the screen center as the center of zoom-in, while counterclockwise rotation of the operation dial 36 in a direction $R_2$ will zoom out the background taking the screen center as the center of zoom-out. On the assumption that the operation dial 36 has been rotated clockwise in the direction $R_1$, the background is zoomed in, more specifically, an image in the center of FIG. 17B will change to an image shown at the lower right.

If the result of judgment in step S2 is negative (NO), namely, if the rotation of the operation dial 36 is counterclockwise in the direction R2, the control is passed to step S4 (for zooming in the background) where the background will be zoomed out taking the screen center as the center of zoom-in. In step S4, the background is zoomed out since the operation dial 36 has been rotated counterclockwise in the direction $R_2$. More specifically, the image in the center of FIG. 17B will change to an image shown at the upper right.

If the result of judgment in step S1 is negative (NO), namely, when no rotation of the operation dial 36 has been detected, the control is passed to step S5 (for detecting whether the upper switch 27a has been depressed) where it will be judged whether the switch 27a shown in FIG. 17A has been depressed and thus turned on.

If the result of judgment in step S5 is affirmative (YES), namely, if the upper switch 27a has been depressed and thus turned on, the control is passed to step S6 where the screen will be scrolled upward, that is, the image in the center of FIG. 17B will change to an image above it.

If the result of judgment in step S5 is negative (NO), namely, if the upper switch 27a has not been depressed, the control is passed to step S7 (for detecting whether the lower switch 27d has been depressed) where it will be judged whether the lower switch 27d in FIG. 17A has been depressed and thus turned on.

If the result of judgment in step S7 is affirmative (YES), that is, if the lower switch 27d has been depressed and turned on, the control is passed to step S8 (for downward scrolling) where a scrolling is made downward. Namely, the image in the center of FIG. 17B will change to an image below it.

If the result of judgment in step S7 is negative (NO), namely, if the lower switch 27b has not been depressed, the control is passed to step S9 (for detecting whether the left switch 27b has been depressed) where it will be judged whether the lower switch 27c in FIG. 17A has been depressed and thus turned on.

If the result of judgment in step S9 is affirmative (YES), that is, if the lower switch 27b has been depressed and turned on, the control is passed to step S10 (for leftward scrolling) where a scrolling is made leftward. Namely, the image in the center of FIG. 17B will change to an image to the left thereof.

If the result of judgment in step S9 is negative (NO), namely, if the right switch 27c has not been depressed, the control is passed to step S11 (for detecting whether the right switch 27c has been depressed) where it will be judged whether the right switch 27c in FIG. 17A has been depressed and thus turned on.

If the result of judgment in step S11 is affirmative (YES), that is, if the right switch 27c has been depressed and turned on, the control is passed to step S12 (for rightward scrolling) where a scrolling is made rightward. Namely, the image in the center of FIG. 17B will change to an image to the right thereof.

If the result of judgment in step S11, namely, if no rotation has been detected and one of the switches 27a, 27b, 27c and 27d has note been depressed, the control is passed to step S13 (for performing a set operation) where an already set operation will be performed.

After completion of any of steps S6, S8, S10, S12 and S13, the control is passed to step S14 (for detecting whether the central switch 27o has been depressed) where it will be judged whether the central switch 27o has been depressed. If the result of judgment is negative (NO), the control is returned to step S1.

If the result of judgment in step S14 is affirmative (YES), the control is passed to step S15 (for setting a current input) where there will be set a current input, that is, zoom-in of the background (zoom-in in the clockwise direction in this example) or zoom-out of the background (zoom-out in the counterclockwise direction in this example) by rotating the operation dial 36, or an input by pressing a portion, upper, lower, right or left in relation to the center of the operation dial 36. Thus, zoom-in or zoom-out, or upward, downward, rightward or leftward scroll, is completed.

Figure 18C:
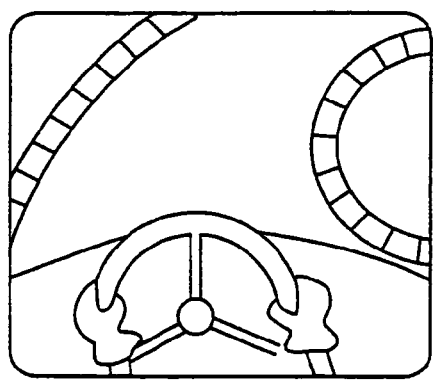
FIG. 18C is a perspective view of the operation dial operated by the user.
Figure 18C:
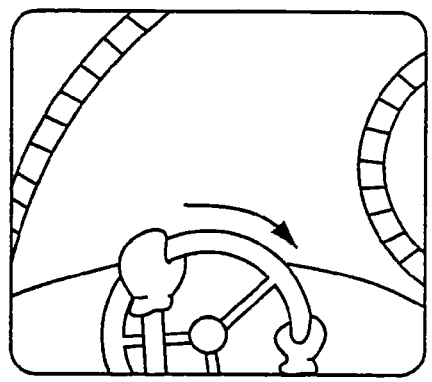
Figure 18C:
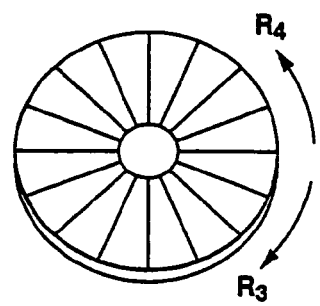

Note that the example illustrated in FIGS. 16, 17A and 17B is only an example of the present invention and the operation dial 36, for example, has to be designed to have other functions in case the present invention is applied to any other than the portable phone. For enjoying a driving game software, for example, the operation dial 36 is taken as a steering wheel as shown in FIGS. 18A to 18C. For rotating the steering wheel from a state shown in FIG. 18A clockwise in the direction of arrow in FIG. 18B, for example, the operation dial 36 is rotated clockwise in the direction of arrow $R_3$ as shown in FIG. 18C. For rotating the steering wheel counterclockwise, the operation dial 36 is rotated counterclockwise in the direction of arrow $R_4$ as shown in FIG. 18C. With the operation handle 36 associated with the steering handle as above, the driving game can be enjoyed taking the operation dial 36 as an actual steering wheel.

In the aforementioned portable phone, even if the operation dial 36 of the multi-functional switch 111 is designed to have a necessary diameter assuring an excellent operability, the excellent operability of the multi-functional switch 111 can be assured without having to increase the thickness of the multi-functional switch 111 itself.

Also, input can be made in four or eight manners by rotating the operation dial 36, pressing a portion, upper, lower, right or left in relation to the center of the operation dial 36 or by pressing right and lower portions, right and upper portions, left and lower portions or left and upper portions of the operation dial 36. These functions are suitable for scrolling in four directions including the east, west, south and north on a map or in eight directions including these directions as well as the northeast, northwest, southeast and southwest on the map or for any other designations.

Further, since the operation dial 36 is operated at one portion for the purpose or selection while it is operated at the other portion for the purpose of setting the selection, the operation dial 36 is advantageous in that the user will be able to make a selection with no confusion with any setting.

Next, the second embodiment of the multi-functional switch according to the present invention will be described with reference to other accompanying drawings. This multi-functional switch is generally indicated with a reference number 111a.

Figure 19:
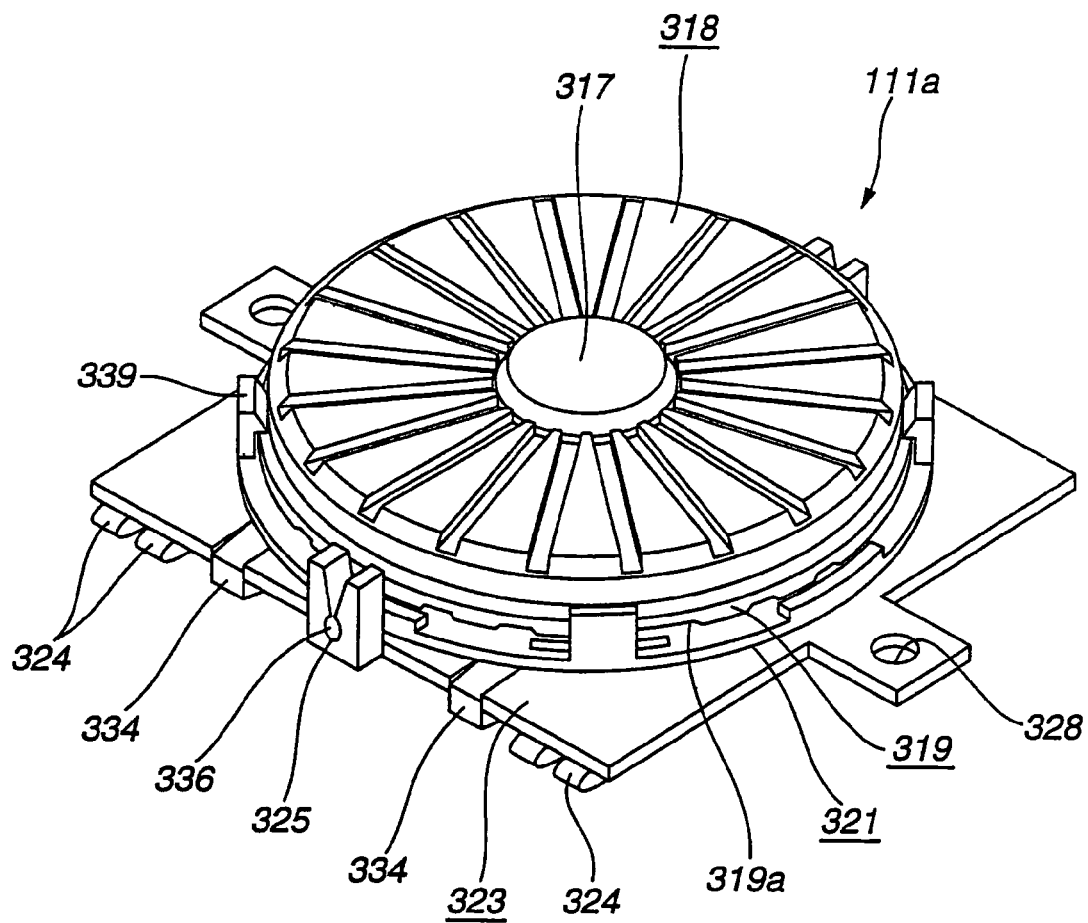
FIG. 19 is a perspective view of a multi-functional switch as a second embodiment of the information input device according to the present invention.
Figure 20:
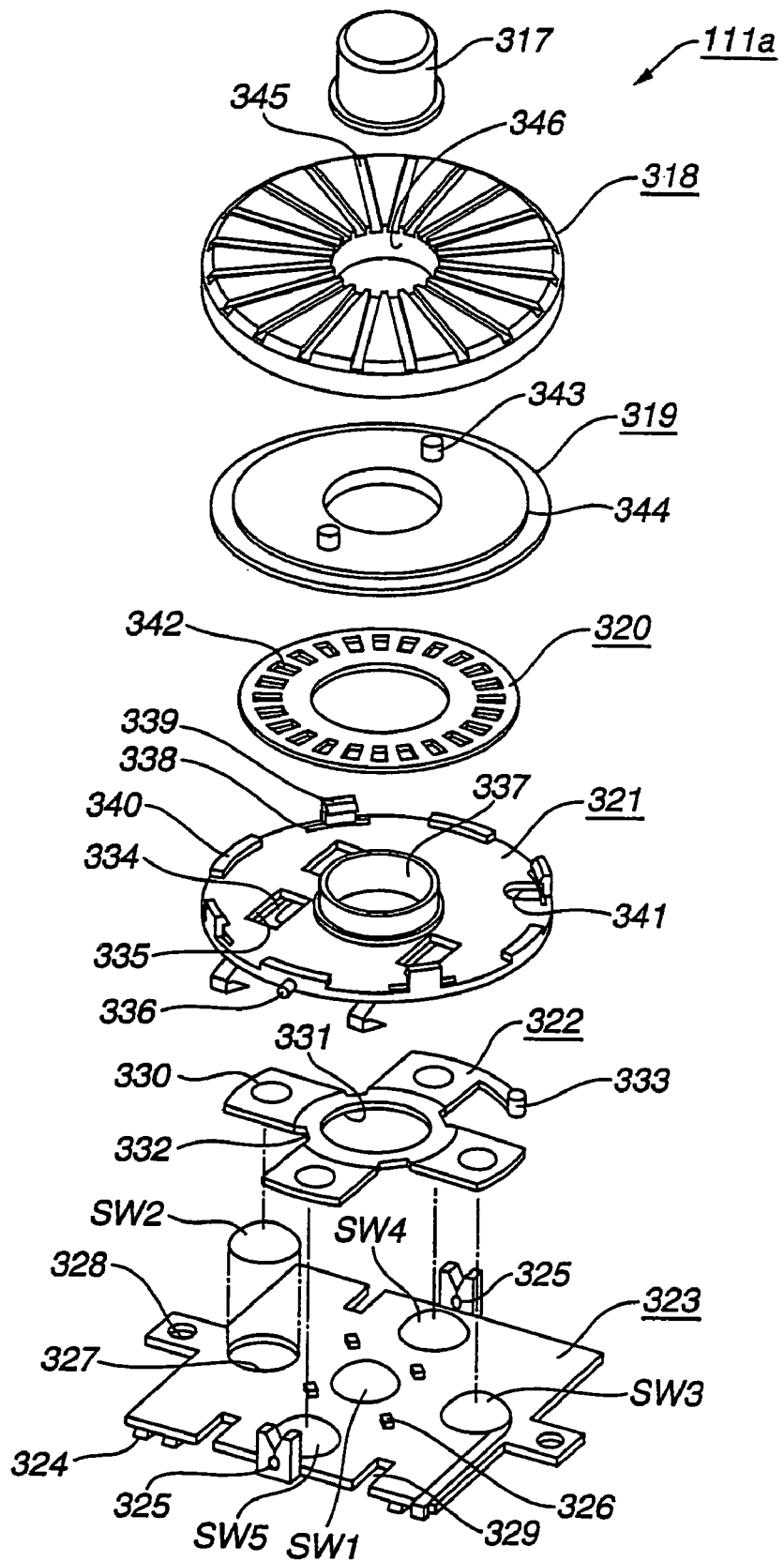
FIG. 20 is an exploded perspective view of the multi-functional switch in FIG. 19.

As shown in FIGS. 19 and 20, the multi-functional switch 111a as the second embodiment of the present invention includes a set key 317, operation dial 318, dial base 319, scale 320, holder 321, detent (click) spring 322 and a substrate 323, counted from above. The substrate 323 has the other components stacked integrally thereon. It should be noted that since a portable phone in which this multi-functional switch 111a is assembled is similar in appearance and circuit construction to the one illustrated and explained in FIGS. 5 and 6 and so it will not be described in detail.

The substrate 323 having the components mounted thereon is formed to have a rectangular shape as shown in FIG. 20. It has tact switches SW1 to SW5 disposed and fixed in a total of five places, respectively, including the center and the top and bottom and right and left in relation to the center on the upper side. Elastic terminals 324 are formed by insert molding correspondingly to the tact switches SW1 to SW5, and electrically connected to the latter, respectively. As shown in FIG. 20, a bearing 325 is provided standing at either lateral side of the substrate 323. The bearings 325 are opposite to each other and support the holder 321 which will further be described later. Also, there are formed projected about the upper-side center positioning engagement projections 326 for the detent spring 322 which will further be described later. It should be noted that in FIG. 20, the reference number 327 indicates a concavity in which each tact switch is engaged in, 328 indicates a hole for fixing the substrate, and 329 indicates a cut for access to the elastic terminal.

The detent spring 322 disposed just on the substrate 323 is formed from a metallic leaf spring, for example, to have a planar cross shape. It has formed on the outer lower edge thereof a contact portion 330 corresponding to each of the aforementioned tact switches SW2 to SW5 in the top and bottom and right and left positions. As shown, the contact portion 330 extends outward. The detent spring 322 has formed in the center thereof a through-hole 331 through which the set key 317 which will further be described later is to be introduced, and it has also engagement cuts 332 formed therein around the center and in which the aforementioned engagement projections 326 on the substrate 323 are engaged, respectively. Further, the detent spring 322 has a detent projection 333 formed at the end of a circumferential extension of one of the content portions 330. The detent projection 333 extends vertically. The detent projection 333 is supported under a force to be in elastic contact with in relation to and concavities formed on the lower side of the dial base 319 which will further be described later.

The holder 321 is a disk having an opening formed in the center thereof, and has provided integrally on the lower side thereof brush terminals 334 formed by insert molding. The holder 321 has formed therein through-holes 335 through which the brush terminals 334 are projected, respectively, from the lower side to above the upper side of the holder 321. The upper end of the brush terminal 334, projected through the through-hole 335, is put in contact with the scale 320 as a rotor electrode as will be described later.

The holder 321 has provided on the peripheral surface thereof a bearing pin 336 formed projecting in each position corresponding to the aforementioned bearing 325 on the substrate 323. The bearing pins 336 are borne in the bearings 325, respectively, and thus the holder 321 is tiltable to the right and left about the bearings 325 on the substrate 323. The bearing 325 has a vertically elongated bearing hole formed therein so that the bearing pin 336 is vertically slidable. Thus, the holder 321 is tiltable vertically about the bearings 325.

The holder 321 has formed on the upper outer perimeter thereof a plurality of dial base engagement projections 339 each having a cut 338 formed near the base thereof to assure an elastic engagement, and a plurality of sliding guide projections 340 which supports the dial base 319, which will further be described later, partially at, and slidably on, the lower outer edges. The projections 339 and 340 rise upward. The holder 321 has formed therein a through-hole 341 corresponding to the detent projection 333.

The scale 320 is an electrically conductive disk having an opening formed in the center thereof, and has formed therein a plurality of pulse detection openings 343 circumferentially thereof and at constant intervals. The aforementioned brush terminal 334 is introduced at the upper end thereof in one of the openings 342 and put in elastic contact with the circumferential end of the opening 342. The openings 342 are provided for detection of a rotated direction and extent of the dial base 319 holding the scale 320 when the dial base 319 is rotated. The scale 320 is installed integrally to the bottom of the dial base 319, which will further be described below, by insert molding.

The dial base 319 is a disk having an opening formed in the center thereof, and has the scale 320 installed integrally to the lower side thereof. It has provided on the upper side thereof a pair of engagement projections 343 and an engagement step 344 on which the dial 318 is to be fitted. The dial base 319 has formed on the lower outer circumference thereof a plurality of detent convexities and concavities 319a at constant intervals. The detent projection 333 is put in elastic contact with the detent convexities and concavities 319a which will provide a clear clicking or detent when the user rotates the operation dial 318 for scrolling in a direction.

The operation dial 318 is also a disk having a through-hole 346 formed in the center thereof, and has formed on the entire upper side thereof a plurality of radially extending recesses 345 which cause appropriate friction on the user's finger when he or she is going to rotate the operation dial 318, to assure that the operation dial 318 can positively be operated. It has formed on the lower side thereof engagement concavities (not shown) corresponding to the engagement projections 343 on the dial base 319. Further, the lower outer circumferential edge of the dial base 319 is formed as an engagement rim (not shown) which is engaged on the engagement step 344 of the dial base 319 for integral coupling between the dial base 319 and operation dial 318. Also, the set key 317 can be introduced through the central through-hole 346 formed in the operation dial 318.

The set key 317 is formed like a small hollow cylinder closed at the top end thereof. It can be introduced into the central through-hole 346 in the operation dial 318. When the set key 317 is installed through the through-hole 346, it is a little projected at the top end portion thereof from the top of the operation dial 318. The top of the set key 317 is to be depressed for setting an input having been selected.

When the set key 317 is depressed, its bottom will depress the central tact switch SW1 on the substrate 323 and a set input will be detected.

When scrolling through the display screen by means of the multi-functional switch 111a constructed as above, the latter will operate as follows:

As the operation dial 318 is rotated in its plane with the fingertip being in light touch with the upper surface of the operation dial 318, the scale 320 integral with the dial base 319 inside the operation dial 318 is rotated circumferentially thereof. At this time, pulse signals indicative of a rotated direction and extent of the operation dial 318 are detected from the brush terminals 334 put in contact with the scale 320, and sent to the CPU 105 (in FIG. 6). The display screen will thus be scrolled in a direction corresponding to the rotated direction of the operation dial 318.

While the holder 321 is not being applied with any external force, the elasticity of the detent spring 322 and tact switches SW1 to SW5 tilts the operation dial 318 to each of the four directions, top and bottom and right and left, that is, resets it to a home position where it is ready for depression. Thus, when the upper portion or lower portion of the operation dial 318 is pressed right below, the holder 321 inside the operation dial 318 is depressed in the pressed direction and tilted, and depresses and activates the upper or tact switch SW1 or SW5 corresponding to the depressed direction to provide a corresponding vertical scrolling.

Even a rotation of the operation dial 318 permits a vertical scrolling as above.

On the other hand, by tilting the operation dial 318 by pressing the right or left portion of the latter, the display screen can be scrolled in the pressed direction. A horizontal scrolling can be made similarly, and so the explanation thereof will be omitted here.

According to a terminal type or a purpose of display, the multi-functional switch 111a can be set to scroll upward or downward through the display screen by rotating the operation dial 318, and also to scroll rightward or leftward through the display screen by rotating the operation dial 318.

By pressing the right or left portion of the operation dial 318 while rotating the latter, the CPU 105 can acquire input signals from both switches and set an oblique direction of scrolling through the display screen. Namely, a scrolling can readily be made in a direction toward a desired object, which enables an efficient input operation. Thus, a multi-functional input operation is possible for a composite input with a free selection of one or more of a plurality of switches in the same plane. To set data having been entered, the set key 317 should be depressed. The corresponding tact switch SW1 will be depressed to turn on and set the data.

Note here that either or both of the set key 317 and operation dial 318 may be provided removably. The set key 317 and operation dial 318 may be prepared each in a plurality of colors and various combinations of such a set key 317 and operation dial 318 will provide the multi-functional switch 111a with various appearances.

Next, the third embodiment of the multi-functional switch according to the present invention will be described with reference to the accompanying drawings. This multi-functional switch is generally indicated with a reference number 111b.

Since a portable phone having the multi-functional switch 111b assembled therein is similar in appearance and circuit construction to the one having previously been illustrated and explained with reference to FIGS. 5 and 6, so it will not be described in detail. Namely, the description and illustration of the multi-functional switch 111 as in FIGS. 5 and 6 are applied as they are to the multi-functional switch 111b just by replacing the reference number 111 with 111b. It should be noted that in the third embodiment, the terminals of the brushes and switches are electrically connected to the CPU in the portable phone via the wiring pattern as in the first embodiment. However, the wiring pattern will not be illustrated here.

Figure 21:
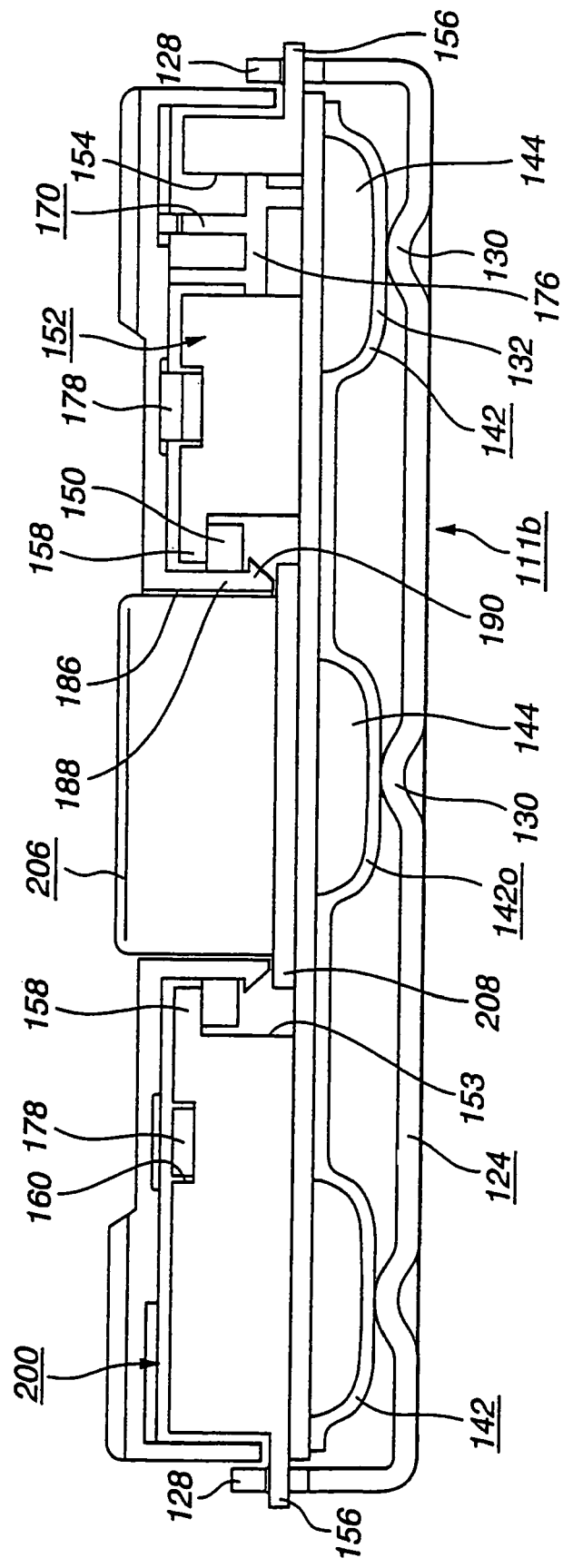
FIG. 21 is an axial sectional view of a multi-functional switch as a third embodiment of the information input device according to the present invention.
Figure 22:
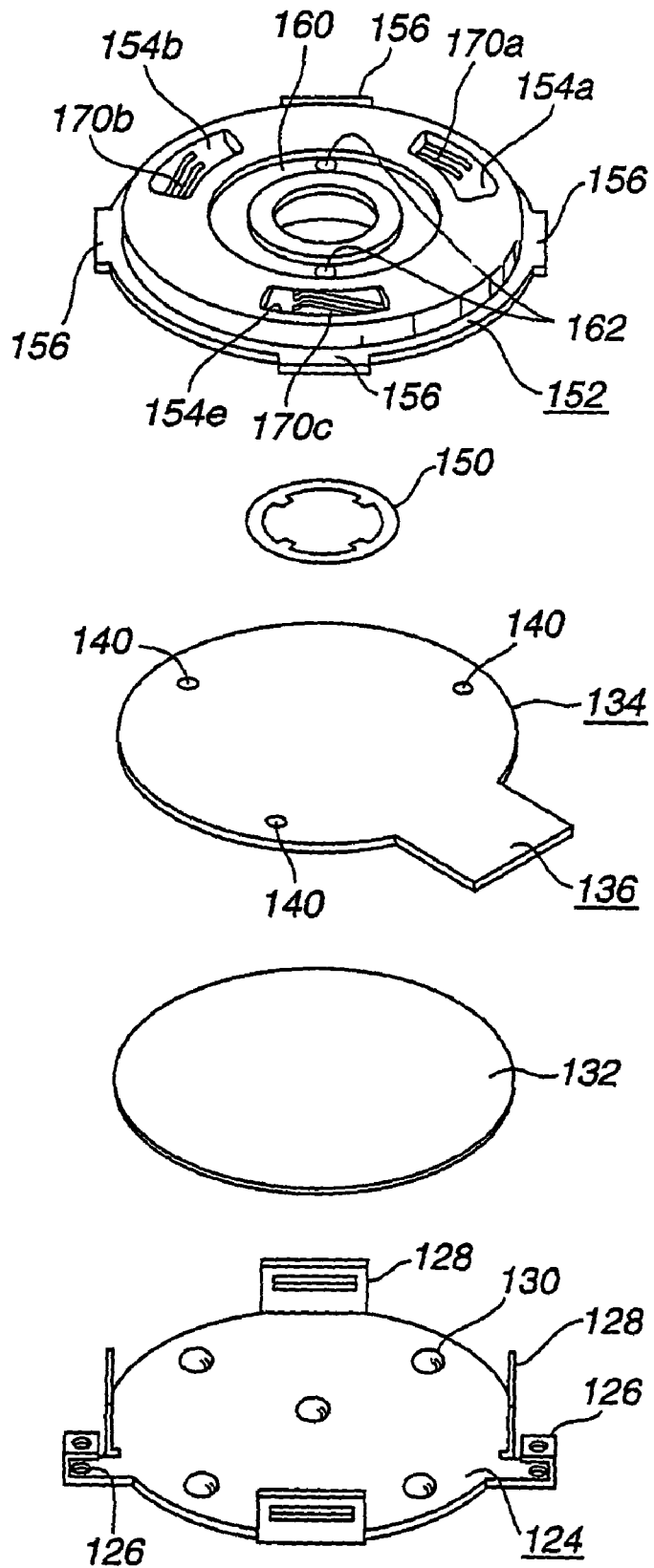
FIG. 22 is an exploded perspective view of components included in the information input device in FIG. 21.

The multi-functional switch 111b includes a base 124 having a generally disk-like shape and formed from a metal (SUS) for example as shown in FIGS. 21 and 22. The base 124 has formed integrally on the outer circumference thereof a pair of substrate mounting pieces 126 spaced 180 deg. from each other. The substrate mounting pieces 126 are provided to install the multi-functional switch 111b to a substrate (not shown) installed to a portable-phone housing (not shown), for example. Further, the base 124 has formed integrally on the outer circumference thereof four holder retainers 128 spaced 90 deg. from each other and opposite to each other. Each of the holder retainers 128 has formed therein a retention hole in which a retaining piece, which will further be described later, of the holder is inserted. The base 124 has formed thereon projections 130 which are in contact with, and activate tact switches which will further be described later. The projections 130 are provided in positions corresponding to the disposed positions of the tact switches.

Figure 23:
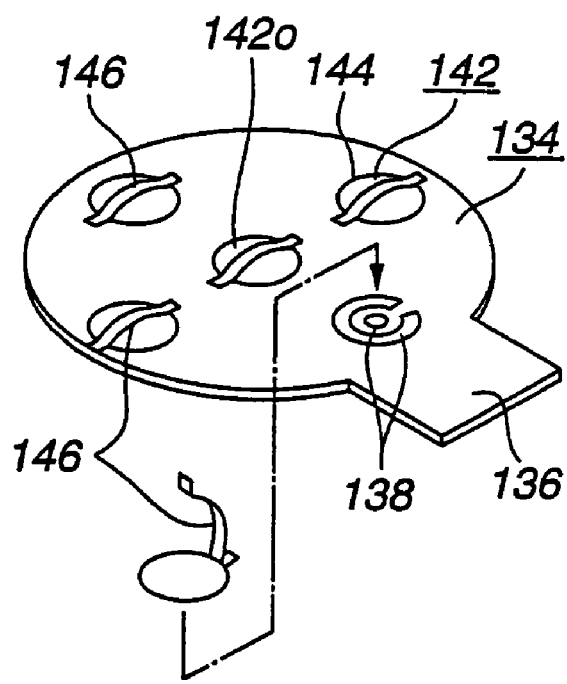
FIG. 23 is a perspective view, from the rear side, of a flexible printed circuit board on which tact switches are provided.

The base 124 has also a flexible printed circuit board 134 disposed thereon. The flexible printed circuit 134 is covered at the lower side thereof opposite to the base 124 with a dust-proof sheet 132. The flexible printed circuit board 134 covered with the dust-proof sheet 132 includes a substrate formed from a polyimide resin, for example, and having a generally circular portion thereof projected outwardly as shown in FIGS. 22 and 23. The outwardly projected portion is used as a signal lead-out portion 136. As shown in FIG. 23, the flexible printed circuit board 134 has a wiring pattern 138 formed on the rear side thereof and it has formed on the front side thereof a plurality of electrodes 140 which are electrically connected to a part of the wiring pattern 138 via a through-hole for example. The electrodes 140 are arranged for contact or connection with brushes which will further be described later to provide an electrical connection between the brushes and part of the wiring pattern 138.

The flexible printed circuit board 134 has a plurality of tact switches 142 disposed on the rear side thereof as shown in FIG. 23. Each of the tact switches 142 has a switching element (not shown) provided inside an inverted spring 144 and of which each terminal is connected to the wiring pattern 138. The central one 142o of the plurality of tact switches 142 disposed on the flexible printed circuit board 134 is used to set an input, while the other four tact switches 142 disposed along the perimeter of the circuit board 134 are spaced 90 deg. circumferentially from each other and used for horizontal and vertical scrolling operations. The tact switches 142 are located correspondingly to the projections 130 on the base 124. It should be noted that each of the tact switches 142 is provisionally fixed to the flexible printed circuit board 134 with a tact switch fixing tape 146.

Note that the dust-proof sheet 132 covers the rear side of the flexible printed circuit board 134 except for the signal lead-out portion 136 to protect the wiring pattern 138 and tact switches 142.

The holder 152 and operation dial 184 are disposed in a superposed relation on the base 124 having the flexible printed circuit board 134 disposed thereon. The operation dial 184 is held rotatably on the holder 152 with a holder/dial definition ring 150 interposed between them not to fall off.

Figure 24:
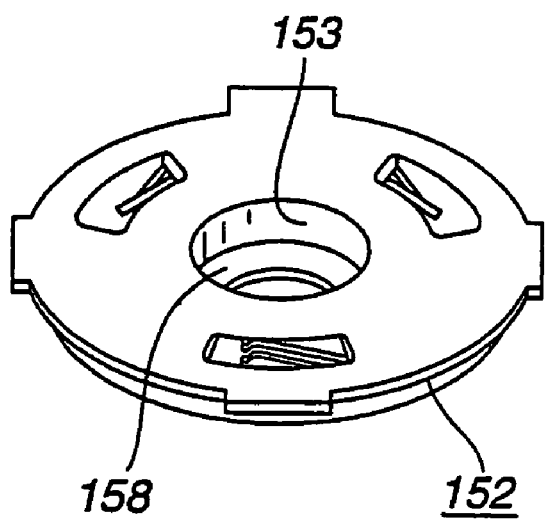
FIG. 24 is a perspective view, from the rear side, of a holder included in the information input device in FIG. 21.

The holder 152 is formed from a synthetic resin to have a generally disk-like shape having a central hole 153 formed therein as shown in FIGS. 22 and 24. The holder 152 has formed integrally on the outer circumference thereof a plurality of retainers 156 which are to be fitted in retention holes formed in the plurality of holder retainers 128, respectively, on the base 124. With the retainers 156 of the holder 152 being fitted in the retention holes in the base 124, the holder 152 can be fixed by the base 124. In this condition, the holder 152 cannot be rotated in relation to the base 124 and moved vertically.

The holder 152 has formed therein a plurality of through-holes 154a, 154b and 154e in which the brushes are to be disposed, respectively.

The holder 152 has formed in the center thereof a dial engagement pocket 158 defined by an inward projection of the upper portion of the central hole 153 and the wall of the central hole 153. Also, the holder 152 has formed in the front side thereof a touch ring groove 160 for receiving a touch ring which will further be described later. There is provided in the bottom of the touch ring groove 160 projections 162 which are to be engaged in engagement holes formed in the touch ring to immobilize the touch ring.

Figure 26:
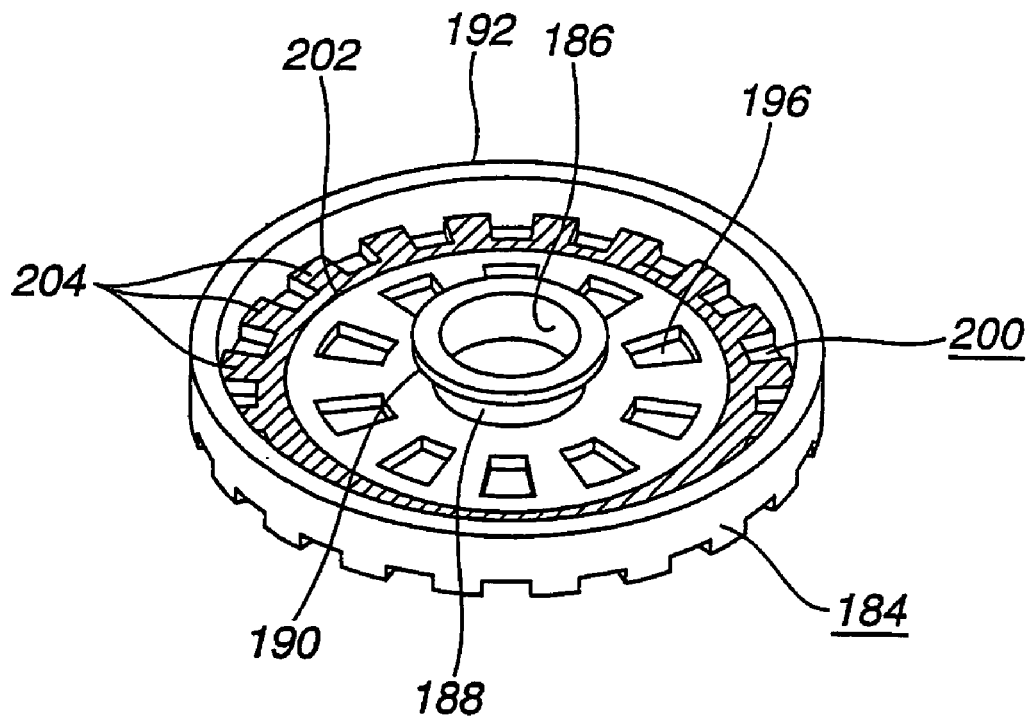
FIG. 26 is a perspective view of the operation dial and a brush installed to the operation dial.
Figure 26:
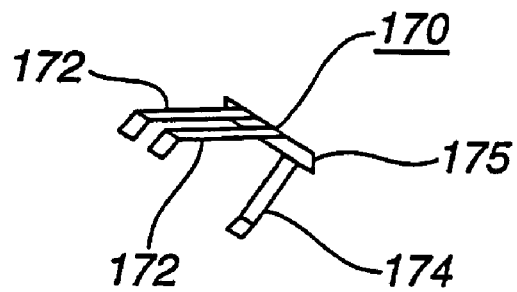

Each of the brush housing through-holes 154*a*, 154*b* and 154*e* formed in the holder 152 will house a corresponding one of brushes 170*a*, 170*b* and 170*e*. As shown in FIG. 26, the brush 170 consists of operation dial-side portions 172 which are to be in contact with rotation detect electrodes formed on the operation dial 184 and which will further be described later, a flexible printed circuit-side portion 174 which is to be connected to an end of the electrode 140 formed in a part of a wiring pattern formed on the front side of a flexible printed circuit board 134, and a base portion 175 holding the portions 172 and 174 integrally. It should be noted that FIG. 22 shows the brushes 170*a*, 170*b* and 170*e* housed in the through-holes 154*a*, 154*b* and 154*e* in the holder 152 and FIG. 26 shows one of the brush 170 removed from the through-hole 154.

Figure 25:
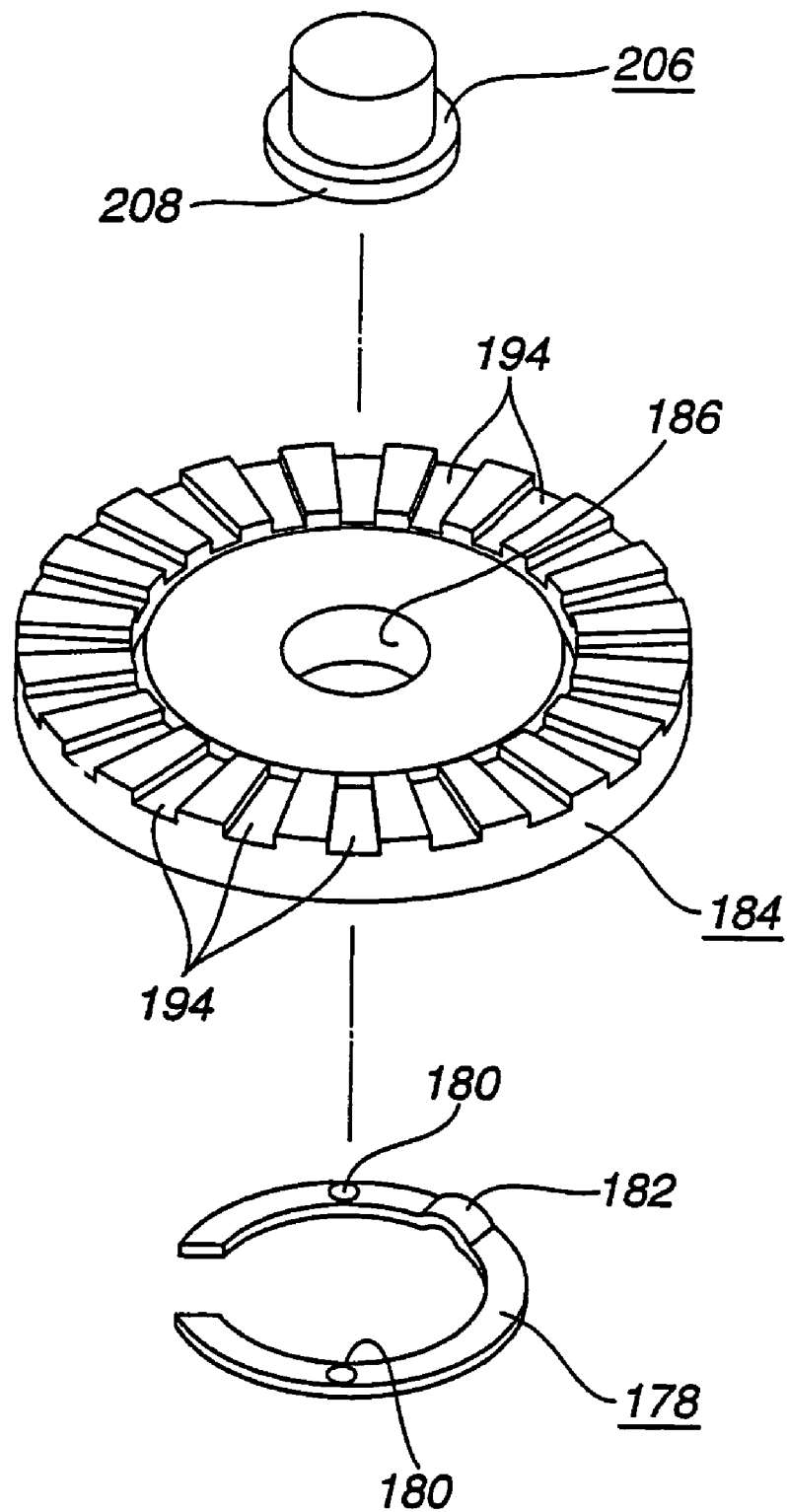
FIG. 25 is an exploded perspective view of an operation dial and button.

In the touch ring groove 160 formed on the holder 152, there is disposed a touch ring 178 as shown in FIG. 21. The touch ring 178 has formed therein engagement holes 180 in which the projections 162 formed on the bottom of the touch ring groove 160 on the holder 152 are engaged, and has a detent projection 182 formed thereon. The projection 182 is received in the touch ring groove 160 with the middle portion thereof upside as shown in FIG. 25. The touch ring 178 is positioned with the projections 162 at the touch ring groove 160 being engaged in the holes 180, respectively, in the touch ring 178.

Further, the holder 152 has the operation dial 184 rotatably mounted thereon. As shown in FIGS. 25 and 26, the operation dial 184 is formed from a synthetic resin for example, and has formed integrally therewith a central cylinder 188 projecting downward and having a hole 186 formed in the center thereof, and the central cylinder 188 has formed integrally at the lower end thereof an annular engagement projection 190 extending inwardly.

The operation dial 184 has formed integrally along the outer periphery thereof a skirt portion 192 projecting downward, and on the front side thereof a plurality of radial recesses 194 extending outwardly from near the center thereof. The recesses 194 are provided to effectively transmit a force of rotating operation applied by the finger to the operation dial 184.

The operation dial 184 has formed on the rear side thereof a plurality of detent concavities 196 disposed at a generally fixed angular pitch. The detent concavities 196 provide a clicking or detent due to an engagement of the protection 182 of the touch ring 178 each time the operation dial 184 is rotated through a constant angle. Also, the operation dial 184 has rotation detect electrodes 200 provided in positions outer than the plurality of detent concavities 196 on the rear side thereof as shown in FIG. 26. The rotation detect electrode 200 consists of an annular portion (common portion for grounding) 202, and multiple tooth-shaped rotation detecting portions 204 radially projecting outwardly and disposed at a constant angular pitch.

The rotation detect electrode 200 works like the scale 23 included in the first embodiment shown in FIG. 7. Its annular portion 202 is always in contact with the brush 170*e* independently of any rotation of the operation dial 184, while the rotation detecting portions 204 are selectively put in contact with the brushes 170*a* and 170*b* according to the angle of a rotation of the operation dial 184.

As shown in FIGS. 25 and 26, the operation dial 184 is supported rotatably, via the holder/dial definition ring 150, on the holder 152 having the brushes 170*a*, 170*b* and 170*e* being housed in the through-holes 154*a*, 154*b* and 154*e*, respectively, with the touch ring 178 being housed in the touch ring groove 160 formed in the base 124. That is, the operation dial 184 has the central cylinder 188 thereof force-fitted in the dial engagement pocket 158 of the holder 152, and the holder/dial definition ring 150 force-fitted onto the central cylinder 188, and the annular engagement projection 190 is engaged into the dial engagement pocket 158 of the holder 152 with the holder/dial definition ring 150 laid between them, thereby blocking the holder 152 from falling off while permitting the later to be rotated.

Figure 27:
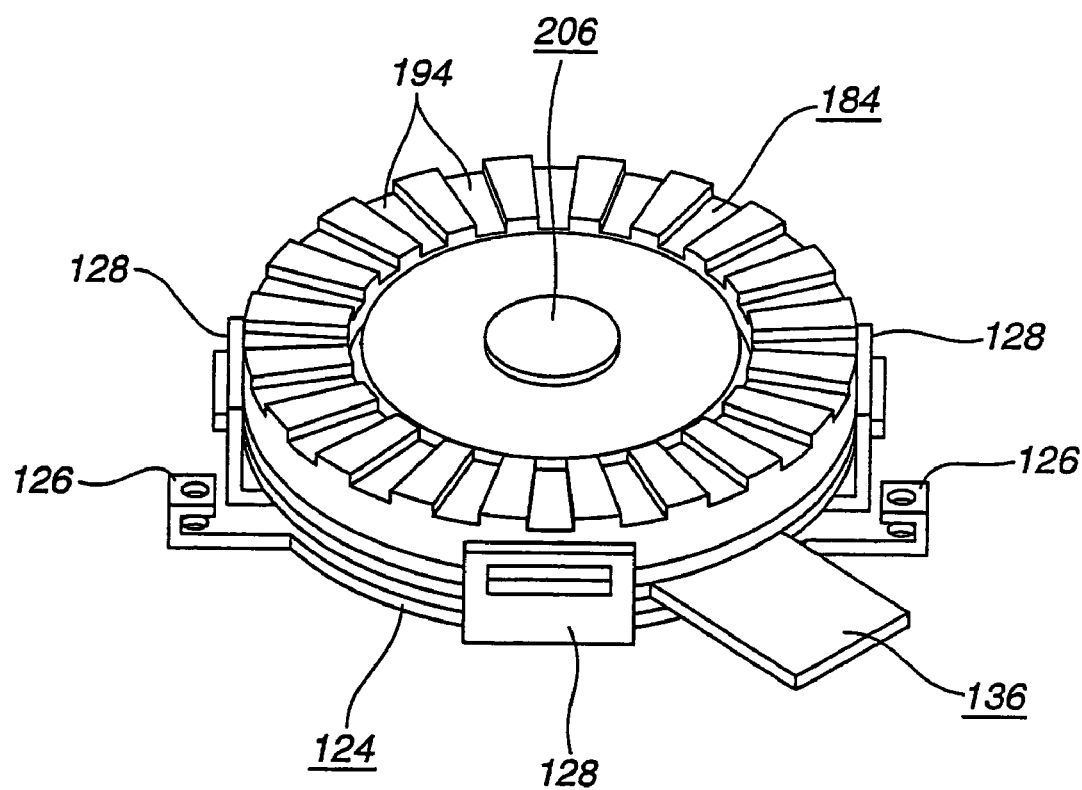
FIG. 27 is a perspective view of a multi-functional switch as a fourth embodiment of the information input device according to the present invention.

The operation dial 184 installed to the holder 152 has provided thereon a button 206 to rotate the operation dial 184. As shown in FIG. 25, the button 206 is columnar and has a ring-shaped engagement projection 208 formed along the circumference thereof at the lower end. The button 206 is introduced from below through the central cylinder 188 of the operation dial 184 installed to the holder 152 until the engagement projection 208 thereof abuts the annular engagement projection 190 formed at the lower end of the central cylinder 188. With the flexible printed circuit board 134 positioned and fixed to the bottoms of the button 206 and holder 152, the holder 152 is installed to the base 124 as mentioned above. Thus, the multi-functional switch 111*b* is assembled as shown in FIG. 27.

In the multi-functional switch 111*b* according to the present invention, when the operation dial 184 is applied with a force by the finger or the like, it is rotated in relation to the holder 152, flexible printed circuit board 134, base 124 and the other. Then, the brush 170*e* is always in contact with the common portion 202 of the rotation detect electrode 200 and thus electrically connected to the rotation detect electrode 200, while the other brushes 170*a* and 170*b* are either in contact, or not in contact, with the rotation detecting portion 204. Thus, the brushes 170*a* and 170*b* and the brush 170*e* are either electrically connected to each other or not connected to each other as the operation dial 184 is rotated. Therefore, by detecting a change of the electric continuity between the brushes 170*a* and 170*b* and the brush 170*e* in the form of an electrical pulse signal, it is possible to produce a pulse of one period each time the operation dial 184 is rotated for a disposed pitch of the rotation detecting portions 204, and detect a rotated extent of the operation dial 184 through counting of such pulses. The theory of detecting the rotated extent and theory of detecting the rotated direction are similar to those in the first embodiment of the present invention, and so they will not be described in detail.

Further, when any of four outer portions, right, left, upper and lower in relation the button 206, of the operation dial 184 is pressed, the force of pressing is transmitted to any tract switch 142 beneath the pressed portion via the holder 152 and flexible printed circuit board 134. When the tact switch 142 is thus depressed, it abuts the corresponding one of the projections 130 provided on the base 124 and is pressed by the projection 130 to turn on. Using the four tact switches 142 provided along the circumferential portion of the base 124 as input means for making input of information as to the right, left, top and bottom, it is possible to make a scroll, shift or the like toward the right, left, top and bottom (or back and forth). In this respect as well, the multi-functional switch 111*b* as the third embodiment of the present invention is similar to the multi-functional switch 111 as the first embodiment.

Further advantages of the multi-functional switch 111*b* as the third embodiment of the present invention over the multi-functional switch 111 as the first embodiment will be described below:

The operation dial 184 in the third embodiment is constructed by forming, on the rear side of one member formed from a synthetic resin for example, the rotation detect electrode 200 from only the common portion 202 and the plurality of rotation detecting portions 204. Thus, the operation dial 184 can be constructed from a reduced number of parts, resulting in a reduced thickness of the multi-functional switch. In the multi-functional switch 111 as the aforementioned first embodiment, the operation dial 36 shown in FIG. 7 is composed of two members formed from a synthetic resin for example, namely, the dial disk 25 and dial body 24 shown in FIGS. 7 and 12. The operation dial 36 has the same function as the operation dial 184 in the multi-functional switch 111*b* as the third embodiment. Therefore, the operation dial 36 is constructed of a larger number of parts than that included in the operation dial 184. In addition, since the dial disk 25 and dial body 24 are superposed on each other to provide the integral structure, resulting in a correspondingly larger thickness of the multi-functional switch.

In the multi-functional switch 111*b* as the third embodiment, the operation dial 184 is one piece, while the operation dial 36 in the first embodiment is formed from two members formed from a synthetic resin for example, namely, the dial disk 25 and dial body 24 formed from the synthetic resin for example. Thus, the operation dial 184 can be formed from a smaller number of parts than that in the operation dial 36, and the thickness of the multi-functional switch can be designed correspondingly smaller in thickness than the first embodiment.

Also, in the multi-functional switch 111*b* as the third embodiment, the central cylinder 188 having the hole 186 formed the center thereof is formed to project downward, the operation dial 184 covers the upper surface of the holder 152 and the central cylinder 188 covers the wall of the opening in the holder 152. Thus, there will not take place any upward gap at the intermediate upper portion between the operation dial 184 and holder 152, and neither dust nor water will possibly come onto the holder 152 from the central portion of the operation dial 184, leading an improved dust-tightness and water-tightness of the multi-functional switch 111*b*. However, in the multi-functional switch 111 as the first embodiment of the present invention, since the upward dial holding cylinder 31 at the center of the holder 22 is introduced from below into the central hole 40 in the dial body 24 to hold the dial body 24 rotatably, an upward gap will necessarily take place between the dial holding cylinder 31 and central hole 40 in the dial body 24 and so dust or water will possibly come onto the holder 22 through the gap, namely, deeply into the multi-functional switch 111.

In the multi-functional switch 111*b* as the third embodiment, since the operation dial 184 includes the central cylinder 188 extending downward, the operation dial 184 covers the upper surface of the holder 152 and the central cylinder 188 covers the wall of the opening in the 152, there will not take place any upward movement between the operation dial 184 and holder 152. Therefore, the multi-functional switch 111*b* is improved in dust-tightness and water-tightness.

Also, in the multi-functional switch 111*b* as the third embodiment of the present invention, the operation dial 184 has formed integrally along the periphery thereof the skirt portion 192 projecting downward and which will cover around the holder 152. Thus, no gap will take place between the outer surface of the holder 152 and operation dial 184. No external dust or water will possibly enter between the operation dial 184 and holder 152. Thus, the multi-functional switch 111*b* has an improved dust-tightness and water-tightness.

That is to say, in the multi-functional switch 111 as the first embodiment, the holder 22 and dial body 24 rotatably held by the holder 22 have defined between them at the periphery thereof a space open to the outside. Water or dust may possibly come into the space. In the multi-functional switch 111*b* as the third embodiment, however, since the holder 152 is covered outside thereof with the skirt portion 192, any external dust or water can effectively be prevented from entering the multi-functional switch 111*b*.

In the multi-functional switch 111*b* as the third embodiment, the brushes 170*a*, 170*b* and 170*e* are connected at the flexible printed circuit board-side portion 174 thereof to the rotation detect electrode 140 formed from the wiring pattern on the front side of the flexible printed circuit board 134. So, the brushes 170 are connected to the rotation detect electrode 140 formed from the wiring pattern on the flexible printed circuit board 134 with a high reliability.

Namely, in the multi-functional switch 111 as the first embodiment, the brushes 32*e*, 32*a* and 32*b* are electrically connected to the respective wires on the base 21 with a reliability which cannot be said to be sufficient. As having previously been described in detail with reference to FIG. 13, the base of each of the brushes 32*e*, 32*a* and 32*b* is located in the brush fixing hole 21*a* in the base 21 and put in contact with the wiring pattern 21*b* on the bottom of the base 21. Thus, the brushes 32 are only in contact with the wiring pattern 21*b* and the reliability of the electrical connection between them cannot be said to be sufficient.

On the contrary, in the multi-functional switch 111*b* as the third embodiment, since the end of the brush 170, at the side of the flexible printed circuit board—side portion 174, is connected to the rotation detect electrode 140 formed from the wiring pattern on the flexible printed circuit board 134, so the brushes 170 can be connected to the rotation detect electrode 140 satisfactorily and with a high reliability.

In the multi-functional switch 111*b* as the third embodiment of the present invention, each of the brushes 170*a*, 170*b* and 170*e* is housed in the through-hole 154 in the holder 152 and disposed in a compressed form between the electrode 140 formed on a part of the wiring pattern on the flexible printed circuit board 134 attached closely to the bottom of the holder 152 and the rotation detect electrode 200 on the rear side of the operation dial 184 above the holder 152. Thus, the brushes will not project so much to the outside. Namely, the brushes are hard to attack and have a longer service life.

Figure 13:
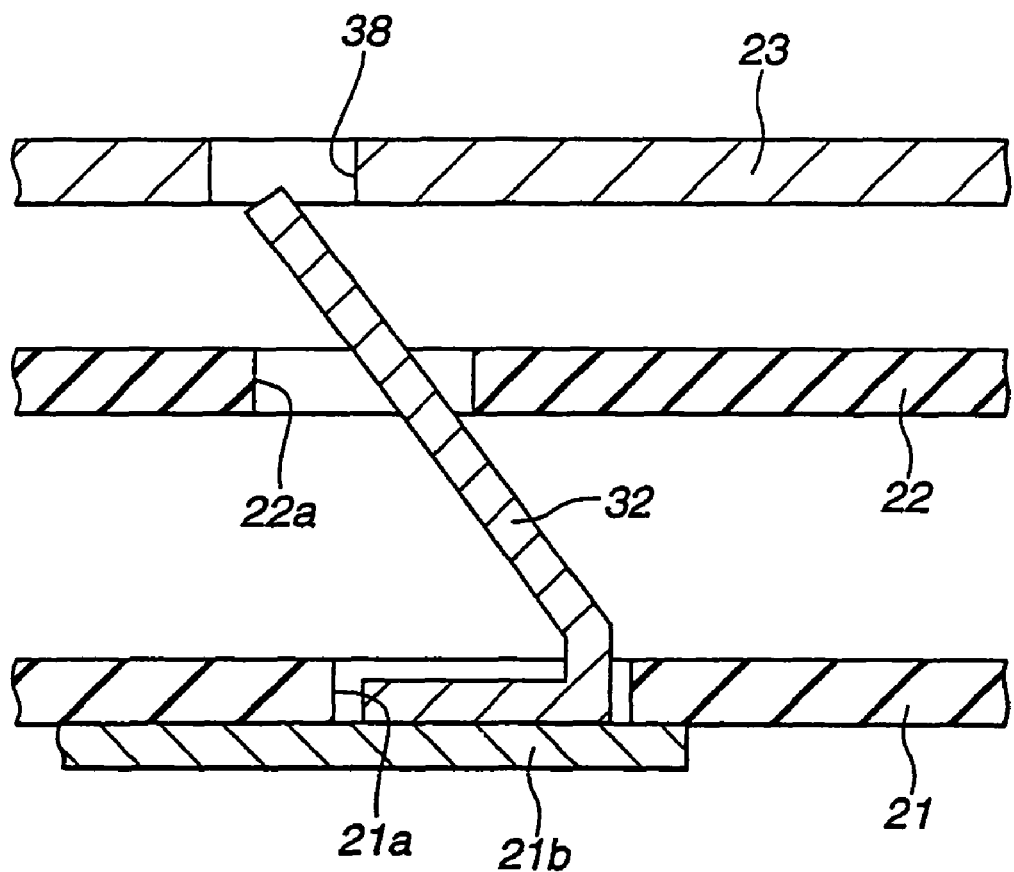
FIG. 13 is a sectional view of the information input device in FIG. 12, showing the installation of brushes included in the unit.

More specifically, in the multi-functional switch 111 as the first embodiment, the brush 32 is housed at the base portion thereof in the brush housing hole 21*a* in the base 21 and put in contact with the wiring pattern 21*b*, and further extends through the holder 22 above the base 21 to a position where it is in contact with the scale 23, as will be evident from FIG. 13. Namely, the brush 34 is rather long. The long brush 32 is almost bare and thus easy to attack by dust or water. The brush 32 in the multi-functional switch 111 is thus easily eroded and has a reduced service life.

In the multi-functional switch 111*b* as the third embodiment of the present invention, each of the brushes 170*a*, 170*b* and 170*e* is almost entirely housed in the through-hole 154. Namely, the brush is bare along an extremely short length thereof, and so hard to attack and has a long service life.

In the multi-functional switch 111*b* as the third embodiment of the present invention, since each tact switch 142 is installed downwardly to the rear side of the flexible printed circuit board 134, dust or water will not easily adhere to and attack the surface of the tact switch 142.

Namely, in the multi-functional switch 111 as the first embodiment, each of the switches 27*a*, 27*b*, 27*c*, 27*d* and 27*o* is disposed upwardly on the upper surface of the base 21. So, between the surface of the switch 27 and holder 22, there should be defined a minimum gap for a stroke to turn on and off the switch 27. Thus, water or dust will possibly adhere to the surface of the switch 27.

In the multi-functional switch 111b as the third embodiment, since each tact switch 142 is installed downwardly to the rear side of the flexible printed circuit board 134, dust or water will not easily adhere to and attack the surface of the tact switch 142.

In the multi-functional switch 111b as the third embodiment of the present invention, the operation dial 184 is held by the holder 152 against falling off while it is being allowed to rotate, with the central cylinder 188 of the operation dial 184 being force-fitted in the dial engagement pocket 158 of the holder 152 and also the holder/dial definition ring 150 being force-fitted on the central cylinder 188 to have the annular engagement projection 190 engaged in the dial engagement pocket 158 of the holder 152 with the holder/dial definition ring 150 laid between them. Therefore, no engagement portion has to be provided outside the operation dial 184 and dial engagement pocket 158 makes it unnecessary to widen the area of the operation dial 184, which will contribute to a more compact design of the multi-functional switch 111b.

In the multi-functional switch 111 as the first embodiment, the dial body retainers 35 of the holder 22 have to be located outside of at least the dial body 23, which restricts the multi-functional switch 111 from being reduced in area and thus makes it possible to down-size the switch 111.

In the multi-functional switch 111b as the third embodiment, since the annular engagement projection 190 of the central cylinder 188 of the operation dial 184 is engaged in the dial engagement pocket 158 of the holder 152 with the holder/dial definition ring 150 laid between them, such dial engagement pocket will not cause to increase the area of the operation dial 184. Therefore, the multi-functional switch 111b can easily be designed more compact.

Figure 28A:
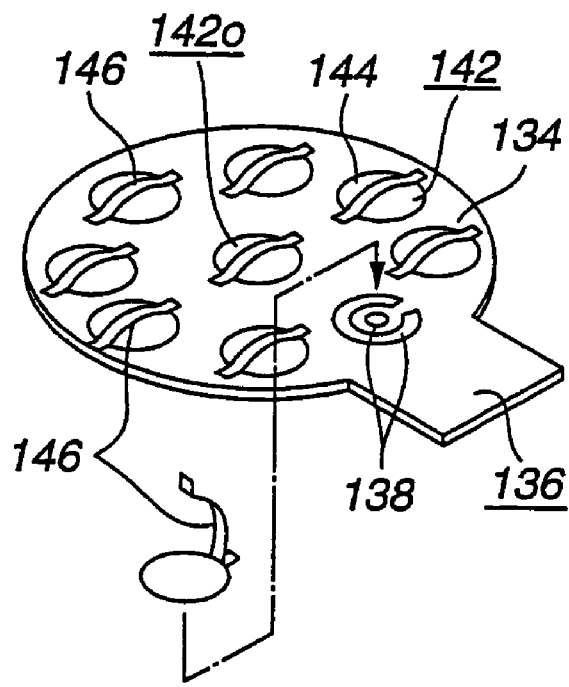
FIG. 28A is a perspective view, from the rear side, of a variant of the flexible printed circuit board on which tact switches are provided.
Figure 28B:
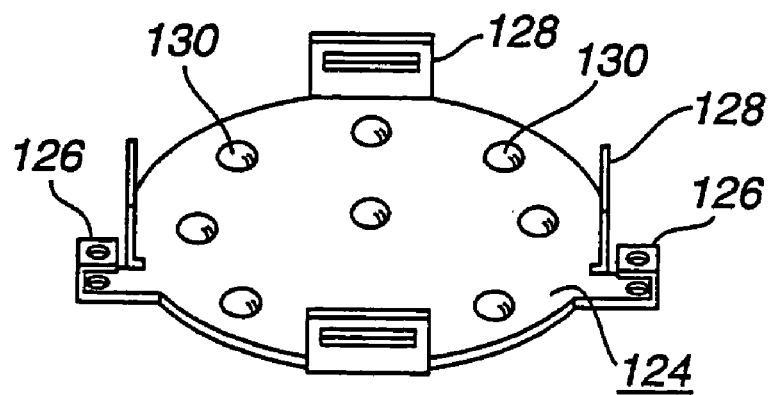
FIG. 28B is a perspective view, from the front side, of the flexible printed circuit board in FIG. 28A.

According to the third embodiment of the present invention, the multi-functional switch 111b may be constructed as shown in FIGS. 28A and 28B.

In the multi-functional switch 111b, one tact switch 142o for setting an input is provided in the center of the flexible printed circuit board 134, and eight tact switches 142 for horizontal and vertical scrolling and for oblique scrolling are disposed at an pitch of 45 deg. circumferentially on the flexible printed circuit board 134 as shown in FIG. 28A. Correspondingly to these tact switches 142, there are provided on the base 124 projections 130 which press and turn on the tact switches 124, respectively.

By increasing the number of tact switches 142 provided along the circumference from four to eight, it is possible to make a scrolling horizontally and vertically as well as obliquely. It should be noted that the multi-functional switch 111b shown in FIGS. 28A and 28B is similar to the aforementioned one except for the tact switches 142 disposed on the base 124.

Next, the fourth embodiment of the present invention will be described with reference to the accompanying drawings. The multi-functional switch as the fourth embodiment is generally indicated with a reference number 111c.

Since a portable phone having the multi-functional switch 111c assembled therein is similar in appearance and circuit construction to the one having previously been illustrated and explained with reference to FIGS. 5 and 6, it will not be described in detail. Namely, the description and illustration of the multi-functional switch 111 as in FIGS. 5 and 6 are applied as they are to the multi-functional switch 111c just by replacing the reference number 111 with 111c.

Figure 29:
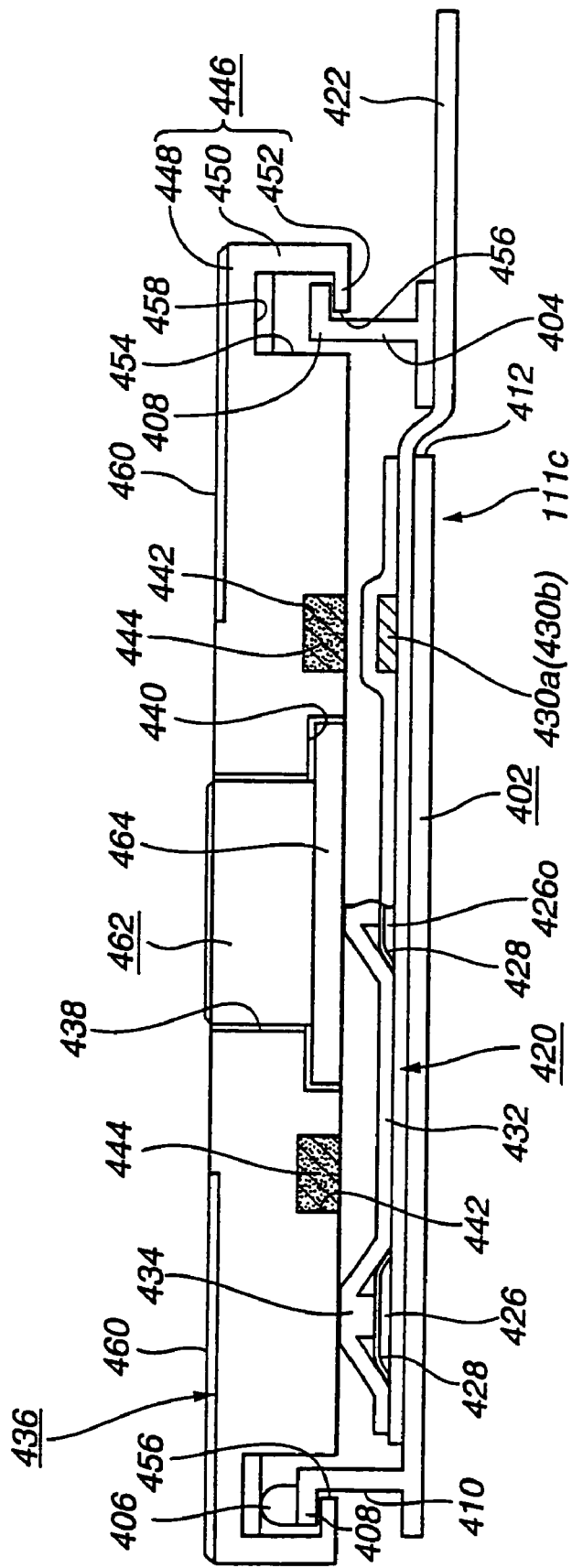
FIG. 29 is an axial sectional view of a multi-functional switch as a fourth embodiment of the information input device according to the present invention.
Figure 30:
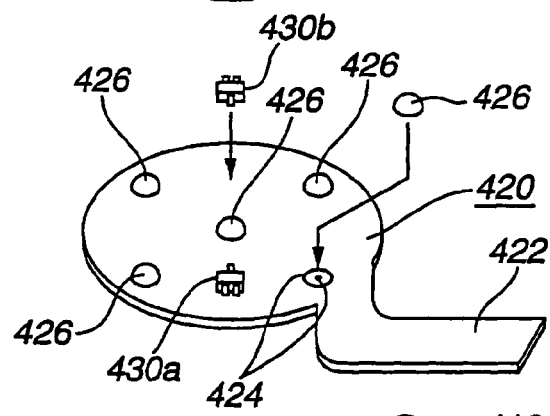
FIG. 30 is an exploded perspective view of the multi-functional switch in FIG. 29.
Figure 30:
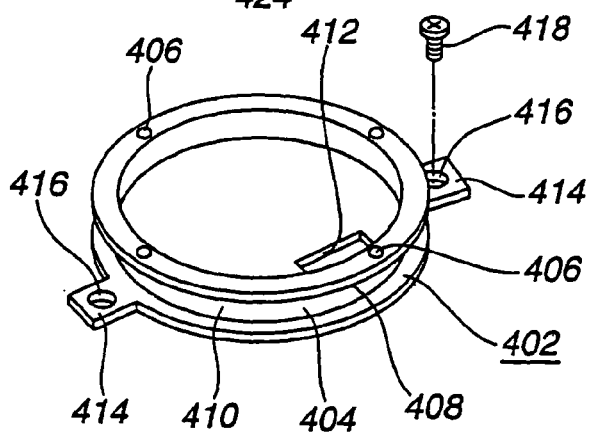
Figure 33:
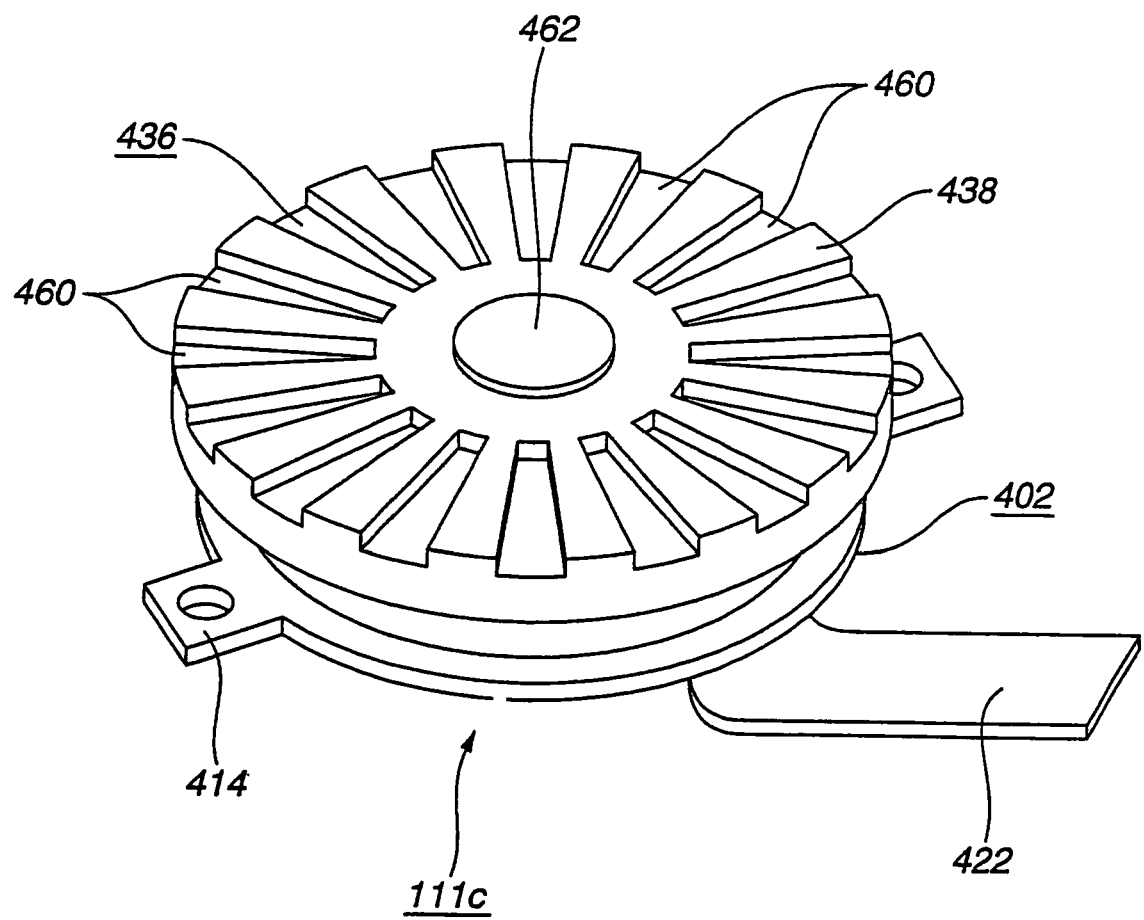
FIG. 33 is a perspective view of the multi-functional in FIG. 29.

As shown in FIGS. 29 and 30, the multi-functional switch 111c as the fourth embodiment includes a base 402 formed from a synthetic resin for example to have a generally disk-like shape, and it is assembled as shown in FIG. 33. The disk-shaped base 402 has a cylindrical portion 404 formed integrally in a position somewhat inner than the circumference of one side thereof. The cylindrical portion 404 has a plurality of detent projections 406 formed integrally on the upper side thereof. Each of the detent projections 406 is formed like a dome. This dome-shaped projection 406 is engaged in a detent concavity formed in the lower side of an operation dial which will further be described later, and provides a detent or clicking when the operation dial is rotated. The cylindrical portion 404 has formed along the upper circumference thereof an annular projection 408 extending outwardly, and a dial receiving recess 410 is defined between the annular projection 408 and the circumferential edge of the base 402. Also, a flexible printed circuit board insertion slit 412 is formed in a position somewhat inner than the cylindrical portion 404 of the base 402. This slit 412 is provided to insert a signal lead-out portion of the flexible printed circuit board which will further be described later.

The base 402 has provided thereon fixtures 414 for fixing the base 402 directly or indirectly to a housing (not shown) of a portable phone for example. Each of the fixtures 414 has a fixing hole 416 formed therein. The base 402 is fixed to the portable phone housing by fixing the fixtures 414 to the housing with a set screw 418 inserted in each fixing hole 416. The base 402 will have a flexible printed circuit board 420 assembled thereto. The flexible printed circuit board 420 includes a substrate formed form polyimide resin and having formed over the surface thereof a wiring pattern formed from an electrically conductive film of copper foil or the like, and a signal lead-out portion 422 formed in a part of the disk-like main body thereof and which projects outwardly.

The flexible printed circuit board 420 has the signal lead-out portion 422 thereof introduced from above as shown in FIG. 29 into the flexible printed circuit board insertion slit 412 in the base 402 and led out of the base 402. The disk-shaped main body of the flexible printed circuit board 420 is laid inside the cylindrical portion 404 of the base 402 and bonded there for integration with the base 402. The flexible printed circuit board 420 has a plurality of wiring patterns 424 formed on the surface thereof. The wiring patterns 424 include ones to be connected to the terminals of tact switches which will be described below and ones to be connected to the terminals of hall ICs which will further be described later.

The flexible printed circuit board 420 has a plurality of tact switches 426 provided on the rear side thereof. Each of the tact switches 426 includes an inverted spring 428 and a switching element (not shown) provided inside the inverted spring 428. The terminal of each switching element is connected to each wiring pattern 424.

The plurality of tact switches 426 disposed on the flexible printed circuit board 420 includes a central one 426o used for setting an input. The other four tact switches 426 are disposed along the circumference of the circuit board 420 at a constant circumferential pitch of 90 deg, and used for upward, downward, rightward and leftward scrolling. As the tact switches 426 disposed around the central one 426o, eight ones may be disposed at a constant circumferential pitch of 45 deg.

The flexible printed circuit board 420 has hall ICs 430a and 430b provided on the upper side thereof. These hall ICs 430a and 430b incorporate a hall element each and disposed in a predetermined geometry on the upper side of the flexible printed circuit board 420. The geometry, internal construction and functions of these hall ICs will be described later.

Figure 31:
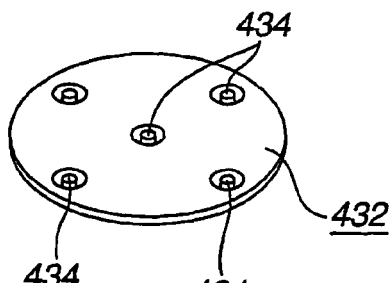
FIG. 31 is a perspective view of a dust-proof sheet to protect the tact switches disposed on a flexible printed circuit board included in the information input device in FIG. 29.

On the surface of the flexible printed circuit board 420, there is provided a dust-proof sheet 432 to cover the tact switches 426 and hall ICs 430a and 430b provided on the flexible printed circuit board 420 as shown in FIG. 30. The dust-proof sheet 432 has provided on the side thereof opposite to the flexible printed circuit board 420 detent projections 434 corresponding to the tact switches 426 as shown in FIG. 31. Each of the detent projections 434 provides a detent or clicking when the tact switch 426 is turned on by pressing an operation dial 436. Also, each detent projection 434 can effectively transmit a force of operation applied by pressing the operation dial 436 to the tact switch 426 via the projection 434 itself and thus positively activate the tact switch 426. The dust-proof sheet 432 is attached to over the surface disk-shaped main body of the flexible printed circuit board 420 with each of the detent projections 434 being positioned at the highest point of the inverted spring 428 of the corresponding tact switch 426.

Figure 32:
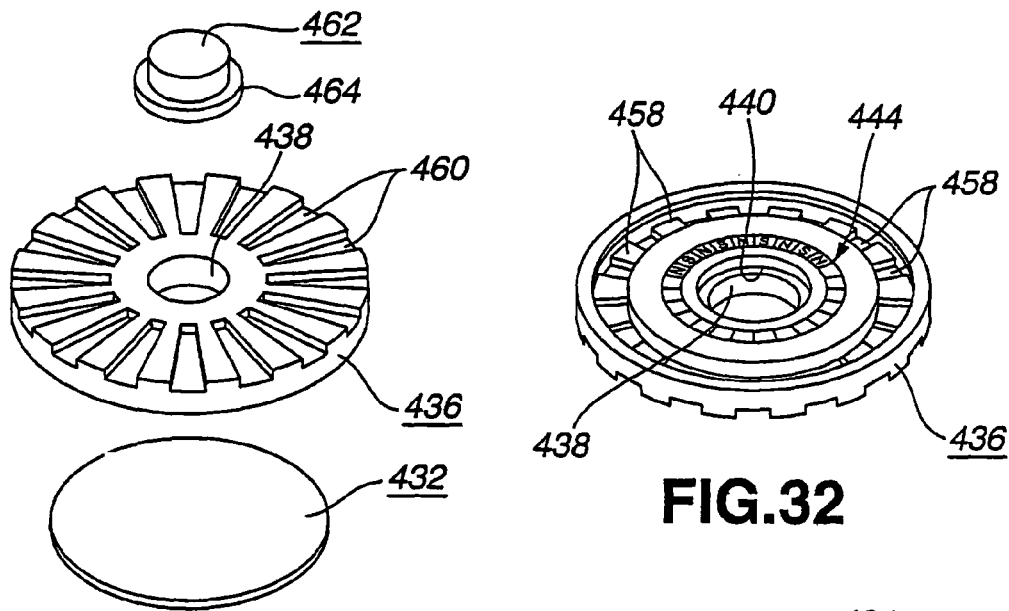
FIG. 32 is a perspective view, from the rear side, of an operation dial included in the information input device in FIG. 29.

On the tact switches 426 disposed on the flexible printed circuit board 420 with the dust-proof sheet 432 laid between them, there is disposed the operation dial 436 formed from a synthetic resin to have a disk-like shape. As shown in FIGS. 30 and 32, the operation dial 436 has a central opening 438 formed in the center thereof, and an engagement step 440 formed on the lower side thereof opposite to the flexible printed circuit board 420 and having a larger diameter than that of the central opening 438 to project inwardly of the central opening 438. The engagement step 440 is provided to engage on a flange portion formed on the bottom of a button 462, as shown in FIG. 29, for blocking the button 462 from falling off the operation dial 436.

The operation dial 436 has a ring-shaped magnet groove 442 formed on the lower side thereof. In the magnet groove 442, there is fitted a ring-shaped magnet 444. The magnet 444 has sets of N and S poles formed thereon at a constant angular pitch.

Also, the operation dial 436 has an engagement portion 446 formed integrally along the circumferential edge thereof. The engagement portion 446 includes a portion 448 extending outwardly from the upper portion of the circumferential edge of the operation dial 436, a skirt portion 450 extending downward from the outer end of the portion 448, and a retaining portion 452 extending inwardly from the lower end of the skirt portion 450. These portions 446, 450 and 452 define together a space 454 in which the annular projection 408 at the upper portion of the base 448 is housed. The space 454 is open at a reference number 456. The lower side of the operation dial 436 is open to outside through the opening 456. The annular projection 408 of the base 402 is inserted into the space 454 through the opening 456, and engaged on the engagement portion 452 of the operation dial 436 in the space 454. The engagement of the annular projection 408 and engagement portion 452 of the operation dial 436 on each other permits to prevent the operation dial 436 from falling off the base 402 and keep the operation dial 436 rotatably supported on the base 402.

On the upper side of the cylindrical portion 404 of the base 402, there is formed at a constant angular pitch a plurality of detent recesses 458 in which the plurality of detent projections 406 is engaged and disengaged. The detent recesses 458 provide a detent or clicking as the detent projection 406 moves while being engaged and disengaged in the detent recesses each time the operation dial 436 is rotated a constant angular pitch.

Also, the operation dial 436 has a plurality of radial recesses 460 formed on the upper side thereof as shown in FIGS. 30 and 33. These recesses 460 are formed by forming concavities and convexities on the upper side of the operation dial 436, and contribute to effectively transmit a force of rotating operation by the finger or the like to the operation dial 436.

The operation dial 436 has mounted thereto the button 462 equivalent to a central switch presser. The button 462 has a flange portion 464 formed at the bottom end thereof as shown in FIGS. 29 and 30. It is inserted from below into the central opening 438 in the operation dial 436, and engaged at the flange portion 464 thereof on the engagement step 440 formed at the bottom end of the central opening 438. The operation dial 436 is installed to the base 402 after the button 462 is inserted into the central opening 438 in the operation dial 436.

Figure 34A:
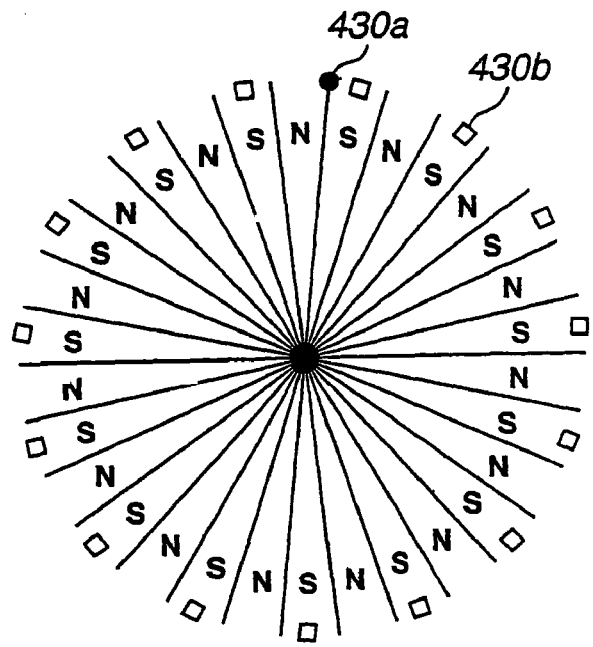

The hall ICs 430a and 430b are disposed as will be described below with reference to FIG. 34A. The magnet 444 formed on the operation dial 436 has sets of N and S poles disposed at a constant angular pitch as shown in FIG. 34A. One (430a) of the hall ICs provided on the flexible printed circuit board 420 on the base 402 is positioned correspondingly to a portion indicated with a black spot in FIG. 34A, while the hall IC 430b is disposed in a position corresponding to any one of a plurality of rectangles shown in FIG. 34A.

More specifically, the hall ICs 430a and 430b are disposed in positions whose pitch is different from an integral multiple of an angular pitch at which the sets of N and S poles are disposed in the magnet 444, and detect a rotated direction of the operation dial 436 on the basis of the relation in phase between output waveforms from the hall ICs. This disposition of the hall ICs is based on the fact that a rotated direction of the operation dial 436 can be detected based on the relation in phase between the outputs from the hall ICs 430a and 430b.

The above will further be described below with reference to FIGS. 34A to 34C. When the operation dial 436 is rotated, the two hall ICs 430a and 430b provide outputs for one period (λ) each time the operation dial 436 is rotated a pitch at which the sets of N and S poles are disposed. Since the hall ICs 430a and 430b have different positional relations with the magnet 444 as above, the outputs from these hall ICs 430a and 430b are different in phase from each other as shown in FIGS. 34B and 34C, and the difference in phase varies depending upon each rotated direction of the operation dial 436.

Figure 34B:
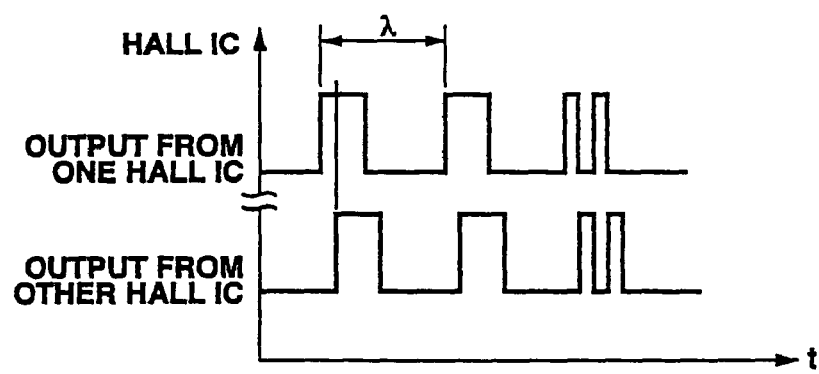
Figure 34C:
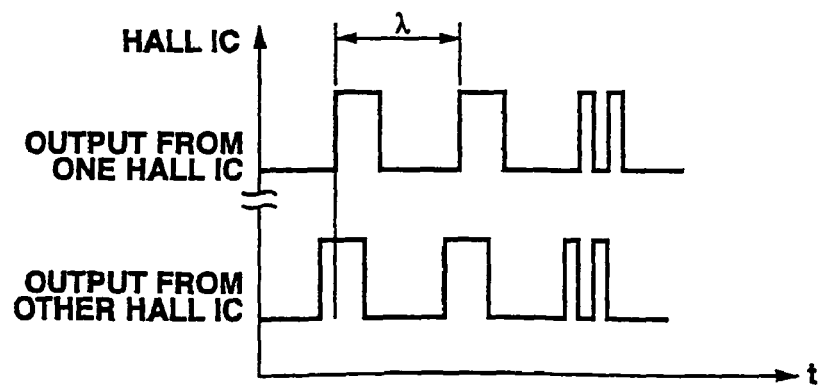

On the assumption that the phase of the output from the hall IC 430a has led that of the output from the hall IC 430b as shown in FIG. 34B when the operation dial 436 is rotated in one direction, the output phase of the hall IC 430b will lead that of the hall IC 430a, and the relation in phase varies depending upon a difference in rotated direction as shown in FIG. 34C when the operation dial 436 is rotated in a direction opposite to the above direction. Therefore, by detecting the positional relation, namely, by detecting which is earlier or later, the output phase of the hall IC 430a or 430b, it is possible to detect a rotated direction of the operation dial 436.

Next, one of the hall ICs 430 will be described with reference to FIGS. 35A to 35E. The hall IC 430 is disposed under the ring-shaped magnet 444 as shown in FIG. 35A. The magnet 444 shown in FIG. 35A is rotated along with the operation dial 436 and a magnetic field developed by the magnet 444 thus rotated passes over the hall IC 430, resulting in a change of a magnetic flux density detected by the hall IC 430. The hall IC 430 provides the change of magnetic flux density as a detection output. The detection output is amplified and shaped in waveform before delivery.

Note here that the internal circuit of the hall IC 430 is constructed as shown in FIG. 35B. Namely, the hall IC 430 includes a regulator REG which converts an external source voltage Vcc into a stable source voltage of a predetermined value and provides the conversion result, and a hall element HD which provides, as an output, a voltage corresponding to a change of the magnetic flux density developed by the magnet 444. FIG. 35C shows a waveform of a change of magnetic flux density, caused by a rotation of the magnet 444, and detected by the hall element HD, and FIG. 35D shows a waveform of an output voltage provided from the hall element HD and which varies according to a detected change of magnetic flux density.

The hall element HD has an amplification circuit Amp connected thereto, and a detection voltage output from the hall element HD is amplified by the amplification circuit Amp. The amplification circuit Amp has connected thereto a Schmidt-Trigger circuit ST to binarize the detection output from the hall element HD. The Schmidt-Trigger circuit ST shapes the waveform of the detection output provided from the hall element HD and amplified by the amplification circuit Amp to provide a definite rectangular wave which changes digitally between Bop and Brp levels as shown in FIG. 35E.

An input waveform to the Schmidt-Trigger circuit ST is shown in the upper portion of FIG. 35E, and an output waveform from the circuit ST is shown in the lower portion of FIG. 35E. The output from the Schmidt-Trigger circuit ST is amplified by a transistor Q before delivery. Outputs from the hall ICs 430*a* and 430*b* shown in FIGS. 34B and 34C have come from the transistor Q shown in FIG. 35B. The multi-functional switch 111*c* as the fourth embodiment includes such hall ICs 430 as having previously been mentioned.

The multi-functional switch 111*c* constructed as above functions as will be described below. When the operation dial 436 is rotated, a rotated extent and direction thereof are detected as in the foregoing. It is possible to make input of a scrolled extent by a rotated extent of the operation dial 436 and a scrolling direction, for example, a rightward or leftward, or upward or downward, by a rotated direction of the operation dial 436.

Also, when the button 462 is pressed, the force of pressing operation is effectively applied to the central tact switch 426*o* on the flexible printed circuit board 420 via the projection 434 on the dust-proof sheet 432, and the tact switch 426*o* is pressed under the force to the center of the base 402 to turn on. Using the tact switch 426*o* as the setting switch, it is possible to set an already entered scrolled direction and extent by turning on the tact switch 426*o*.

Further, when any of the outer portions, right, left, upper and lower, of the button 462 in the operation dial 436 is pressed, the force of pressing is applied to a corresponding one of the tact switches via the corresponding projection 434 on the dust-proof sheet 432, and the tact switch 426 is pressed under the pressing force to the base 402 to turn on. Therefore, using the four peripheral tact switches 426 as input means for making input of directions, right, left, upper and lower, it is possible to make input of a rightward, leftward, upward or downward or back or forth scrolling, shift or the like, for example.

The advantages of the multi-functional switch 111*c* will be described below:

With the multi-functional switch 111*c* as the fourth embodiment of the present invention, a rotation of the operation dial 436 is detected not by an elastic contact of a brush on a rotation detect electrode provided on the operation dial 436 but by detecting a change of the magnetic flux density of a magnetic field developed by the magnet 444 provided on the operation dial 436 by means of the hall element HD in each of the two hall ICs 430*a* and 430*b* provided on the base 402, for example. Namely, the rotation can be detected in a non-contact manner. So, no large gap for interposition of any such brush has to be formed between the operation dial 436 and base 402, and no intermediate member such as the holder which was required in the conventional multi-functional switch has to be provided between the operation dial 436 and base 402. Therefore, according to the present invention, the multi-functional switch can more easily be reduced in thickness and constructed from a reduced number of parts than the conventional one.

Further, in the multi-functional switch 111*c* as the fourth embodiment, the force applied to press the operation dial 436 or button 462 can be transmitted effectively and positively to the tact switch 426 on the base 402 via the projection 434 on the dust-proof sheet 432 provided on the base 402, even without any intermediate member such as the holder. Therefore, the tact switch 426 can operate with a high reliability without any intermediate member such as the holder.

In the multi-functional switch 111*c* as the fourth embodiment, the magnetic flux density of a magnetic field developed by the magnet 444 formed on the operation dial 436 is detected by the hall element HD in each hall IC 430. Namely, the detection can be done in a non-contact manner. Therefore, the detection can be done satisfactorily without having to keep the base 402 and operation dial 436 in a high-precision positional relation, namely, in a precise vertical positional relation with each other. Therefore, even with the plurality of tact switches 426*o* and 426 provided on the flexible printed circuit board 420 provided on the base 402 and having the hall ICs 430, both the rotation detection and switch operation can be done with an improved reliability.

A variant of the multi-functional switch 111*c* as the fourth embodiment of the present invention will be explained below with reference to FIGS. 36A, 36B and 37.

Figure 36A:
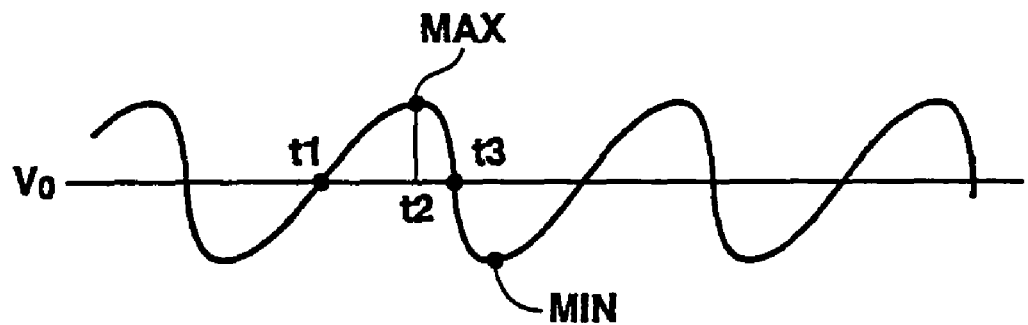
FIGS. 36A and 36B show waveforms of outputs from variants, respectively, of the hall elements used in the multi-functional switch in FIG. 33.
Figure 36B:
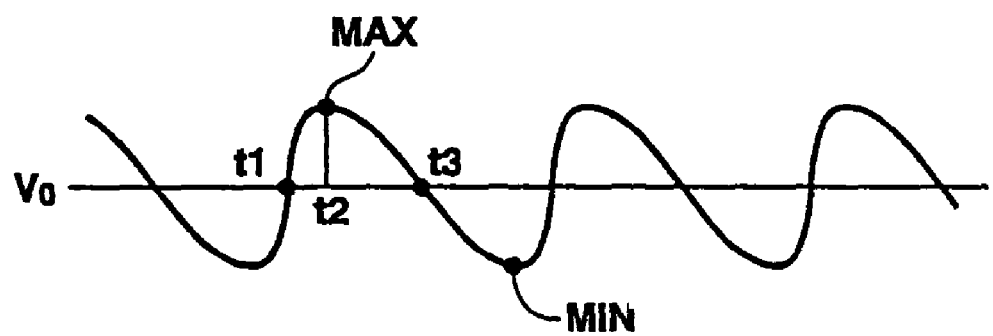
Figure 37:
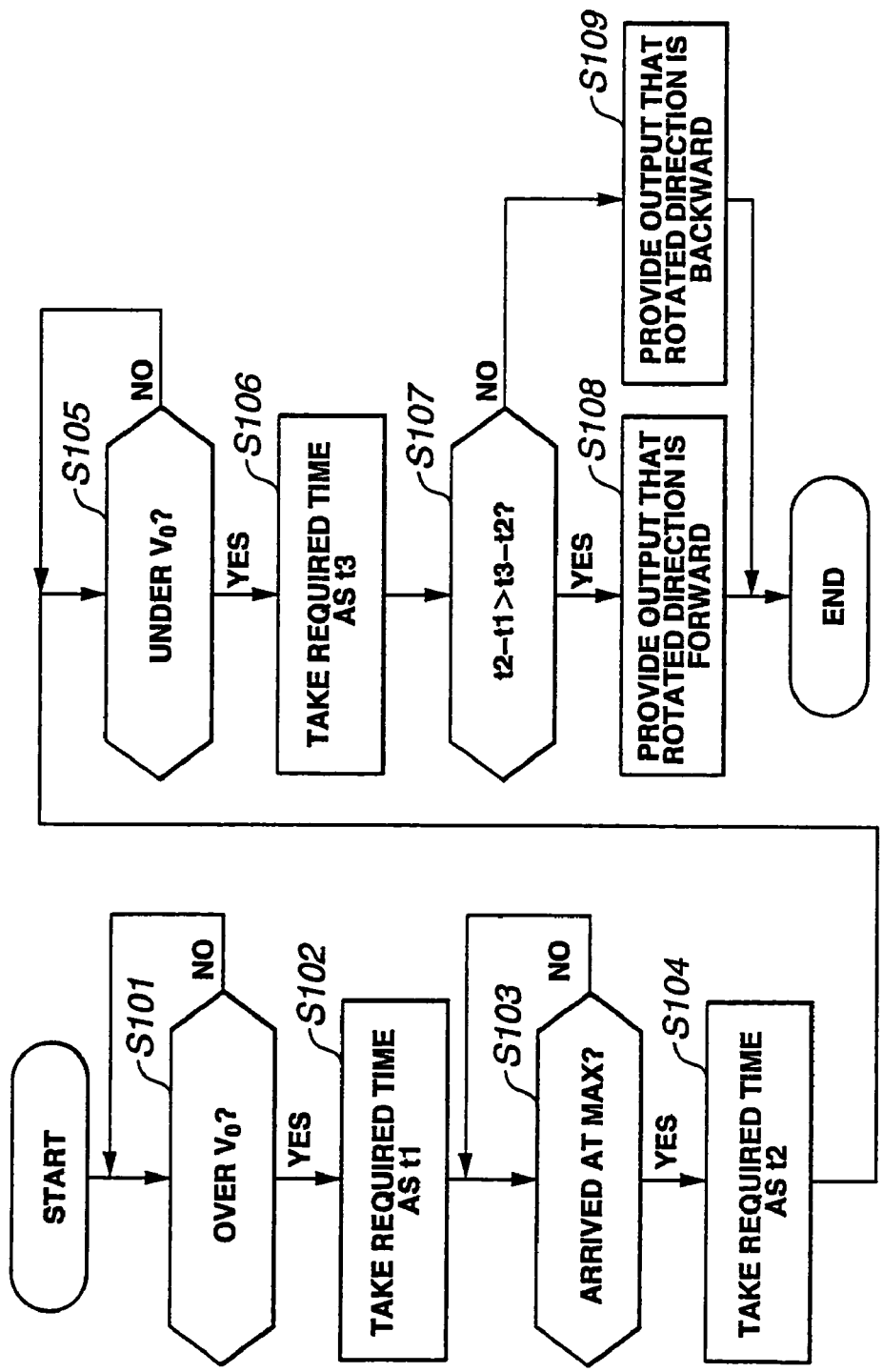
FIG. 37 shows a flow of operations made in detection of a rotated direction.

FIGS. 36A and 36B show waveforms of outputs from the hall elements, and FIG. 37 shows a flow of operations made in detection of a rotated direction. In the variant of the fourth embodiment, both a rotated extent and direction can be detected even with a single hall element, which is only a difference of the variant from the fourth embodiment. So, only the difference will be described herebelow without any detailed description of the aspects common to both the variant and fourth embodiment.

In this variant, the output waveform from the hall IC is not strictly any sine wave. The hall IC incorporates an IC element which provides an output waveform whose rise to a positive peak, for example, from the zero level and fall from the peak to the zero level are different in inclination from each other.

By comparison between a time required for the hall element output to rise from the zero level to peak and a time taken from the output to fall from the peak to zero level, a rotated direction of the operation dial is detected.

Namely, in the explanation of the fourth embodiment, the detection output from the hall element HD when the magnet 444 is rotated along with the operation dial 436 was shown like a sine wave in FIG. 35D. However, the detection output is not any sine wave in some cases. On this account, the variant, of which the detection outputs are shown in FIGS. 36A and 36B, uses a hall IC incorporating a hall element HD which provides a detection output whose waveform is not any sine wave. The detection output from the hall element HD is amplified in the hall IC incorporated in the hall element HD. However, the output is not binarized by the Schmidt-trigger circuit for detection of a rotated direction of the operation dial 436. However, in a circuit to detect a rotated extent, the detection output from the hall element HD may be binarized.

The variant uses only one hall IC incorporating the aforementioned hall element and the hall IC is disposed in a position where it can detect a magnetic flux developed by the magnet. When the magnet is rotated, the output from the hall element will be as shown in FIG. 36A in case the rotation is made in one direction, and as shown in FIG. 36B in case the rotation is made in a direction opposite to the above direction.

A rotated direction of the operation dial 436 is detected as will be described below with reference to the flow chart in FIG. 37:

To detect a rotated direction of the operation dial 436, it is detected first in step S101 whether the output from the hall element exceeds a reference voltage Vo, for example, 0 V. Namely, it is judged whether the output from the hall element has risen from a voltage lower than the reference voltage Vo and crossed the 0 level. If the result of judgment is negative (NO), the judgment is repeated until an affirmative result of judgment (YES) is obtained.

When the result of judgment in step S101 is affirmative (YES), namely, the hall element output has crossed the zero level, the control is passed to step S102. The time of arrival at step S102 is taken as t1.

Next, the control is passed to step S103 where it will be judged whether the hall element output has reached MAX (positive peak). If the result of judgment in step S103 is negative (NO), the judgment is repeated until an affirmative result of judgment (YES) is obtained.

If the result of judgment in step S103 is affirmative (YES), namely, when the hall element output has reached MAX (positive peak), the control is passed to step S104. The time of arrival at step S104 is taken as t2.

Next, the control is passed from step S104 to step S105 where it will be judged whether the hall element output has been lower than the reference voltage Vo, that is, it has crossed the zero level. If the result of judgment in step S105 is negative (NO), the judgment is repeated until an affirmative result of judgment (YES) is obtained.

If the result of judgment in step S105 is affirmative (YES), the control is passed to step S106. When the hall element output has crossed the zero level, the time of arrival at step S106 is taken as t3.

Next, the control goes from step S106 to step S107 where a time required from the hall element output to rise from the reference voltage Vo to MAX (positive peak) will be compared with a difference t3!t2, namely, a time taken from the hall element output to fall from MAX to the reference voltage Vo.

If the result of judgment in step S107 is affirmative (YES), the control is passed to step S108 where a detection output that the rotated direction is forward (as in FIG. 36A) will be provided.

If the result of judgment in step S107 is negative (NO), a detection output that the rotated direction is backward (as in FIG. 36B) will be provided.

Then, the control is passed from step S107 to step S108 or S109 where a rotated direction of the operation dial 436 will be detected and the detection of a rotated direction be ended with delivery of a detection output corresponding to the rotated direction.

In the aforementioned variant, only one hall IC incorporating a hall element is required, which will lead to a reduced manufacturing cost of the multi-functional switch.

Next, the fifth embodiment of the present invention will be described with reference to the accompanying drawings.

The fifth embodiment provides a multi-functional switch, generally indicated with a reference number 111*d*. It is an improved version of the fourth embodiment having been described above. It provides a detent or clicking in a non-contact manner.

More specifically, in the multi-functional switch 111*c* as the fourth embodiment, a rotated extent and/or direction of the operation dial are detected in a non-contact manner by a combination of the ring-shaped magnet 444 and hall ICs 430. However, in the multi-functional switch 111*d* as the fifth embodiment, the ring-shaped magnet is adapted to detect a rotation of the operation dial as well as to provide a detent or clicking by a combination of the magnet with a detent magnet which will further be described later.

Figure 38:
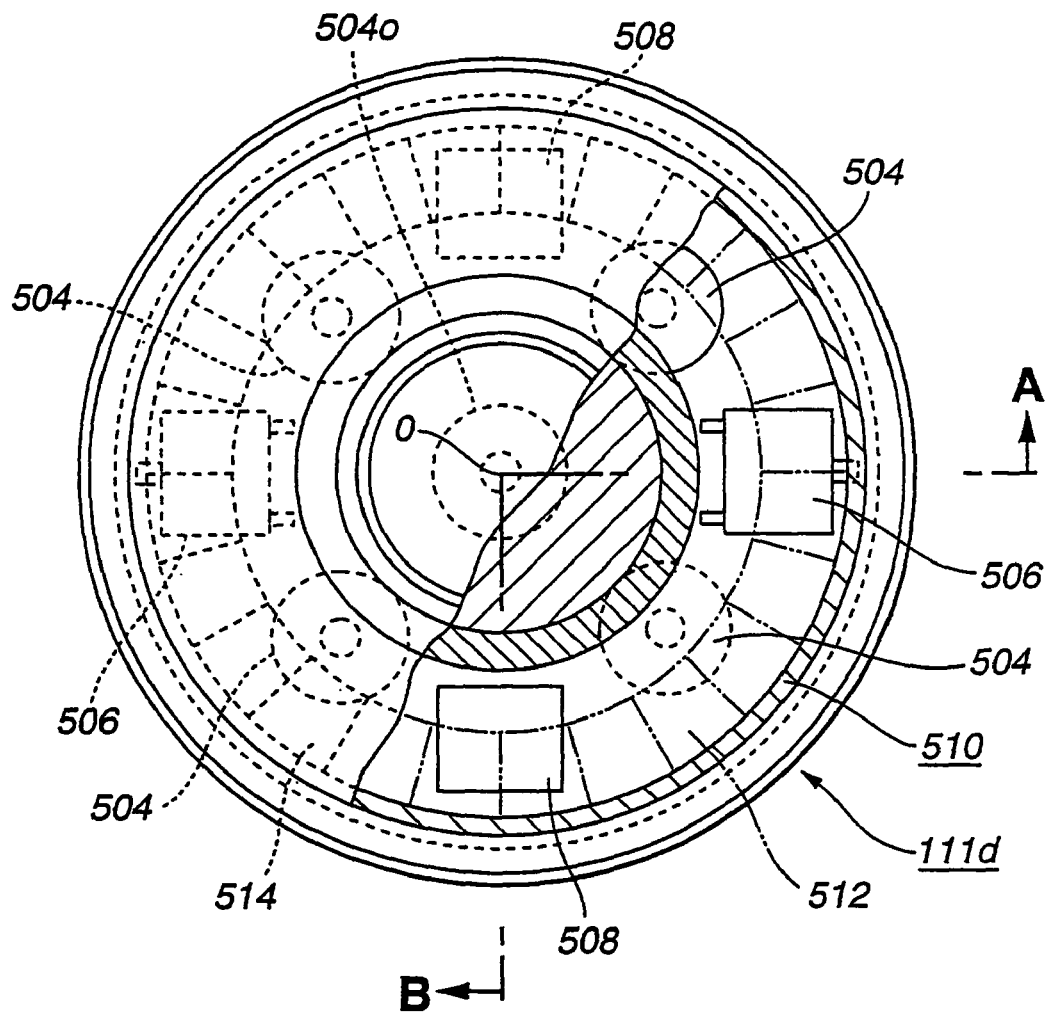
FIG. 38 is a partially fragmentary plan view of a multi-functional switch as a fifth embodiment of the information input device according to the present invention.
Figure 39:
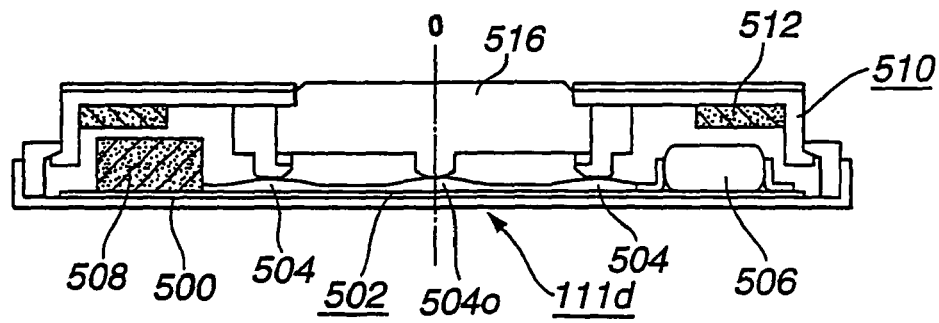
FIG. 39 is a sectional view taken along the line A-O-B in FIG. 38.

As shown in FIGS. 38 and 39, the multi-functional switch 111*d* as the fifth embodiment of the present invention includes a base 500, a flexible printed circuit board 502 disposed on the base 500, a central tact switch 504*o* disposed in the center of the base 500 and on the flexible printed circuit board 502, and a plurality of tact switches 504 disposed around the central tact switch 504*o* along the circumference of the base 500 and on the flexible printed circuit board 502. Each of the tact switches 504*o* and 504 is electrically connected to a wiring pattern formed on the printed flexible printed circuit board 502.

On the flexible printed circuit board 502, there are disposed two rotation detect hall ICs 506 and two detent magnets 508. The two rotation detect hall ICs 506 are provided in positions a predetermined distance from the center of the flexible printed circuit board 502 and opposite to each other with respect to the center of the base 500. The two detent magnets 508 are provided between the two rotation detect hall ICs 506 and opposite to each other with respect to the center of the base 500. That is to say, the two rotation detect hall ICs 506 and two detent magnets 508 are disposed alternately at intervals of 90 deg. circumferentially about the center of the base 500.

On the base 500, an operation dial 510 is disposed to cover the rotation detect hall ICs 506 and detent magnets 508. On the inner side of the operation dial 510 opposite to the hall ICs 506 and detent magnets 508, there is disposed a ring-shaped magnet 512. The ring-shaped magnet 512 has sets of N and S poles (514) alternately magnetized circumferentially thereon.

Also in the multi-functional switch 111*d*, a rotation of the operation dial 510 disposed on the base 500, namely, a rotated extent and/or direction of the operation dial 510, are detected through detection of a magnetic flux developed by the ring-shaped magnet 512 by the two hall ICs 506. The theory of this detection is similar to that in the fourth embodiment and so will not be described in detail herein.

In the center of the operation dial 510, there is disposed a central switch activator 516 to penetrate through the operation dial 510. When pressed, the central switch activator 516 presses and activates the central tact switch 504*o* disposed on the flexible printed circuit board 502 and in the center of the base 500, and can thus set an input. When any one of portions, apart to the top, bottom, right and left, from the center of rotation O of the operation dial 510 is pressed, a tact switch 504 corresponding to that portion is pressed to turn on.

Next, the theory of detent creation by the ring-shaped magnet 512 provided on the operation dial 510 and detent magnets 508 provided on the base 500 will be explained with reference to FIGS. 40A to 40D.

Each of the ring-shaped magnet 512 and two detent magnets 508 includes sets of N and S poles alternately magnetized at the same angular pitch P. It should be noted that FIGS. 40A to 40D show mainly the magnet 508.

Figure 40A:
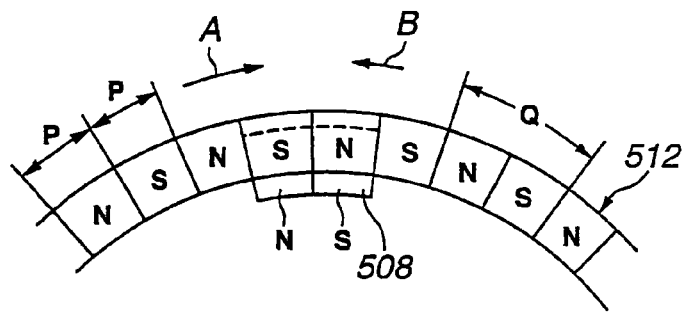
FIGS. 40A to 40D explain together the theory of giving a detent (clicking) in the multi-functional switch in FIG. 38.

While the operation dial 510 is not rotated or out of operation, the S and N poles of the ring-shaped magnet 512 and N and S poles of the detent magnets 508 are opposite to each other and attract each other as shown in FIG. 40A. That is, the operation dial 510 is attracted by the detent magnets 508 and thus restricted from rotation.

Figure 40B:
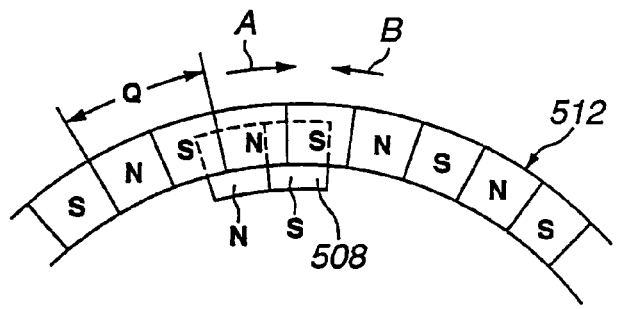

When the operation dial 510 attracted by the detent magnets 508 and thus restricted from rotation is rotated in the direction of arrow A in FIG. 40A, the poles of the ring-shaped magnet 512 and those of the detent magnets 508 become the same as each other, namely, the same poles are opposite to each other, as shown in FIG. 40B. That is, the S poles of the ring-shaped magnet 512, having been opposite to the N poles of the detent magnets 508, become opposite to the S poles of the detent magnets 508, while the N poles of the ring-shaped magnet 512, having been opposite to the S poles of the detent magnets 508, become opposite to the N poles of the detent magnets 508. When the operation dial 510 is rotated to a position shown in FIG. 40B, the poles of the ring-shaped magnet 512 approach the same poles of the detent magnets 508, so that a force of repulsion will take place to rotate the operation dial 510 in the direction of arrow B opposite to the direction of arrow A in which the operation dial 510 has been rotated. As a result, the detent magnets 508 will brake the rotation in the direction of arrow A of the operation dial 510.

Figure 40C:
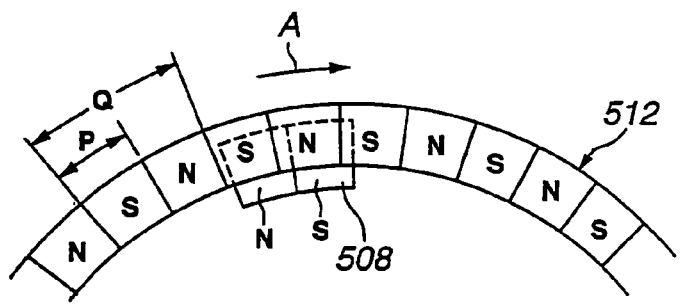
Figure 40D:
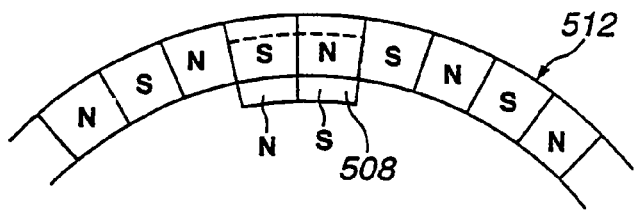

When the operation dial 510 is further rotated in the direction of arrow A in FIG. 40B against the force of repulsion of the detent magnets 508, the ring-shaped magnet 512 will have the N poles thereof, having been opposite to the S poles of the detent magnets 508, moved toward the S poles of the detent magnets 508, while it will have the S poles thereof, having been opposite to the N poles of the detent magnets 508, moved toward the N poles of the detent magnets 508, as shown in FIG. 40C. When the operation dial 510 is rotated in the direction of arrow A until the relation between the poles of the ring-shaped magnet 512 and those of the detent magnets 508 becomes as shown in FIG. 40C, the ring-shaped magnet 512 and detent magnets 508 will attract each other. As a result, the operation dial 510 will further be rotated in the direction of arrow A in FIG. 40C under the effect of the force of attraction of the magnets 512 and 508, the ring-shaped magnet 512 will have the N poles thereof, having been opposite to those of the detent magnets 508, moved to be opposite to the S poles of the detent magnets 508, while it will have the S poles thereof, having been opposite to those of the detent magnets 508, moved to be opposite to N poles of the detent magnets 508, as shown in FIG. 40D, and thus the operation dial 510 will be attracted by the detent magnets 508. The ring-shaped magnet 512 and detent magnets 508 will attract each other as shown in FIG. 40D to apply a rotated-directional load to the operation dial 510 being rotated.

Each time the ring-shaped magnet 512 having the N and S poles thereof magnetized at a constant pitch P circumferentially is rotated along with the operation dial 510 and application by the detent magnets 508 of a force in the direction of rotation and a rotated-directional load are repeated at each disposed angular pitch Q of sets of the N and S poles, whereby the operation dial 510 can be rotated with a detent or clicking.

As above, the multi-functional switch 111*d* as the fifth embodiment is simply constructed and allows the operation dial 510 to be rotated with detent or clicking.

INDUSTRIAL APPLICABILITY

As having been described in the foregoing, the information input device and electronic apparatus such as a portable phone using the information input device include a disk-shaped rotating member which is rotatable when manipulated at one main side thereof, a rotation detecting means for detecting the rotation of the rotating member, a central switch activator provided at the center of rotation of the rotating member, a central switch which is activated by the central switch activator, and a plurality of peripheral switches which are turned on when corresponding portions, apart from the rotation center, of the rotating member are pressed. An input can be selected by rotating the rotating member and pressing one of the portions apart from the rotation center of the rotating member, and the selected input can be set by pressing the central switch activator. Therefore, the mechanism can be simplified more to reduce the thickness of the information input device itself and thus that of an electronic apparatus using the information input device.

The invention claimed is:

1. An information input device comprising:
  a rotating member rotatable about an axis of rotation in forward and backward directions with a force applied in the direction of the plane thereof; and
  a ring-shaped magnet connected to the rotating member and extending circumferentially about and disposed apart from the axis of rotation, the ring-shaped magnet having a plurality of first pole segments and a plurality of second pole segments being different in polarity from the plurality of the first pole segments, individual ones of the first and second pole segments arranged in an alternating fashion such that each first pole segment is juxtaposed between two adjacent second pole segments and each second pole segment is juxtaposed between two adjacent first pole segments,
  adjacent where the rotating member is rotatably supported, detecting a strength of a magnetic field developed by a magnet pole the rotating member in rotation passes over; and
  a rotated extent and/or direction of the rotating member being detected on the basis of the result of the magnetic field strength detection.

2. An electronic apparatus comprising an information input device including a rotating member rotatable about an axis of rotation in forward and backward directions with a force applied in the direction of the plane thereof; and a ring-shaped magnet connected to the rotating member and extending circumferentially about and disposed apart from the axis of rotation, the ring-shaped magnet having a plurality of first pole segments and a plurality of second pole segments being different in polarity from the plurality of the first pole segments, individual ones of the first and second pole segments arranged in an alternating fashion such that each first pole segment is juxtaposed between two adjacent second pole segments and each second pole segment is juxtaposed between two adjacent first pole segments,
  at least a part of the magnet, supporting the rotating member, detecting a strength of a magnetic field developed by a magnet pole the rotating member in rotation passes over;
  a rotated extent and/or direction of the rotating member being detected on the basis of the result of the magnetic field strength detection; and
  the entire upper side of the rotating member being exposed for operability of the rotating member from at least outside the apparatus.

* * * * *

UNITED STATES PATENT AND TRADEMARK OFFICE
CERTIFICATE OF CORRECTION

| | | |
|---|---|---|
| PATENT NO. | : 8,073,138 B2 | Page 1 of 1 |
| APPLICATION NO. | : 12/662031 | |
| DATED | : December 6, 2011 | |
| INVENTOR(S) | : Kouichiro Takashima et al. | |

It is certified that error appears in the above-identified patent and that said Letters Patent is hereby corrected as shown below:

Item (62) should read:

Division of application No. 10/476,762, filed as application No. PCT/JP02/05395 on May 31, 2002, now Pat. No. 7,860,237

Signed and Sealed this
Twenty-eighth Day of February, 2012

David J. Kappos
*Director of the United States Patent and Trademark Office*